(12) United States Patent
Uehara et al.

(10) Patent No.: US 7,852,445 B2
(45) Date of Patent: Dec. 14, 2010

(54) LIQUID CRYSTAL DISPLAY DEVICE AND TERMINAL DEVICE THAT USES SAME

(75) Inventors: Shin-ichi Uehara, Tokyo (JP); Shinya Niioka, Tokyo (JP)

(73) Assignees: NEC Corporation; NEC LCD Technologies, Ltd. (JP)

( * ) Notice: Subject to any disclaimer, the term of this patent is extended or adjusted under 35 U.S.C. 154(b) by 862 days.

(21) Appl. No.: 11/615,357

(22) Filed: Dec. 22, 2006

(65) Prior Publication Data
US 2007/0146603 A1 Jun. 28, 2007

(30) Foreign Application Priority Data
Dec. 22, 2005 (JP) ............................ 2005-370963

(51) Int. Cl.
G02F 1/1343 (2006.01)
G02F 1/139 (2006.01)

(52) U.S. Cl. ..................... 349/141; 349/15; 349/179

(58) Field of Classification Search ............... 349/33, 349/141, 167, 177, 15, 57, 95, 143, 179; 345/87
See application file for complete search history.

(56) References Cited

U.S. PATENT DOCUMENTS

| | | | | |
|---|---|---|---|---|
| 2002/0154262 A1* | 10/2002 | Yamakita et al. | ............ | 349/141 |
| 2002/0159016 A1* | 10/2002 | Nishida et al. | ............ | 349/141 |
| 2006/0125989 A1* | 6/2006 | Park et al. | ............ | 349/141 |
| 2007/0115417 A1* | 5/2007 | Ge et al. | ............ | 349/141 |

FOREIGN PATENT DOCUMENTS

JP 11-202356 7/1999

(Continued)

OTHER PUBLICATIONS

Chinese Office Action mailed Sep. 18, 2009 in corresponding Chinese Patent Application No. 200610130984.0 with English translation thereof.

(Continued)

*Primary Examiner*—Dung T Nguyen
*Assistant Examiner*—Tai Duong
(74) *Attorney, Agent, or Firm*—Ostrolenk Faber LLP

(57) ABSTRACT

In a liquid crystal display device, a liquid crystal layer is provided between a principal substrate and an opposing substrate that are disposed so as to face each other, and a shared electrode and a pixel electrode, which is a parallel electrode pair formed in the shape of a comb, are formed on the surface of the principal substrate that faces the opposing substrate. Orientation films are also formed on the opposing surfaces of the principal substrate and the opposing substrate. The electrodes of the parallel electrode pair are formed so that the width thereof is smaller than the thickness of the liquid crystal layer. The orientation of the liquid crystal molecules between the electrodes is thereby changed by an electric field generated by the parallel electrode pair, and the orientation of liquid crystal molecules disposed above the electrodes is changed in the same direction as in the liquid crystal molecules between the electrodes in accordance with the change in orientation of the liquid crystal molecules between the electrodes. A high degree of transmittance can thereby be achieved by a simple electrode structure in an in-plane switching liquid crystal display device.

26 Claims, 31 Drawing Sheets

FOREIGN PATENT DOCUMENTS

| | | |
|---|---|---|
| JP | 2001-264809 | 9/2001 |
| JP | 2001-330846 | 11/2001 |
| JP | 2002-296611 | 10/2002 |
| JP | 2003-021825 | 1/2003 |
| JP | 2003-57673 | 2/2003 |
| JP | 2003-131248 | 5/2003 |
| JP | 2005-208567 | 8/2005 |
| JP | 2005-234547 | 9/2005 |
| WO | WO 2004/107029 A1 | 6/2004 |

OTHER PUBLICATIONS

Japanese Office Action issued Apr. 27, 2010 in connection with corresponding Japanese Patent Application No. 2006-346659 with the comments of the Japanese Examiner indicated in the Office Action in the English language.

Office Action issued by the Japanese Patent Office on Sep. 14, 2010 in connection with corresponding Japanese Patent Application No. 2006-346659.

Partial translation of Japanese Office Action issued in connection with Japanese Patent Application No. 2006-346659 on Sep. 14, 2010.

* cited by examiner

LIQUID CRYSTAL DISPLAY DEVICE AND TERMINAL DEVICE THAT USES SAME

BACKGROUND OF THE INVENTION

1. Field of the Invention

The present invention relates to a liquid crystal display device and to a terminal device, and particularly relates to an in-plane switching (IPS) liquid crystal display device wherein high transmittance can be obtained by a simple electrode structure, and to a terminal device that utilizes the liquid crystal display device.

2. Description of the Related Art

Because of their thin profile, light weight, small size, low energy consumption, and other advantages, display devices that use liquid crystals have been widely deployed and used in a range of devices that includes monitors, televisions (TV), and other large terminal devices; notebook-type personal computers, cash dispensers, vending machines, and other mid-sized terminal devices; and personal TVs, PDAs (Personal Digital Assistance), mobile telephones, mobile gaming devices, and other small terminal devices. In the liquid crystal panel that is the primary component of a liquid crystal display device, information is displayed by using an electric field to control the orientation of liquid crystal molecules, and numerous modes have been proposed according to the combination of the type and initial orientation of the liquid crystal molecules, the direction of the electric field, and other characteristics. Among these modes, the modes most often used in a conventional terminal device include an STN (Super Twisted Nematic) mode using a simple matrix structure, and a TN (Twisted Nematic) mode using an active matrix structure. However, a liquid crystal panel that uses these modes has a narrow range of angles in which contrasts can be correctly distinguished, and grayscale inversion occurs outside the optimum viewing position.

This problem of grayscale inversion was relatively insignificant in mobile telephones and other terminal devices when the display content consisted mainly of telephone numbers and other characters. However, with recent technological developments, terminal devices have come to display not only text information, but also large amounts of image information. The visibility of images is therefore severely reduced by grayscale inversion. Liquid crystal panels that use a mode having a wide range of angles at which contrast can be correctly distinguished without the occurrence of grayscale inversion are therefore gradually being installed in terminal devices. Liquid crystal panels having this type of mode are referred to generically as wide-viewing-angle liquid crystal panels, and IPS systems and other horizontal field modes, as well as multi-domain vertical alignment modes, film-compensated TN modes, and the like are applied therein.

In a film-compensated TN mode among the wide-viewing-angle modes that are used in these wide-viewing-angle liquid crystal panels, the viewing angle is improved by bonding a viewing angle compensation film to a TN-mode liquid crystal panel. First of all, in a TN-mode liquid crystal panel, the liquid crystal molecules are aligned parallel to the substrate in advance when a voltage is not being applied. In a TN mode, liquid crystals having uniaxial positive refractive index anisotropy are used, and the direction in which the liquid crystal molecules have a large refractive index is aligned so as to be parallel to the substrate. When a voltage is applied in this state, the liquid crystal molecules stand in the direction perpendicular to the substrate. However, due to the effects of the orienting force of the orientation film that determines the initial orientation, the liquid crystal molecules cannot stand completely upright even when a high voltage is applied near the boundary of the substrate, and the liquid crystal molecules are oriented in a direction that is tilted with respect to the substrate. Specifically, the direction in which the refractive index of the liquid crystal molecules is large is at an angle in relation to the substrate. In this arrangement, when the liquid crystal molecules are observed from the direction in which the refractive index is large, the apparent refractive index of the liquid crystal molecules significantly varies when this direction varies even by a small amount, and the viewing angle is narrowed by this change in the apparent refractive index. Therefore, the viewing angle compensation film in a film-compensated TN mode serves to minimize a change in the apparent refractive index of liquid crystal molecules that are oriented in the aforementioned tilted direction. An example of this film is a compensation film that is positioned so that a discotic compound corresponds with liquid crystal molecules that are oriented in the tilted direction. When this compensation film is used, it is possible to reduce the effects of liquid crystal molecules near the boundary of the substrate when a voltage is applied. Therefore, grayscale inversion can be suppressed and the viewing angle characteristics can be improved.

A multi-domain vertical alignment mode among the aforementioned wide-viewing-angle modes is a system that has domains in which the tilt directions compensate for each other in a vertical-alignment-mode liquid crystal panel that has a vertical alignment state when a voltage is not applied, and in which the liquid crystal molecules are tilted in the direction parallel to the substrate boundary by application of voltage. When the liquid crystal molecules are tilted in only one direction, such as in a vertical alignment mode that is not multi-domain, the viewing angle is narrowed by the effects of liquid crystal molecules that are oriented in a tilted direction, the same as in the aforementioned TN mode when a voltage is applied. Such measures as providing an irregular surface to the substrate are therefore taken in the multi-domain vertical alignment mode so as to create a plurality of domains in which the tilt directions differ from each other. Specifically, liquid crystal molecules that are tilted in a certain direction are optically compensated for by liquid crystal molecules of another domain that are tilted in a different direction, and the viewing angle is improved.

Although the liquid crystal molecules are in a tilted orientation when a voltage is applied, the film-compensated TN mode and the multi-domain vertical alignment mode have common characteristics in which the effects of tilted liquid crystal molecules are optically compensated, and the viewing angle is improved.

In contrast, liquid crystal molecules are not oriented at an angle with respect to the substrate even when a voltage is applied in an IPS or other lateral field mode, and these modes therefore create a fundamentally wide viewing angle.

FIG. 1 is a schematic sectional view of the IPS liquid crystal panel used in a first conventional liquid crystal display device described in Japanese Laid-open Patent Application No. 2002-296611. As shown in FIG. 1, in the first conventional liquid crystal panel 1300, liquid crystal molecules 1202 are provided between a pair of substrates 1200, 1201, and a pair of electrodes 1203, 1204 is disposed on the surface of the substrate 1201 that faces the liquid crystal molecules. The pair of electrodes 1203, 1204 is formed on the same layer and has a parallel electrode-type structure. The dimensions d, w, and L in the conventional IPS system satisfy the relations L/d>1 and L/w>1, wherein d is the cell gap, i.e., the distance between the pair of substrates 1200, 1201; w is the electrode width; and L is the distance between the pair of electrodes.

Specifically, the distance between the electrodes is larger than the cell gap and larger than the electrode width. As shown in the drawing, the direction in which the electrodes 1203, 1204 are oriented is defined as the Y direction, and the direction in which the substrates 1200, 1201 are layered is defined as the Z direction. The X direction is defined as the direction that is orthogonal to the Y direction and the Z direction, and the positive direction of each direction is shown in the drawing.

In the first conventional liquid crystal panel thus configured as described in Japanese Laid-open Patent Application No. 2002-296611, a lateral field E is generated between the pair of electrodes 1203, 1204 by applying a different voltage to the pair of electrodes 1203, 1204. The liquid crystal molecules that are positioned between the pair of electrodes 1203, 1204 are driven by this lateral field E. Since the liquid crystal molecules do not rotate within the XY plane and stand in the Z direction, the user does not observe the liquid crystal molecules from the direction in which the liquid crystal molecules have considerable refractive index anisotropy. Specifically, the aforementioned film-compensated TN mode and the multi-domain vertical alignment mode improve the viewing angle characteristics by reducing the effects of liquid crystal molecules that stand in a tilted direction, whereas the IPS system has markedly superior viewing angle characteristics due to the fact that the liquid crystal molecules do not stand in a tilted direction.

FIG. 2 is a schematic sectional view showing the liquid crystal panel used in a second conventional liquid crystal display device described in Japanese Laid-open Patent Application No. 2002-296611. This second conventional liquid crystal panel operates according to a Fringe Field/Switching (FFS) system that is a modified form of the IPS system. As shown in FIG. 2, in the second conventional liquid crystal panel 2300, liquid crystal molecules 2202 are provided between a pair of substrates 2200, 2201, an electrode 2204 as a first electrode is formed on the surface of the substrate 2201 that faces the liquid crystal molecules, an insulation film 2205 is layered on the surface of the electrode 2204 that faces the liquid crystal, and a second electrode 2203 is formed on the insulation film 2205. The electrode 2203 is comb-shaped, the same as the electrode described in relation to the first conventional liquid crystal panel, whereas the electrode 2204 is not patterned in a comb shape. As in the aforementioned first conventional liquid crystal panel, the dimensions d, w, and L in the FFS system satisfy the relations L/d=0 and L/w=0, wherein d is the cell gap, i.e., the distance between substrates 2200, 2201; w is the width of the electrode 2203; and L is the distance between the electrode 2203 and the electrode 2204. In other words, two types of electrodes are formed in different layers, i.e., a comb-shaped electrode 2203 is layered on the electrode 2204 via the insulation film 2205, and the inter-electrode distance L is therefore essentially zero.

In the second conventional liquid crystal panel thus configured as described in Japanese Laid-open Patent Application No. 2002-296611, a lateral field E is generated between the electrodes 2203, 2204 by applying different voltages to the electrodes 2203, 2204. However, the direction of this field differs from that of the aforementioned first liquid crystal panel because of the different electrode structure. Specifically, the electrodes 1203, 1204 in the aforementioned first liquid crystal panel according to the IPS system have a parallel electrode structure in which the electrodes 1203, 1204 are arranged parallel to the Y direction as viewed from the Z direction, and the field is therefore directed in the Y direction. However, since the electrodes 2203, 2204 in the FFS system have a layered electrode structure in which the electrodes 2203, 2204 are layered in the Z direction, there is a strong field component in the Y direction as well as in the Z direction, which is the direction perpendicular to the plane of the substrate, particularly near the edge of the electrode 2203.

As a result, there is almost no driving of liquid crystal molecules positioned above the electrodes in the IPS system even when the liquid crystal molecules 1202 positioned between the electrodes 1203, 1204 are driven, whereas both the liquid crystal molecules positioned between the electrodes 2203 and the liquid crystal molecules 2202 positioned above the electrodes 2203 are driven in the FFS system. Accordingly, when the electrodes are formed from a transparent conductive film composed of indium tin oxide (hereinafter abbreviated as ITO) or the like, the FFS system has advantages in that the electrode portion can also contribute to a display, and the transmittance can be increased relative to an IPS-type liquid crystal panel operating under the same conditions.

It is disclosed that the same effects are obtained by adopting, as another electrode structure in accordance with the FFS system, a parallel electrode structure in which electrodes are formed in the same layer as shown in FIG. 1, rather than a layered electrode structure such as the one shown in FIG. 2. In particular, the effects are obtained by setting the relationships L/d<1 and L/w<1, i.e., keeping the distance between the electrodes smaller than the cell gap and the electrode width.

However, the aforementioned conventional liquid crystal display device has such problems as the following. Specifically, since liquid crystal molecules that are above the electrodes cannot be driven in the conventional IPS system as described above, the transmittance of the liquid crystal panel decreases. Although the conventional electrode-layering-type FFS system differs from the conventional IPS system in that the liquid crystal molecules disposed above the electrodes can also be driven, the electrode structure is complex and requires an increased number of processes to fabricate, thus increasing the cost. These problems, i.e., the reduction in transmittance and the increased cost due to the increased number of fabrication processes, are particularly significant in applications involving small and mid-sized terminal devices.

SUMMARY OF THE INVENTION

An object of the present invention is to provide a liquid crystal display device whereby a high degree of transmittance can be achieved by a simple electrode structure, particularly in an in-plane switching (IPS) liquid crystal display device, and to provide a terminal device that utilizes the liquid crystal display device.

The liquid crystal display device according to the present invention comprises a substrate having at least a parallel electrode pair, a liquid crystal layer disposed on the substrate, and liquid crystal molecules in the liquid crystal layer that are driven by an electric field generated by the parallel electrode pair, wherein the electrode width of the parallel electrode pair is smaller than the thickness of the liquid crystal layer, the orientation of liquid crystal molecules between the electrodes is changed by the electric field generated by the parallel electrode pair, the orientation of liquid crystal molecules disposed above the electrodes is changed in the same direction as in the liquid crystal molecules between the electrodes in accordance with the change in orientation of the liquid crystal molecules between the electrodes, and the director of the liquid crystal molecules disposed above the electrodes is different from the direction of an electric field above the electrodes.

In the present invention, the orientation of liquid crystal molecules that are above the electrodes can be changed in the same direction as the orientation of liquid crystal molecules between the electrodes when a voltage is applied. Therefore, the transmittance, particularly above the electrodes, can be enhanced, and the transmittance of the liquid crystal display device can be increased, including the transmittance between the electrodes. The transmittance in the vicinity of an electrode can also be enhanced not only above the electrode but also between the electrodes. This effect is particularly significant in comparison to the conventional parallel electrode IPS system in which the electrode width is larger than the thickness of the liquid crystal layer. It is therefore possible to obtain a lateral-field-mode liquid crystal display device having high transmittance. Furthermore, rising of the liquid crystal molecules can be suppressed because the orientation of liquid crystals disposed above the electrodes is changed in accordance with the change of orientation of the liquid crystals between the electrodes in the liquid crystal display device of the present invention. As a result, the viewing angle characteristics can be enhanced.

The distance between the electrodes that constitute the parallel electrode pair is preferably equal to or greater than the width of the electrodes. The ratio of the electrode arrangement direction covered by the electric field that is generated by the parallel electrode pair can thereby be enhanced, and the device can therefore be driven at a low voltage.

The twist elastic constant of the liquid crystal molecules is preferably smaller than the bend elastic constant of the liquid crystal molecules. It is thus easier for the liquid crystal molecules disposed above the electrodes to change orientation in accordance with the change, induced by the electric field, in the orientation of the liquid crystal molecules between the electrodes. The transmittance of the liquid crystal layer disposed above the electrodes and in the vicinity of the electrodes can therefore be more efficiently enhanced.

The liquid crystal molecules of the liquid crystal layer preferably have positive dielectric anisotropy, and a liquid crystal layer disposed above the electrodes that constitute the parallel electrode pair preferably has liquid crystal molecules in which the director assumed by the liquid crystal molecules when an electric field is generated in the parallel electrode pair is an arrangement direction of the electrodes that constitute the parallel electrode pair. The transmittance of the liquid crystal layer disposed above the electrodes can thereby be more effectively enhanced.

The liquid crystal molecules of the liquid crystal layer may also have negative dielectric anisotropy. Since negative-type liquid crystal molecules that have negative dielectric anisotropy change orientation in a direction that is orthogonal to the electric field, the liquid crystal molecules can be more effectively prevented from following a longitudinal field than when positive-type liquid crystal molecules are used, and rotation in the XY plane can be further facilitated. The transmittance above the electrodes can thereby be significantly enhanced in relation to that of a positive-type liquid crystal. As a result, the transmittance of the liquid crystal display device, including the transmittance between the electrodes, can be increased. Since rising of the liquid crystal molecules can be suppressed, the viewing angle characteristics can also be enhanced.

The liquid crystal layer disposed above the electrodes that constitute the parallel electrode pair preferably has liquid crystal molecules in which the director assumed by the liquid crystal molecules when an electric field is generated in the parallel electrode pair is a longitudinal direction of the electrodes that constitute the parallel electrode pair. The transmittance, particularly above the electrodes, can thereby be enhanced in a liquid crystal display device that uses liquid crystals having negative dielectric anisotropy.

The combined value of the width of, and the gap between, the electrodes that constitute the parallel electrode pair is preferably equal to or less than the thickness of the liquid crystal layer. In particular, the liquid crystal orientation above the electrodes is brought to greater conformity with the liquid crystal orientation between the electrodes can thereby be enhanced, and the transmittance can be increased even further. Since the electric field in the arrangement direction of the electrodes can be strengthened, the operating voltage can be lowered, and power consumption can be reduced.

The parallel electrode pair may be formed in the same layer. This configuration dispenses with the need for a manufacturing process for layering the electrodes, and the cost of the liquid crystal display device can therefore be reduced.

The liquid crystal display device may also comprise an overcoat layer that is formed on the side of the parallel electrode pair that faces the liquid crystal layer, and between the electrodes that constitute the parallel electrode pair. Since surface irregularity caused by the electrodes can thereby be reduced, the pitch of the electrodes can be reduced without compromising the orientation properties, and a high contrast ratio can be obtained.

The liquid crystal display device may also have a planarizing layer between electrodes that constitute the parallel electrode pair. The gap between the electrodes is thereby filled by the planarizing layer, and a flat surface is formed. Therefore, not only can the orientation properties be enhanced in the same manner as in the case in which the abovementioned overcoat is provided, but the drive voltage can also be reduced because the planarizing layer is not provided above the electrodes.

The parallel electrode pair may also be formed from a transparent conductor. This configuration makes it possible to obtain some of the effects of the present invention whereby transmittance is increased, particularly above the electrodes.

The parallel electrode pair may also be composed of a metal. The thickness of the electrodes can thereby easily be reduced, and the transmittance of the regions near the electrodes can be enhanced. The transmittance of the liquid crystal display device can therefore be enhanced.

Reflection reducing means can also be provided to surface of the parallel electrode pair on the surface that faces the liquid crystal layer. The problem of lowered display quality caused by reflection of outside light at the metal surface can therefore be solved.

The electrode width of the parallel electrode pair is preferably 1 μm or less. The liquid crystal molecules disposed above the electrodes are thereby placed in the same orientation as the liquid crystal molecules between the electrodes, and the transmittance can therefore be further increased.

The liquid crystal display device may also operate in normally white mode. In the present invention, since the liquid crystal layer acts as a retardation film having uniform orientation, leakage of light during black display can be suppressed, and the contrast ratio of the display can be improved appreciably.

The parallel electrode pair may also have pixel magnifying means for optically magnifying the pixel image in the direction in which the electrodes are arrayed. In the present invention, since the liquid crystal layer has uniform orientation and transmittance fluctuation within the plane is suppressed, the pixel image magnified by the pixel magnifying means can attain uniform brightness, and high picture quality becomes possible. It is therefore possible to achieve a high-picture quality stereoscopic image display device or multi-picture image display device, or a bright liquid crystal display device having improved light utilization efficiency.

A feature of the liquid crystal display device according to the present invention is that the liquid crystal molecules disposed in proximity to the substrate between the electrodes are caused to undergo a change in orientation by an electric field generated by the parallel electrode pair; the liquid crystal molecules in a region disposed away from the proximity to the substrate in the thickness direction of the liquid crystal layer between the electrodes undergo a change in orientation in the same direction in association with the change in orientation; the liquid crystal molecules above the electrodes undergo a change in orientation in the same direction in association with the change in orientation of the liquid crystal molecules between the electrodes; the direction of the director of the liquid crystal molecules in the region disposed away from the proximity to the substrate between the electrodes is different from the direction of the electric field; and the direction of the director of the liquid crystal molecules above the electrodes is different from the direction of the electric field.

In the present invention, more of the liquid crystal molecules can undergo twisting deformation than with past formats, and, in particular, liquid crystals in regions away from the substrate are able to undergo twisting deformation, and thus higher transmittance can be achieved than in the prior art.

An electric field region wherein the electric field strength between the electrodes is equal to or less than the electric field strength over the electrodes may be present in the liquid crystal layer in the region thereof furthest away from the substrate in the thickness direction. By creating the electric field structure according to the present invention using the parallel electrode pair structure, it is possible to generate a weak electric field layer in a region in the liquid crystal furthest away from the substrate in the thickness direction, i.e., in proximity to the opposing substrate. By means of the weak electric field layer generated in this way, the liquid crystal layer disposed in proximity to the opposing substrate can readily undergo twisting deformation.

Moreover, the combined value of the width of, and the gap between, the electrodes constituting the parallel electrode pair is preferably equal to or less than the thickness of the liquid crystal layer. It will therefore be possible to confine a strong electric field of greater electric field strength than the weak electric field at a location in the liquid crystal layer disposed in proximity to the parallel electrode pair, and to generate the weak electric field in the region furthest away from the substrate in the liquid crystal layer.

A feature of the liquid crystal display device according to the present invention is that the liquid crystal molecules disposed in proximity to the substrate between the electrodes are caused to undergo a change in orientation by an electric field generated by the parallel electrode pair; the liquid crystal molecules in a center region in the thickness direction of the liquid crystal layer between the electrodes undergo a change in orientation in the same direction; the liquid crystal molecules above the electrodes undergo a change in orientation in the same direction in association with the change in orientation of the liquid crystal molecules between the electrodes; the direction of the director of the liquid crystal molecules of the center region in the thickness direction of the liquid crystal layer between the electrodes is different from the direction of the electric field; and the direction of the director of the liquid crystal molecules above the electrodes is different from the direction of the electric field.

In the present invention, since the electric field is weak in the center region in the thickness direction of the liquid crystal layer where the anchoring power of the orienting means of the liquid crystal layer is weakest, the liquid crystal molecules can move more freely, and it becomes possible for the liquid crystal to undergo twisting deformation more efficiently, and achieve even higher transmittance. Furthermore, since rising of the liquid crystal molecules in the direction perpendicular to the substrate is suppressed, the viewing angle characteristics can be enhanced. Moreover, since the liquid crystal layer can undergo twisting deformation in a uniform manner, it is possible to achieve a retardation film having a uniform phase retardation distribution within the plane.

An electric field region in which the electric field direction between the electrodes is perpendicular to the substrate face may be present in the liquid crystal layer in the region thereof furthest away from the substrate in the thickness direction. By creating the electric field structure according to the present invention using the parallel electrode pair structure, it is possible to generate a perpendicular electric field not only on the electrodes, but also between the electrodes. As a result, the equipotential lines join with the perpendicular electric fields originally present over the electrodes, and generate equipotential lines spanning above a plurality of electrodes. Accordingly, a weak electric field can be induced in proximity to the center of the liquid crystal layer in the thickness direction, and twisting deformation can take place more easily in the half of the liquid crystal layer lying towards the opposing substrate.

Furthermore, the combined value of the width of, and the gap between, the electrodes constituting the parallel electrode pair may be equal to half or less the thickness of the liquid crystal layer. It will therefore be possible to generate a weak electric field in the liquid crystal, on the side thereof lying closer to the opposing substrate from the approximate center.

Moreover, the liquid crystal molecules preferably have a twisting elastic constant that is smaller than the bending elastic constant. It will therefore be possible to suppress rising of the liquid crystal molecules towards the direction perpendicular to the substrate plane, as well as to enable the liquid crystal molecules in other regions to undergo twisting deformation in association with the liquid crystal molecules that have undergone twisting deformation by means of the electric field, improving the transmittance of the liquid crystal layer.

The liquid crystals of the liquid crystal layer may have positive dielectric anisotropy; and in the liquid crystal layer above the electrodes making up the parallel electrode pair, there are preferably liquid crystal molecules for which the direction of the director when the electric field is generated across the parallel electrode pair is coincident with the direction of array of the electrodes making up the parallel electrode pair. Particularly where employed in combination with the electric field structure of the present invention, this will permit the use of positive-type liquid crystals, which are typically inexpensive and have outstanding properties, and make it possible to improve transmittance.

Alternatively, the liquid crystals of the liquid crystal layer may have negative dielectric anisotropy; and in the liquid crystal layer above the electrodes making up the parallel electrode pair, there are preferably liquid crystal molecules for which the direction of the director when the electric field is generated across the parallel electrode pair is coincident with the lengthwise direction of the electrodes making up the parallel electrode pair. Since negative-type liquid crystal molecules having negative dielectric anisotropy undergo a change in orientation at a right angle to an electric field, they can be prevented from following a vertical electric field to a greater extent than where positive-type liquid crystal molecules are used, and rotation within the XY plane can facilitated. By so doing, transmittance on the electrodes can be improved appreciably as compared to positive-type liquid crystal molecules, and, as a result, high transmittance by the liquid crystal display device, including transmittance between the electrodes, can be attained. Moreover, rising of the liquid crystal molecules can be suppressed, and viewing angle characteristics can be enhanced.

Furthermore, the parallel electrode pair may be formed in the same layer. By so doing, the need for a process to stack the electrodes is obviated, and it is therefore possible to lower the cost of the liquid crystal display device.

An overcoat layer may be provided on the liquid crystal layer side of the parallel electrode pair, and between the electrodes making up this parallel electrode pair. By so doing, irregularities caused by the electrodes can be reduced, orientation will therefore not be adversely affected even where the electrode pitch is small, and higher contrast ratio can be achieved.

A planarizing layer may be provided between the electrodes making up the parallel electrode pair. Since the gap between the electrodes will thereby be filled in and planarized by the planarizing layer, not only will orientation be improved in a manner analogous to where the aforementioned overcoat has been provided, but the driving voltage can be reduced as well, since the planarizing layer is not disposed over the electrodes.

The parallel electrode pair may also be composed of a transparent dielectric. By so doing, it is possible in particular to enjoy some of the benefits of the present invention, namely, higher transmittance on the electrodes.

The parallel electrode pair may also be composed of metal. By so doing, it becomes easy to make the electrodes finer, as well as to improve transmittance of the region in proximity to the electrodes so that the transmittance and the liquid crystal display device can be improved.

The parallel electrode pair can also be provided with reflection reducing means on the surface thereof facing toward the liquid crystal layer. The problem of lowered display quality caused by reflection of outside light at the metal surface can therefore be solved.

The electrode width of the parallel electrode pair is preferably 0.5 µm or less. It is possible thereby to establish the thickness of the liquid crystal layer in the present invention within the range of about 5 µm, and possible as well for the anchoring energy of the orienting means to act effectively on orientation deformation, so that response time, particularly response time when off, can be improved.

Furthermore, a reverse-rotation domain preventing structure is preferably formed on the parallel electrode pair. It will be possible thereby to suppress the phenomenon whereby unwanted orientation deformation of the liquid crystal molecules, caused by the terminal portions of the parallel electrode pair, occurs and becomes propagated to the parallel electrode pair as a whole, and to achieve consistent twisting deformation.

The liquid crystal display device may also operate in normally white mode. In the present invention, since the liquid crystal layer acts as a retardation film having uniform orientation, leakage of light during black display can be suppressed, and the contrast ratio of the display can be improved appreciably.

The parallel electrode pair may also have pixel magnifying means for optically magnifying the pixel image in the direction in which the electrodes are arrayed. In the present invention, since the liquid crystal layer has uniform orientation and transmittance fluctuation within the plane is suppressed, the pixel image magnified by the pixel magnifying means can attain uniform brightness, and high picture quality becomes possible. It is therefore possible to achieve a high-picture quality stereoscopic image display device or multi-picture image display device, or a bright liquid crystal display device with improved light utilization efficiency.

The terminal device according to the present invention comprises the aforementioned liquid crystal display device.

The terminal device may be a mobile telephone, a personal information terminal, a gaming device, a digital camera, a video camera, a video player, a notebook-type personal computer, a cash dispenser, or a vending machine.

The present invention provides an IPS liquid crystal display device having a parallel electrode pair wherein the electrode width of the parallel electrode pair is made smaller than the thickness of the liquid crystal layer, the orientation of liquid crystal molecules between the electrodes is changed by the electric field generated by the parallel electrode pair, the orientation of liquid crystal molecules disposed above the electrodes is changed in the same direction as in the liquid crystal molecules between the electrodes in accordance with the change in orientation of the liquid crystal molecules between the electrodes, and the direction of the director of the liquid crystal molecules disposed above the electrodes is different from the direction of an electric field above the electrodes, whereby the transmittance above the electrodes and the transmittance in proximity to the electrodes can be increased, and the transmittance of the liquid crystal display device can thereby be increased with a simple electrode structure.

DESCRIPTION OF THE PREFERRED EMBODIMENTS

Figure 1:
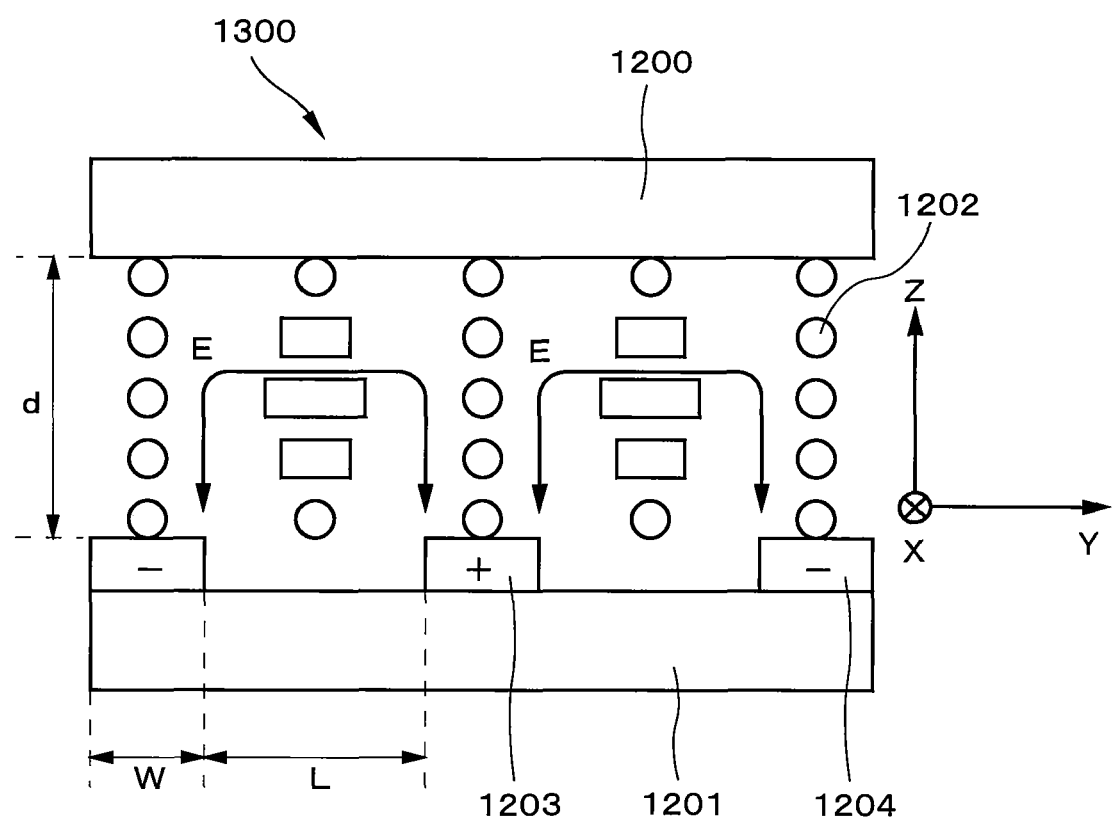
FIG. 1 is a schematic sectional view showing the IPS-type liquid crystal panel used in the first conventional liquid crystal display device described in Japanese Laid-Open Patent Application No. 2002-296611.
Figure 2:
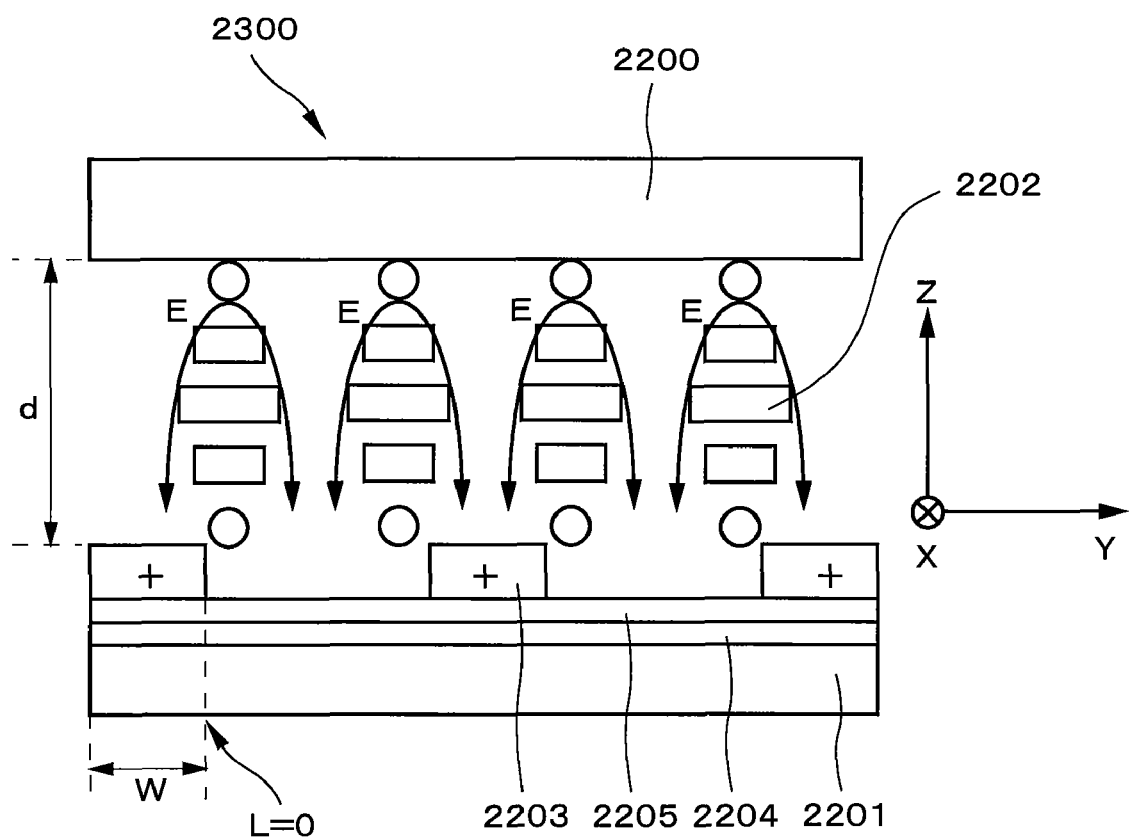
FIG. 2 is a schematic sectional view showing the FFS-type liquid crystal panel used in the second conventional liquid crystal display device described in Japanese Laid-Open Patent Application No. 2002-296611.
Figure 3:
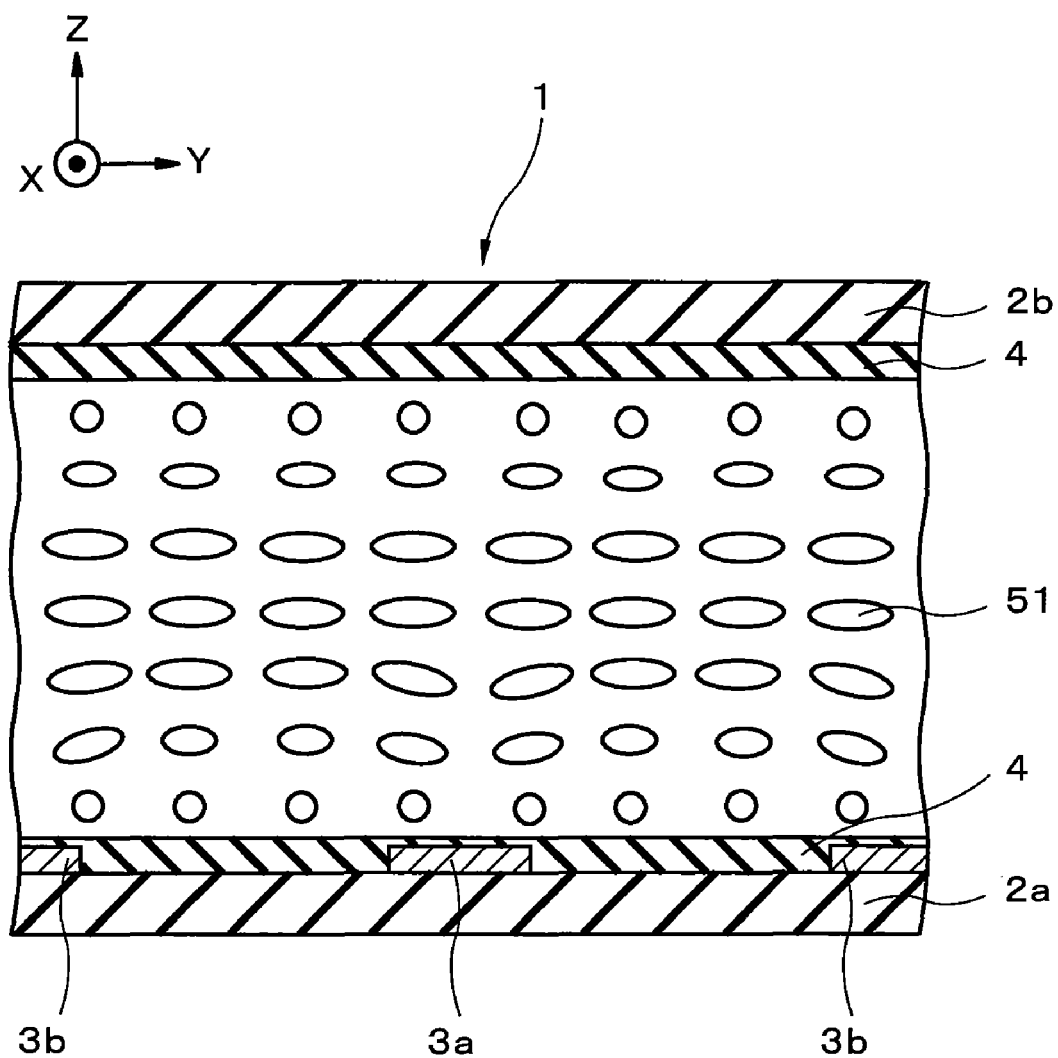
FIG. 3 is a sectional view showing a state in which a voltage is applied in the liquid crystal display device according to a first embodiment of the present invention.
Figure 4:
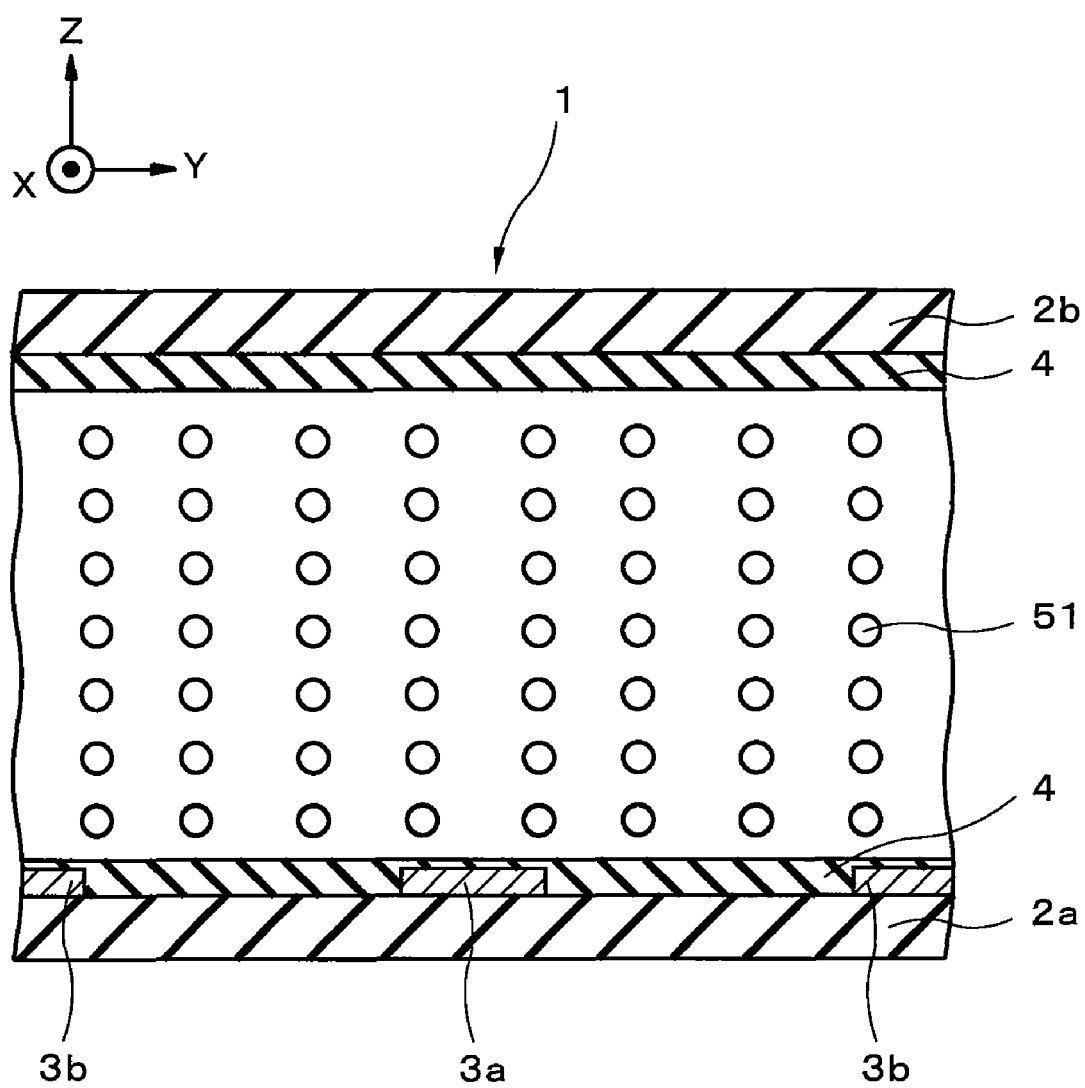
FIG. 4 is a sectional view showing the orientation state of liquid crystal molecules when a voltage is not applied between the shared electrode and pixel electrode that are constituent elements of the present embodiment.
Figure 5:
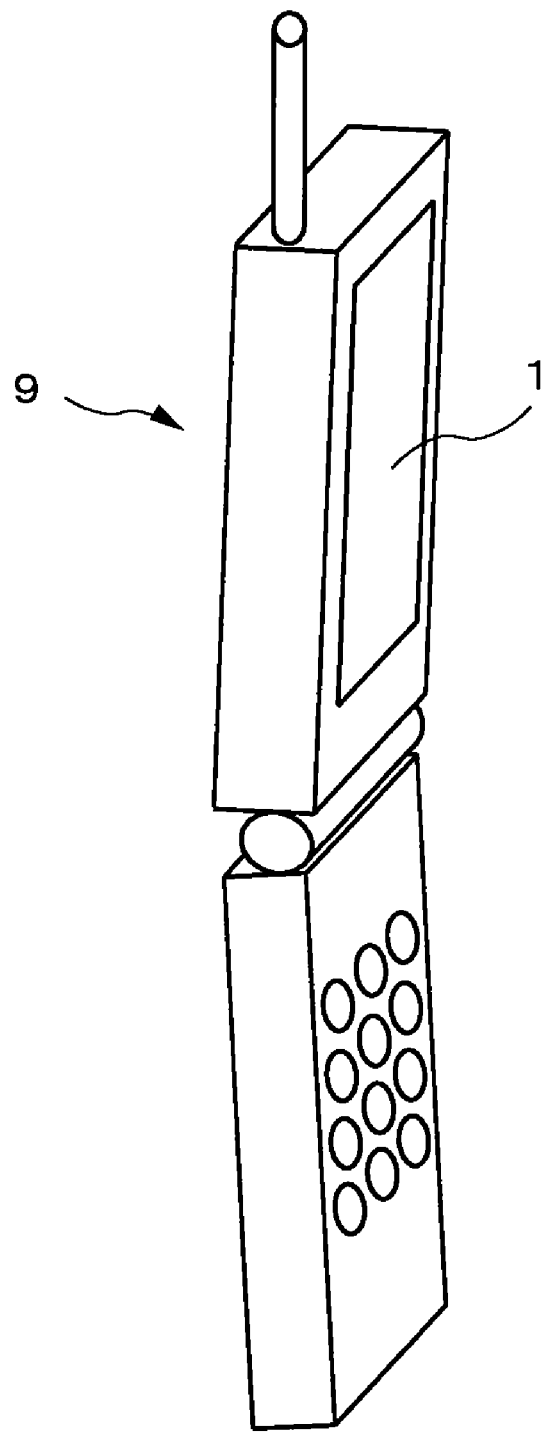
FIG. 5 is a perspective view showing a terminal device equipped with the liquid crystal display device according to the present embodiment.

The liquid crystal display device, and the terminal device that uses the liquid crystal display device according to embodiments of the present invention, will be described in detail hereinafter with reference to the accompanying drawings. The liquid crystal display device, and the terminal device that uses the liquid crystal display device according to a first embodiment of the present invention, will first be described. FIG. 3 is a sectional view showing a state in which a voltage is applied in the liquid crystal display device according to the present embodiment, FIG. 4 is a sectional view showing the orientation state of liquid crystal molecules when a voltage is not applied between the shared electrode and pixel electrode that are constituent elements of the present embodiment, and FIG. 5 is a perspective view showing a terminal device equipped with the liquid crystal display device according to the present embodiment.

In the liquid crystal display device 1 according to the present embodiment shown in FIG. 3, a principal substrate 2a and an opposing substrate 2b are provided so as to face each other across a very small gap, and two types of electrodes that include a pixel electrode 3a and shared electrodes 3b are formed on the surface of the principal substrate 2a that faces the opposing substrate 2b. These two types of electrodes are formed in a comb shape, and the pixel electrode 3a and the shared electrodes 3b are arranged so as to alternate with each other in the direction (transverse direction in FIG. 3) orthogonal to the longitudinal direction of the comb. These electrodes are composed of ITO (indium tin oxide) or another transparent conductor. An orientation film 4 for providing an initial orientation of the liquid crystal molecules is also formed on the surface that faces the opposing substrate 2b. An orientation film 4 is also formed in the same manner on the surface of the opposing substrate 2b that faces the principal substrate 2a. A layer composed of positive-type liquid crystal molecules 51 that have positive dielectric anisotropy is provided between the principal substrate 2a and the opposing substrate 2b. The gap between the principal substrate 2a and the opposing substrate 2b, i.e., the thickness of the layer composed of positive-type liquid crystal molecules 51, is set to 3 μm, for example. The thickness of the layer of liquid crystal molecules is referred to as the cell gap in the present embodiment. In an actual liquid crystal display device, light-guide plates are provided to both sides of the liquid crystal display device 1, but the light-guide plates are not shown in FIG. 3.

An XYZ orthogonal coordinate system is set up as described below for convenience in the present specification. The direction from the principal substrate 2a to the opposing substrate 2b is the +Z direction, and the opposite direction is the −Z direction. The +Z direction and the −Z direction are collectively referred to as the Z-axis direction. The transverse direction in FIG. 3 is the Y-axis direction, wherein the right-hand direction is the +Y direction, and the opposite direction is the −Y direction. The +X direction is the direction in which a right-handed coordinate system is established. Specifically, when a person's right thumb is in the +X direction, and the index finger is in the +Y direction, the middle finger is in the +Z direction.

When the XYZ orthogonal coordinate system is set up as described above, the direction in which the pixel electrode 3a and the shared electrode 3b are arranged in alternating fashion is the Y-axis direction. The direction in which the pixel electrode 3a or the shared electrode 3b extends, i.e., the longitudinal direction of the comb-shaped electrode, is the X-axis direction. The display surface of the liquid crystal display device 1 is the XY plane.

The pixel electrode 3a and the shared electrode 3b are formed so as to each have a width, i.e., an electrode width, of 1 μm, for example. The gap between the pixel electrode 3a and the shared electrode 3b, i.e., the inter-electrode distance, is set to 6 μm, for example. As described above, since the cell gap in the present embodiment is set to 3 μm, the electrode width is thus set so as to be smaller than the cell gap in the present embodiment.

As previously mentioned, in the IPS system used in the first conventional liquid crystal display device described in Japanese Laid-open Patent Application No. 2002-296611, the electrodes have a parallel structure in which L/d>1 and L/w>1. Specifically, the structure is defined so that the inter-electrode distance is larger than the cell gap and larger than the electrode width. However, the relation w/d<1 is satisfied in the present embodiment. Specifically, the electrode width is smaller than the cell gap.

The present embodiment has a parallel electrode structure, and therefore has a different electrode structure, particularly with respect to the layered electrode structure in the FFS system used in the second conventional liquid crystal display device described in Japanese Laid-open Patent Application No. 2002-296611. The present embodiment also particularly differs from the system that has a parallel electrode structure in accordance with the FFS system. The difference is that the inter-electrode distance is larger than the cell gap and the electrode width, whereas the aforementioned parallel-electrode-type FFS system is defined so that L/d<1 and L/w<1 (i.e., the inter-electrode distance is smaller than the cell gap and the electrode width).

When the group of liquid crystal molecules changes shape according to an electric field, an elastic force operates according to a splay elastic constant K11, a twist elastic constant K22, and a bend elastic constant K33 for each type of strain that includes splaying, twisting, and bending, respectively.

In an example, the positive-type liquid crystal molecules 51 have physical properties that include a refractive anisotropy Δn of 0.1 at a wavelength of 550 nm, a dielectric anisotropy $\Delta\in$ of 14, a dielectric constant of 18.4 in the direction parallel to the orientation vector of the liquid crystals, and elastic constants wherein K11=11.3 [pN] (picoNewtons), K22=6.9 [pN], and K33=11.6 [pN]. The twist elastic constant K22 is smaller than the bend elastic constant K33 in these liquid crystal molecules, and twisting occurs easily.

In the orientation state of the positive-type liquid crystal molecules 51 as shown in FIG. 4, the longitudinal direction of the liquid crystal molecules is oriented substantially in the X-axis direction in the initial state in which a voltage is not applied between the pixel electrode 3a and the shared electrode 3b. One of the two aforementioned light-guide plates disposed on both sides of the liquid crystal display device 1 is arranged so that the absorption axis thereof is in the longitudinal direction of the liquid crystal molecules, and the other light-guide plate is arranged so that the absorption axis thereof is orthogonal to that of the first light-guide plate.

When a ±5 V/60 Hz rectangular-wave voltage is applied between the shared electrode 3b and the pixel electrode 3a in the orientation state of the positive-type liquid crystal molecules 51, the orientation process has an anchoring effect near the boundaries of the principal substrate 2a and the opposing substrate 2b between the electrodes. The positive-type liquid crystal molecules 51 in these regions are therefore oriented substantially in the X-axis direction, but the molecules align with the Y-axis direction in conformity with the direction of the lateral field generated by the parallel electrodes as the distance from the substrate boundaries increases. In the orientation state of the liquid crystals disposed above the electrodes, the initial orientation remains in effect near the boundary of the opposing substrate 2b, the same as between the electrodes, but as the distance from the opposing substrate 2b increases, the liquid crystal molecules become oriented in the Y-axis direction in the same manner as between the electrodes. Although some rising towards the Z-axis direction is observed in the vicinity of the pixel electrode 3a or the shared electrode 3b in the principal substrate 2a, the thickness of the liquid crystal layer in this portion is less than 1 μm.

Specifically, as previously mentioned, there is almost no driving of the liquid crystal molecules disposed above the electrodes in the IPS system that is used in the first conventional liquid crystal display device described in Japanese Laid-open Patent Application No. 2002-296611. In the present embodiment, however, the liquid crystal molecules disposed above the electrodes become oriented in the Y-axis direction, which is the orientation direction of the liquid crystal molecules between the electrodes.

In both the parallel electrode structure and the layered electrode structure in the FFS system used in the second conventional liquid crystal display device described in Japanese Laid-open Patent Application No. 2002-296611, the orientation of the liquid crystal molecules disposed above the electrodes is changed by a strong Z-direction field component generated due to the small inter-electrode distance. However, most of the liquid crystal molecules disposed above the electrodes in the present embodiment change to an orientation in the Y-axis direction in conjunction with the change in orientation of the liquid crystal molecules between the electrodes.

As shown in FIG. 5, this liquid crystal display device 1 may be installed in a mobile telephone 9, for example.

Figure 6:
FIG. 6 is a micrograph showing the transmittance distribution of the liquid crystal display device when a voltage is not applied between the shared electrode and the pixel electrode.
Figure 7:
FIG. 7 is a micrograph showing the transmittance distribution of the liquid crystal display device when a ±5 V/60 Hz rectangular-wave voltage is applied between the shared electrode and the pixel electrode.
Figure 7:
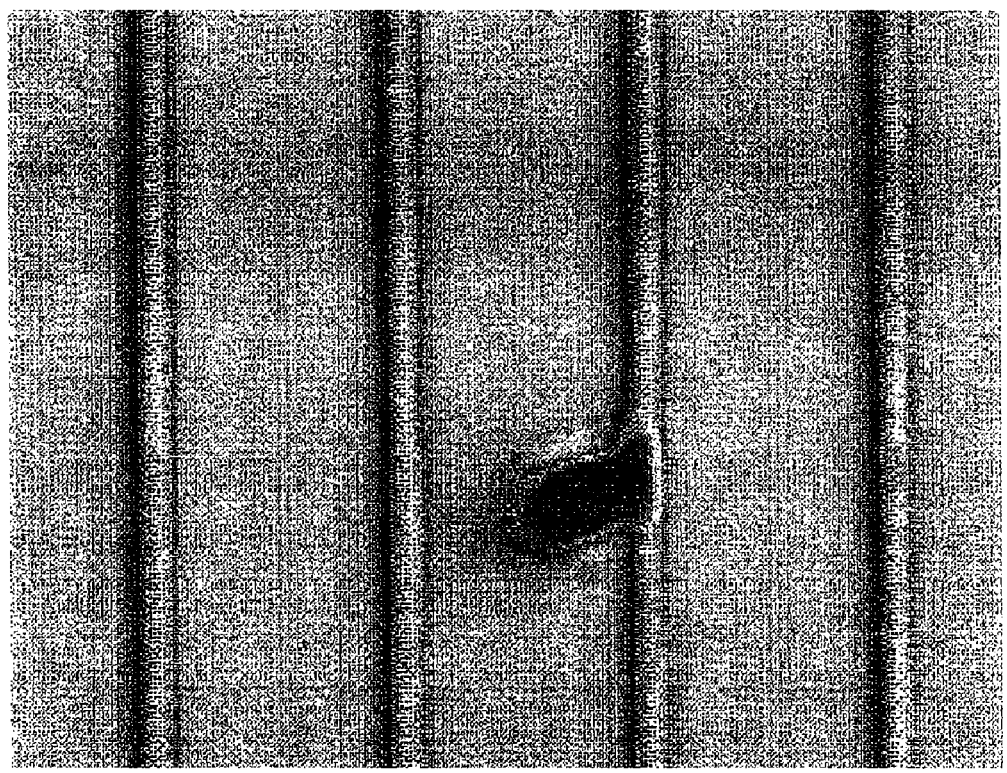
Figure 8:
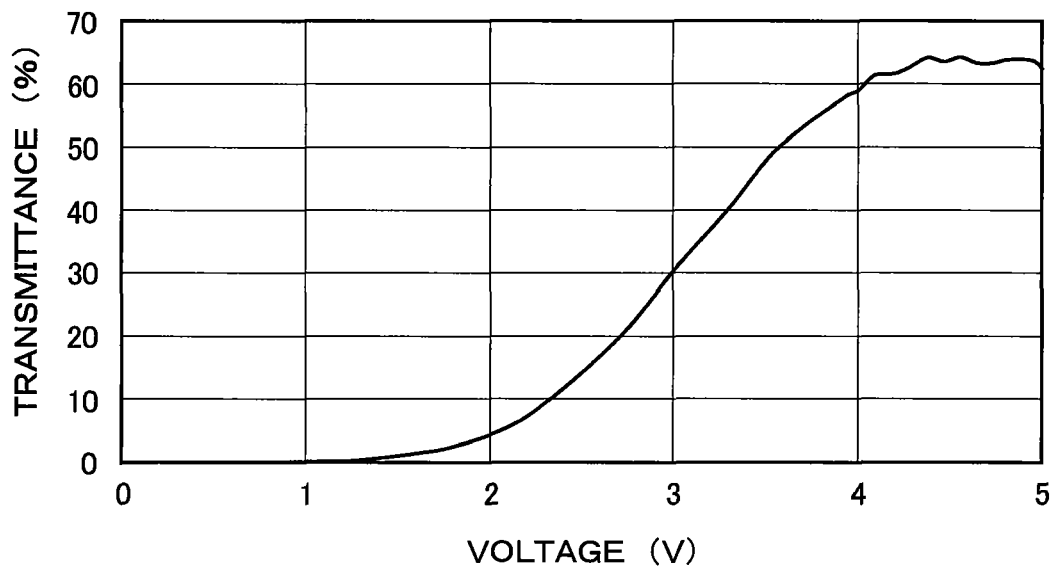
FIG. 8 is a graph obtained by measuring the voltage-transmittance characteristics in a region having a diameter of 1 µm in the central portion between the electrodes.
Figure 9:
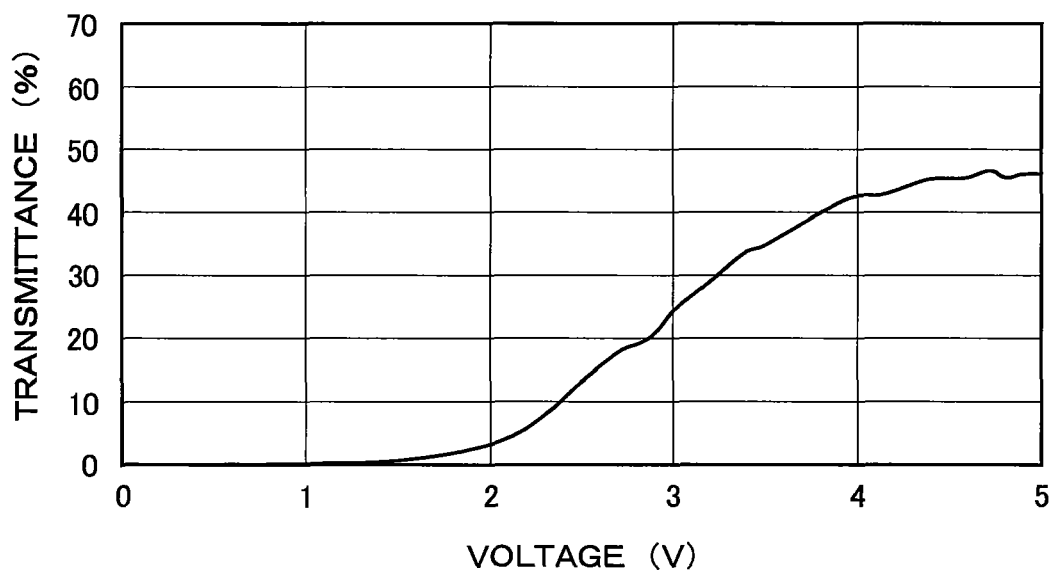
FIG. 9 is graph obtained by measuring the voltage-transmittance characteristics in a region having a diameter of 1 µm above the electrodes.
Figure 10:
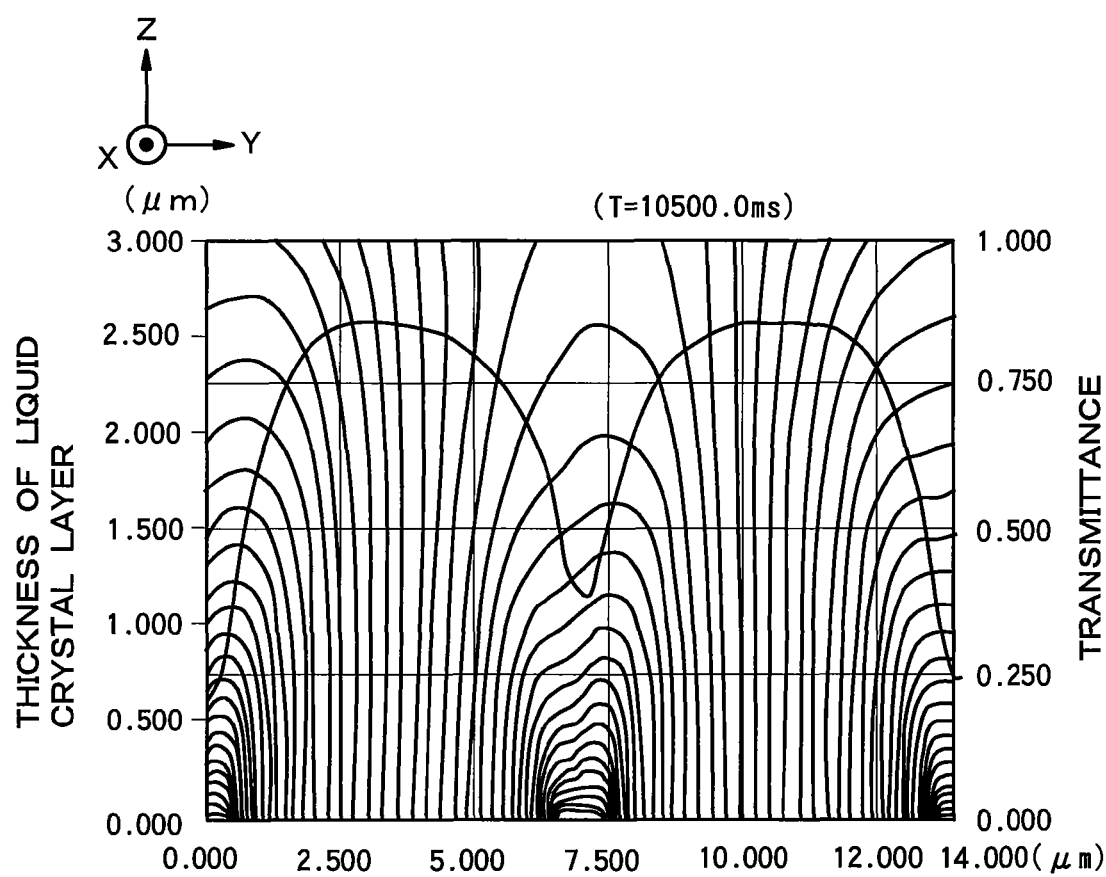
FIG. 10 shows the results of simulating the liquid crystal orientation, the field distribution, and the transmittance distribution of the present embodiment.
Figure 11:
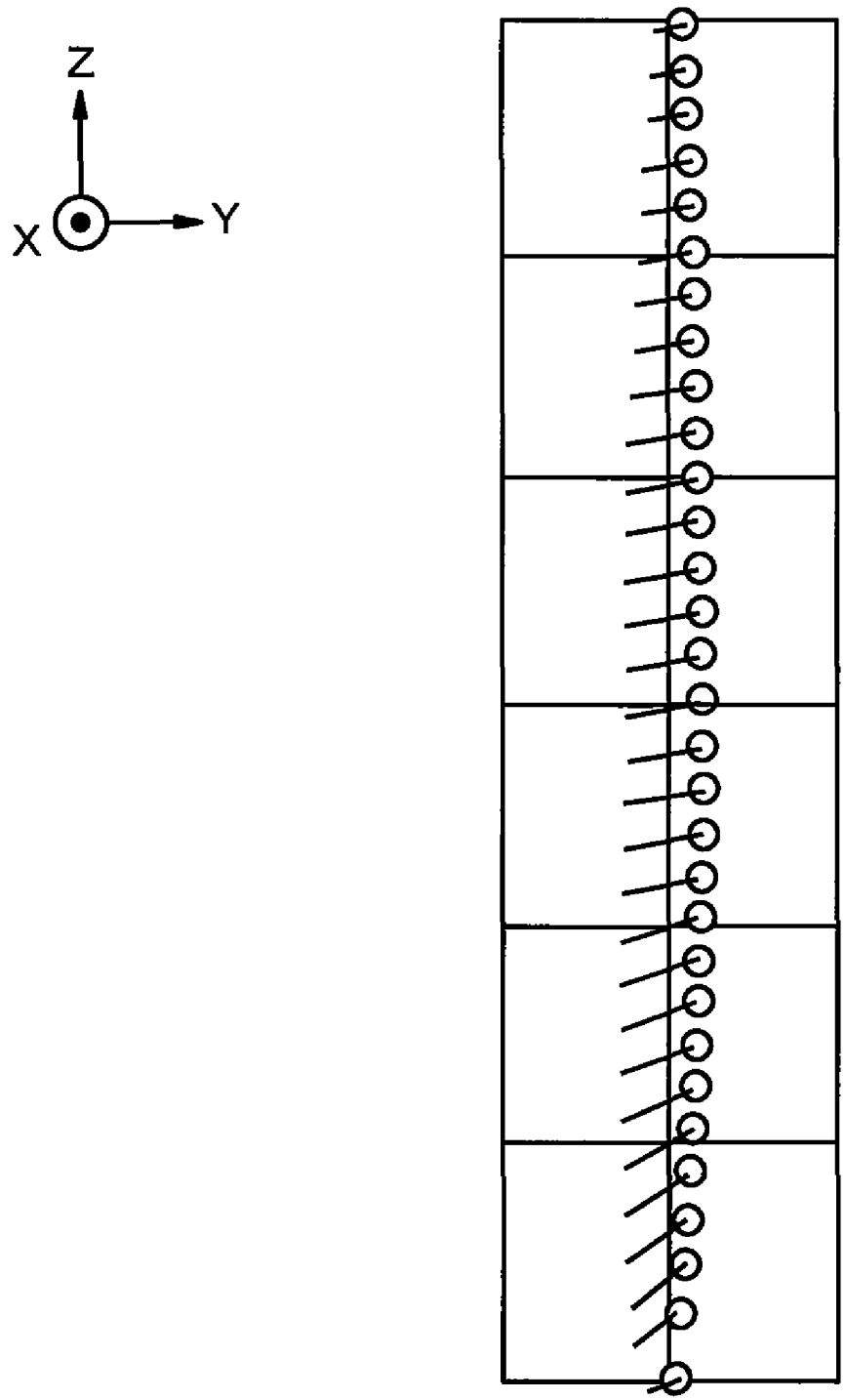
FIG. 11 is an enlarged view showing the liquid crystal orientation above the electrodes in the simulation results shown in FIG. 10.
Figure 12:
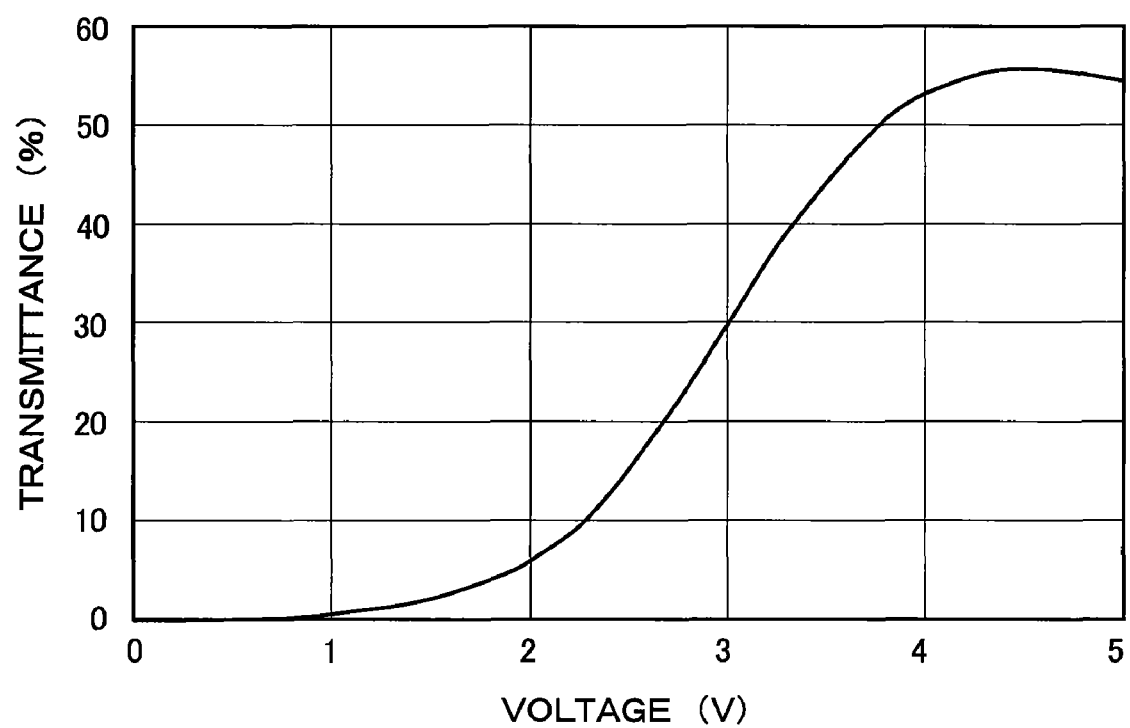
FIG. 12 is a graph obtained by measuring the voltage-transmittance characteristics in a region that has a diameter of 100 μm and includes an area above the electrodes and between the electrodes.

The operation of the liquid crystal display device configured as described above in accordance with the present embodiment will next be described. Specifically, the optical modulation operation of the liquid crystal display device according to the present embodiment will be described. FIG. 6 is a micrograph showing the transmittance distribution of the liquid crystal display device when a voltage is not applied between the shared electrode and the pixel electrode. FIG. 7 is a micrograph showing the transmittance distribution of the liquid crystal display device when a ±5 V/60 Hz rectangular-wave voltage is applied between the shared electrode and the pixel electrode. FIG. 8 is a graph obtained by measuring the voltage-transmittance characteristics in a region having a diameter of 1 μm in the central portion between the electrodes. FIG. 9 is graph obtained by measuring the voltage-transmittance characteristics in a region having a diameter of 1 μm above the electrodes. FIG. 10 shows the results of simulating the liquid crystal orientation, the field distribution, and the transmittance distribution in order to analyze the principle of operation when a voltage is applied in the liquid crystal display device. FIG. 11 is an enlarged view showing the liquid crystal orientation above the electrodes in the simulation results shown in FIG. 10. FIG. 12 is a graph obtained by measuring the voltage-transmittance characteristics in a region that has a diameter of 100 μm and includes an area above the electrodes and between the electrodes.

As shown in FIG. 6, when a voltage is not applied between the shared electrode and the pixel electrode, the longitudinal direction of the liquid crystal molecules matches the direction of the absorption axis of the light-guide plate, and since two light-guide plates are arranged so that the absorption axes thereof are orthogonal to each other, the transmittance is extremely low, creating a so-called black state.

As shown in FIG. 7, when a voltage is applied between the shared electrode and the pixel electrode, a white state occurs in which the transmittance is high. In the present embodiment, the transmittance is increased not only in the region between the electrodes, but also particularly in the region above the electrodes. FIG. 8 is a graph showing the results of measuring the voltage-transmittance characteristics in a region having a diameter of 1 μm in the central portion between the electrodes in order to analyze the transmittance value, and FIG. 9 is a graph showing the results of measuring the voltage-transmittance characteristics in the same manner in a region having a diameter of 1 μm above the electrodes. Ignoring the effects of the optical characteristics of the light-guide plates, the value of the transmittance was defined as 100% when the two light-guide plates are arranged so that the absorption axes thereof are parallel to each other. Voltages from 0 V to 5 V were applied. A maximum transmittance of 64% was obtained at a voltage of 4.5 V in the central portion between the electrodes. A maximum transmittance of 47% was obtained in the same manner at a voltage of 4.5 V above the electrodes. The transmittance value above the electrodes was larger than that of the conventional IPS system in which the electrode width is considerable.

In order for the transmittance above the electrodes to increase as a result of voltage application, the orientation direction of the liquid crystal molecules disposed above the electrodes must change so that the transmittance increases as a result of the voltage application. Specifically, the orientation vector of the liquid crystal molecules must change to the Y-axis direction in conformity with the liquid crystal molecules between the electrodes. The field distribution and the behavior of the liquid crystal molecules were therefore studied using a commercially available liquid crystal orientation simulator in order to analyze the change in orientation of the liquid crystal molecules disposed above the electrodes. The results of this simulation are shown in FIG. 10, but these results are mainly for the YZ plane. The field distribution is indicated by isoelectric lines at equal potentials. As shown in FIG. 10, the field was oriented in the Y-axis direction particularly near the center portion between the electrodes, and the liquid crystal molecules therefore rotated significantly in the Y-axis direction. In the near-substrate portion of the region between the electrodes, some of the liquid crystal molecules did not rotate to the Y-axis direction because of an anchoring effect caused by the orientation process, but the ratio thereof with respect to the Z-axis direction was extremely small. In the region above the electrodes, however, the field was oriented substantially in the +Z direction, and the liquid crystal molecules that were in extreme proximity to the electrodes were therefore observed to rise somewhat due to the longitudinal field that occurred in the Z-axis direction (see FIG. 11), but the ratio of the angle thereof to the Z-axis direction was small. It is apparent that most of the liquid crystal molecules did not conform to the direction of the field, but rotated significantly in the Y-axis direction in the same manner as the liquid crystal molecules between the electrodes. Specifically, in the region above the electrodes that was outside the vicinity of the electrodes, the liquid crystal molecules rotated to the Y-axis direction in accordance with the orientation of liquid crystal molecules between the electrodes, rather than changing orientation to the direction of the longitudinal field oriented in the Z-axis direction. As a result, the transmittance above the electrodes increased.

The fact that the electrode width was smaller than the cell gap is cited as one reason that the liquid crystal molecules disposed above the electrodes went against the longitudinal field and followed the orientation of the liquid crystal between the electrodes. Since the region adjacent to the liquid crystal molecules between the electrodes was thereby made larger than the regions adjacent to the substrate boundaries, it was easier for the liquid crystal molecules disposed above the electrodes to conform to the orientation of the liquid crystal between the electrodes rather than be restricted to the initial orientation of the substrate boundaries. In the conventional IPS system described in Japanese Laid-open Patent Application No. 2002-296611, there is almost no change in the orientation of the liquid crystal molecules disposed above the electrodes from the initial state when a voltage is applied, and the reason for this is considered to be that the restrictive effect at the substrate boundaries is greater. In the present embodiment, since the electrode width was smaller than the cell gap, there was a relative decrease in the restrictive effect at the substrate boundaries, and it was easier for liquid crystal molecules to conform to the liquid crystal orientation between the electrodes.

Specifically, the liquid crystal molecules disposed above the electrodes show that it is more energetically stable to go against the electric field and twist in accordance with the liquid crystal orientation between the electrodes than to go against the electric field and remain in the initial orientation.

The conforming of the liquid crystal molecules disposed above the electrodes to the liquid crystal orientation between the electrodes also makes it easier for the liquid crystal molecules near the electrodes to twist than in the conventional IPS system, and effects are therefore obtained whereby the transmittance between the electrodes is enhanced.

As in the positive-type liquid crystal molecules 51 in the present embodiment, reducing the twist elastic constant K22 to be less than the bend elastic constant K33 of the liquid crystal molecules allows the free energy at the time of twisting to be reduced, making it easier for the liquid crystal molecules disposed above the electrodes to twist in conformity with the liquid crystal molecules between the electrodes. The transmittance of the liquid crystal layer disposed above the electrodes can thereby be more efficiently enhanced.

As shown in FIG. 12, the maximum transmittance in the present embodiment was 56%, which was 1.3 times higher than the transmittance in the conventional IPS system in the below-described first comparative example of the present invention.

In the liquid crystal display device of the present invention, the liquid crystal molecules disposed above the electrodes can be caused to orient themselves in the same direction as the liquid crystal molecules between the electrodes when a voltage is applied in a lateral-field-mode liquid crystal display device that has comb-shaped parallel electrodes. The transmittance above the electrodes in particular can therefore be enhanced, and the transmittance of the liquid crystal display device can be increased, including the transmittance between the electrodes. Furthermore, the transmittance of the region near the electrodes can be increased not only above the electrodes but also between the electrodes. Since these effects are particularly significant in comparison to the conventional parallel-electrode-type IPS system in which the electrode width is equal to or greater than the cell width, a lateral-field-mode liquid crystal display device having high transmittance can be obtained.

When compared to the conventional layered-electrode-type FFS system in particular, the transmittance can be increased in the liquid crystal display device of the present invention by a parallel-electrode-type structure in which the electrodes are not layered. Since the liquid crystal display device can thereby be obtained without the use of a complicated layering process, the cost of the liquid crystal display device can be reduced.

When compared to the conventional parallel-electrode-type FFS system in particular, a large space can be provided between the pixel electrode and the shared electrode in the liquid crystal display device of the present invention. The likelihood of short circuiting between the electrodes can therefore be reduced, and the liquid crystal display device can be manufactured with a high yield.

Furthermore, in any of the layered-electrode-type or parallel-electrode-type FFS systems, the orientation of the liquid crystal molecules disposed above the electrodes is changed by a strong Z-direction field component generated due to the small distance between the electrodes, whereas the orientation of the liquid crystal disposed above the electrodes is changed so as to conform to the change in orientation of the liquid crystal between the electrodes in the liquid crystal display device of the present invention. Rising of the liquid crystal molecules in the Z-axis direction can therefore be suppressed. As a result, since rising of the liquid crystal molecules in a tilted direction can be suppressed in comparison to the FFS system, the viewing angle characteristics can be enhanced.

The orientation directions of the liquid crystal molecules between the electrodes and the liquid crystal molecules disposed above the electrodes can also be aligned with each other in the liquid crystal display device of the present invention. The refractive index distribution in the Y-axis direction can therefore be reduced, which makes it possible to suppress diffraction. Since contrast is reduced by light that is propagated by diffraction in a tilted direction, suppressing this diffraction results in increased contrast and improves other viewing angle characteristics.

The transmittance of the liquid crystal display device is high in a mobile terminal device that is equipped with the liquid crystal display device of the present invention, and a bright display is therefore possible. The intensity of the backlight can also be reduced when the display is used at about the conventional luminance level, thereby enabling reduced power consumption. If the usual amount of power can be used at about the conventional luminance level, the enhanced transmittance can be applied to increase the number of pixels, thereby enabling more information to be displayed. This effect applies particularly to a mobile terminal device in which the screen size is limited.

An example was described in which the pixel electrode and shared electrode were composed of ITO or another transparent conductor in the liquid crystal display device of the present embodiment, but the present invention is not limited by this configuration, and the pixel electrode and shared electrode may be composed of an optically nontransparent metal. Aluminum and other metals are generally more workable than ITO, and therefore facilitate reduction of the electrode thickness. Although the ratio at which the orientation above the electrodes contributes to enhanced transmittance is slightly reduced by making the electrodes nontransparent, effects of enhanced transmittance are obtained by also reducing the thickness in the regions near the electrodes as previously described. The overall transmittance can therefore be enhanced. The electrode width is preferably minimized when the electrodes are formed from a metal in this manner, and an electrode width of less than 1 μm is particularly preferred.

The liquid crystal display device of the present embodiment was also described as having orientation films at the boundaries of the liquid crystal molecules and the substrates, but the present invention is not limited by this configuration. The orientation films are unnecessary when the liquid crystal molecules are treated so as to be aligned in a prescribed direction, and are not essential components of the present invention.

A case was also described in which the pixel electrode and the shared electrode were formed in the same layer in the liquid crystal display device of the present embodiment, but the present invention is not limited by this configuration. The pixel electrode and shared electrode may be formed in different layers insofar as there is a parallel electrode structure, and an insulation layer may be formed between the different electrode layers. When the present invention is applied to an active-matrix-type display device in particular, the pixel electrode and shared electrode can be formed using a gate electrode and a source or drain electrode for forming a pixel thin-film transistor, and since there is no need to provide a new layer for use in a parallel electrode, the cost can be reduced.

The longitudinal direction of the pixel electrode and shared electrode was described as being the X-axis direction, but the present invention is not limited by this configuration. The pixel electrode and shared electrode may be tilted with respect to the X-axis direction, and this tilt may have a value that varies according to the coordinates on the X axis to create a multi-domain configuration.

As previously mentioned, the liquid crystal display device of the present invention may be suitably applied in a mobile telephone or other mobile terminal device. Compatible mobile terminal devices may include not only mobile telephones, but also PDAs (Personal Digital Assistant), gaming devices, digital cameras, digital video cameras, and various other types of mobile terminal devices. The liquid crystal display device of the present invention may be applied not only to mobile terminal devices, but also to notebook-type personal computers, cash dispensers, vending machines, and various other types of terminal devices.

Figure 13:
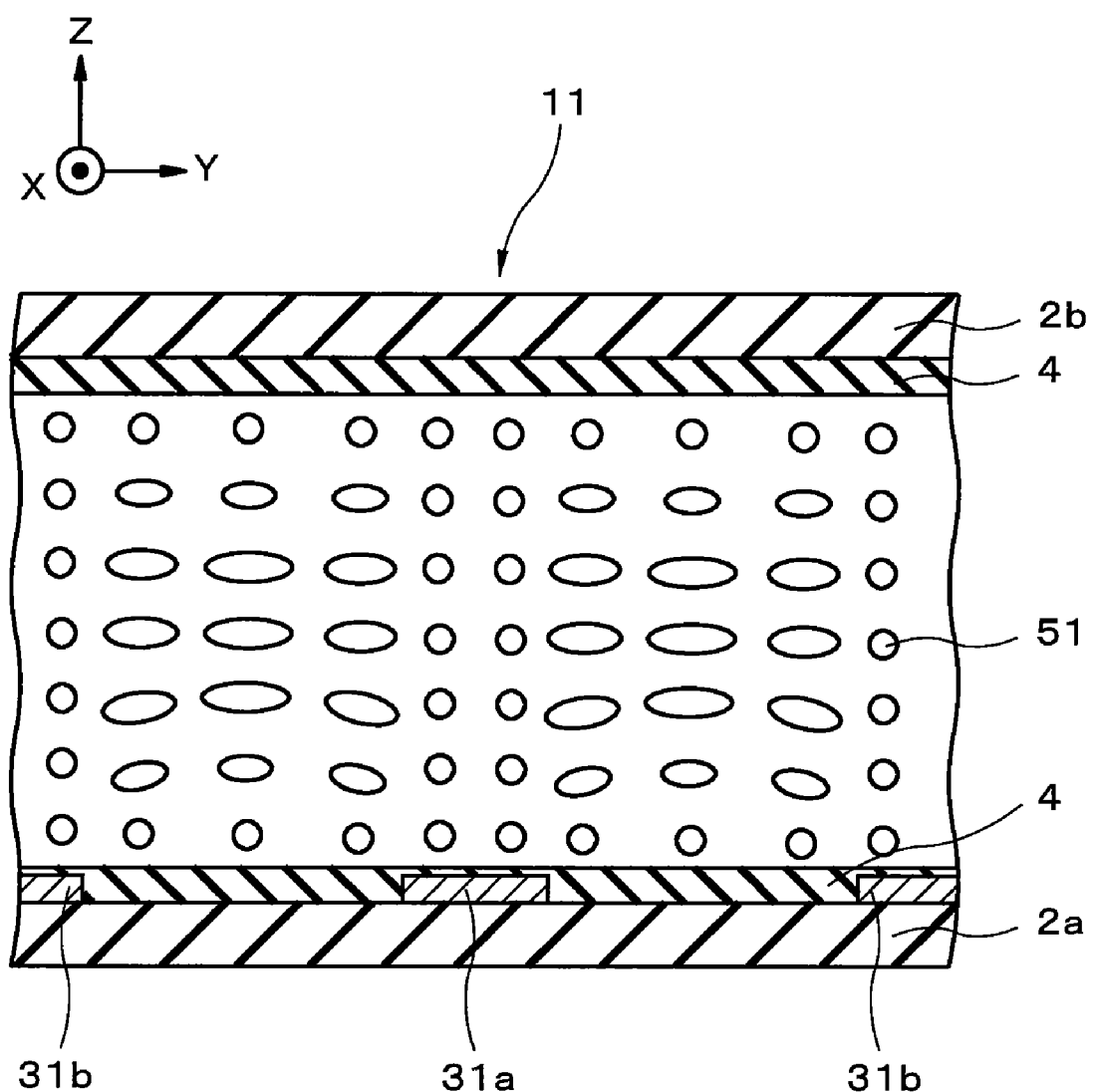
FIG. 13 is a sectional view showing a state in which a voltage is applied in the liquid crystal display device according to a first comparative example of the present invention.
Figure 14:
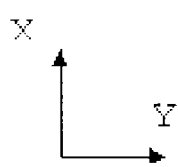
FIG. 14 is a micrograph showing the transmittance distribution of the liquid crystal display device when a ±5 V/60 Hz rectangular-wave voltage is applied between the shared electrode and the pixel electrode.
Figure 14:
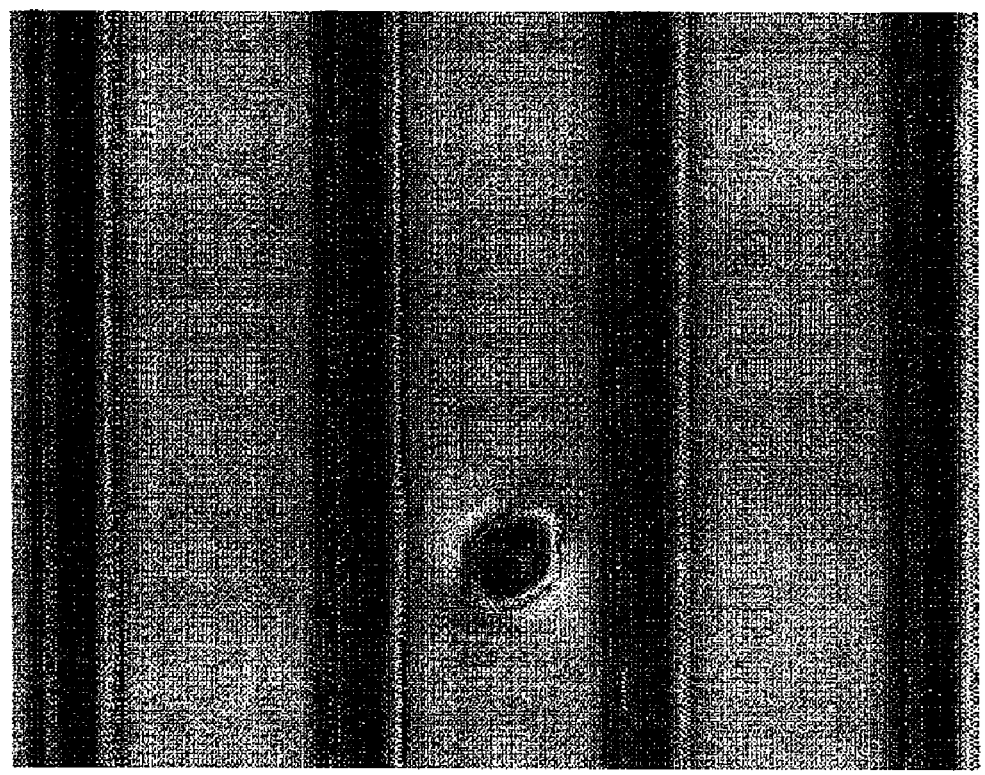
Figure 15:
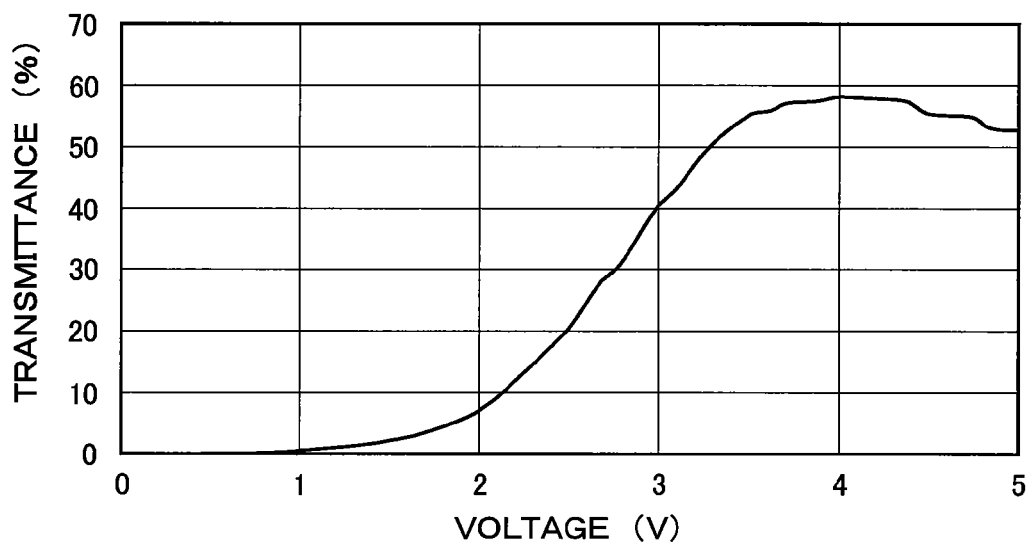
FIG. 15 is a graph obtained by measuring the voltage-transmittance characteristics in a region having a diameter of 1 μm in the center portion between the electrodes.
Figure 16:
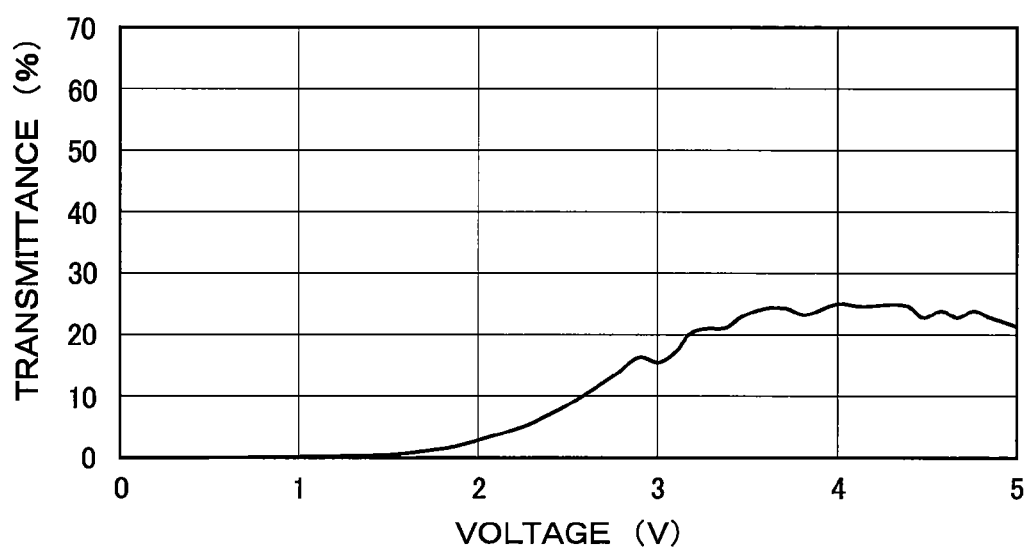
FIG. 16 is a graph obtained by measuring the voltage-transmittance characteristics in a region having a diameter of 1 μm above the electrodes.
Figure 17:
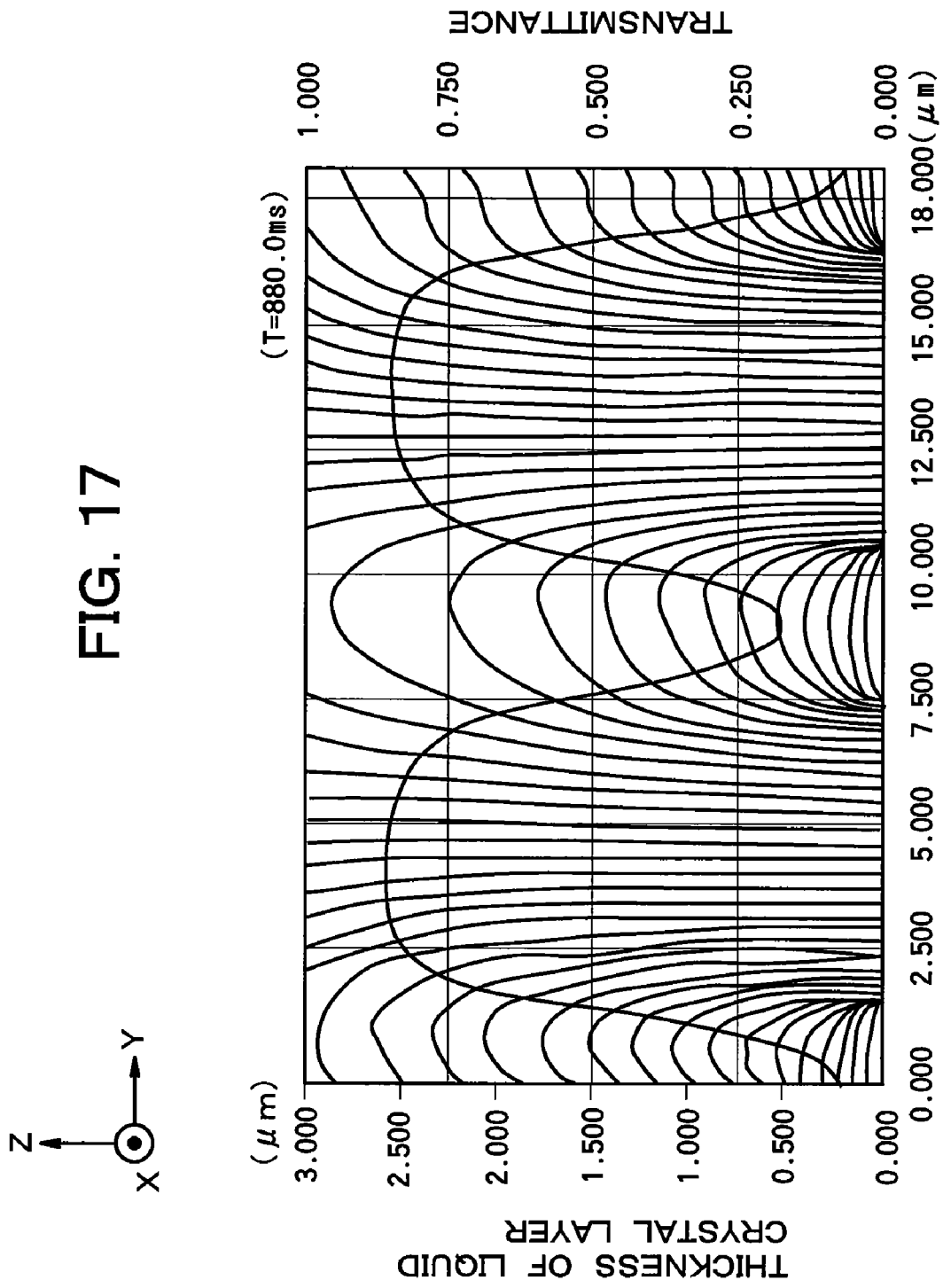
FIG. 17 shows the results of simulating the liquid crystal orientation, the field distribution, and the transmittance distribution of the present embodiment.
Figure 18:
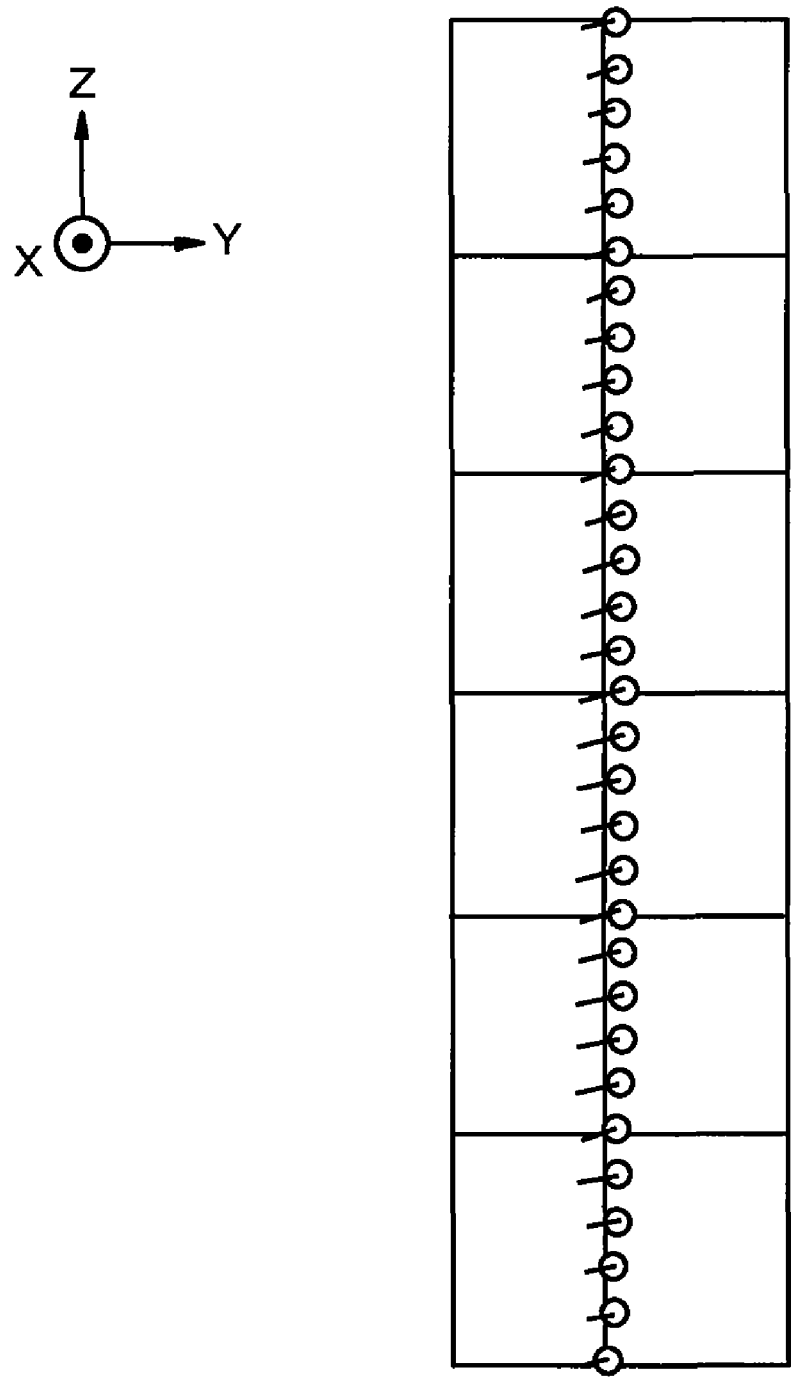
FIG. 18 is an enlarged view showing the liquid crystal orientation above the electrodes in the simulation results shown in FIG. 17.
Figure 19:
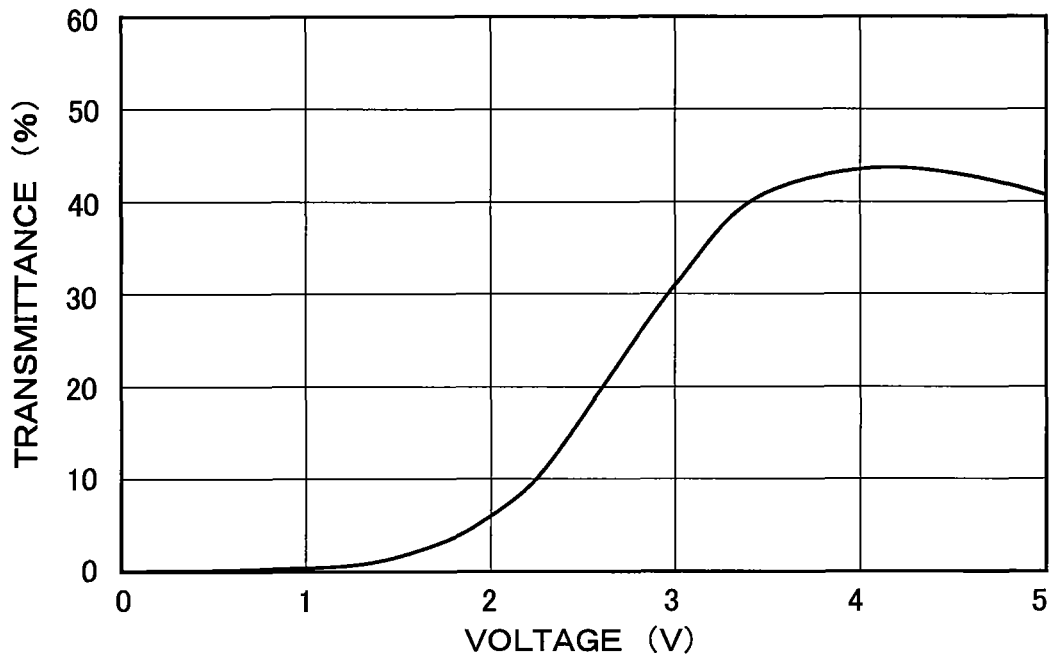
FIG. 19 is a graph obtained by measuring the voltage-transmittance characteristics in a region that has a diameter of 100 μm and includes an area above the electrodes and between the electrodes.

A first comparative example related to the liquid crystal display device of the present invention will next be described. FIG. 13 is a sectional view showing a state in which a voltage is applied in the liquid crystal display device according to the present comparative example. FIG. 14 is a micrograph showing the transmittance distribution of the liquid crystal display device of the present comparative example when a ±5 V/60 Hz rectangular-wave voltage is applied between the shared electrode and the pixel electrode. FIG. 15 is a graph obtained by measuring the voltage-transmittance characteristics in a region having a diameter of 1 μm in the center portion between the electrodes. FIG. 16 is a graph obtained by measuring the voltage-transmittance characteristics in a region having a diameter of 1 μm above the electrodes. FIG. 17 shows the results of simulating the liquid crystal orientation, the field distribution, and the transmittance distribution in order to analyze the principle of operation when a voltage is applied in the liquid crystal display device. FIG. 18 is an enlarged view showing the liquid crystal orientation above the electrodes in the simulation results shown in FIG. 17. FIG. 19 is a graph obtained by measuring the voltage-transmittance characteristics in a region that has a diameter of 100 μm and includes an area above the electrodes and between the electrodes.

As shown in FIG. 13, the liquid crystal display device 11 according to the first comparative example differs from the liquid crystal display device 1 of the first embodiment in that the electrode width is set to a large value. Specifically, the electrode width of the pixel electrode 3a and the shared electrode 3b was 1 μm in the first embodiment, whereas the pixel electrode 31a and the shared electrode 31b in the first comparative example are formed so as to have an electrode width of 3 μm. Since the value of the cell gap is set to 3 μm as in the first embodiment, the electrode width and the cell gap are the same in the present comparative example.

Furthermore, the orientation process in the orientation state of the positive-type liquid crystal molecules 51 under an applied voltage has an anchoring effect near the boundaries of the principal substrate 2a and the opposing substrate 2b between the electrodes. The positive-type liquid crystal molecules 51 in these regions are therefore oriented substantially in the X-axis direction, but align with the Y-axis direction in conformity with the direction of the lateral field generated by the parallel electrodes as the distance from the substrate boundaries increases. This aspect is the same as in the first embodiment. In the orientation state of liquid crystals disposed above the electrodes, the initial orientation remains in effect near the boundary of the opposing substrate 2b, the same as between the electrodes, but the liquid crystal molecules do not align in the Y-axis direction as the distance from the opposing substrate 2b increases, and the initial orientation state is maintained. Specifically, in the first embodiment, the liquid crystal molecules disposed above the electrodes were aligned in the Y-axis direction in the portion distant from the opposing substrate 2b, whereas the liquid crystal molecules do not align in the Y-axis direction in the present comparative example. Other aspects of the present comparative example are the same as in the first embodiment.

The first comparative example is the same as the IPS system that is used in the first conventional liquid crystal display device described in Japanese Laid-open Patent Application No. 2002-296611. Specifically, the first comparative example is of a case in which the electrode width is equal to or greater than the cell gap, and there is almost no driving of the liquid crystal molecules that are above the electrodes.

The operation of the liquid crystal display device according to the present comparative example configured as described above will next be described. As shown in FIG. 14, when a voltage is applied between the shared electrode and the pixel electrode, the transmittance increases to create a white state. However, in the present comparative example, the transmittance in the region between the electrodes increased, and the area observed in the photograph appears bright, but the region above the electrodes appears dark and has significantly reduced transmittance. FIG. 15 is a graph showing the results of measuring the voltage-transmittance characteristics in a region having a diameter of 1 μm in the central portion between the electrodes in order to analyze the transmittance value, and FIG. 16 is a graph showing the results of measuring the voltage-transmittance characteristics in the same manner in a region having a diameter of 1 μm above the electrodes. Voltages from 0 V to 5 V were applied. A maximum transmittance of 59% was obtained at a voltage of 4.1 V in the central portion between the electrodes. Above the electrodes, however, the transmittance obtained in the same manner reached a maximum of 24% at a voltage of 4.1 V. Specifically, substantially the same effects as those of the first embodiment were evident in the value of the transmittance between the electrodes, whereas the value of the transmittance above the electrodes was significantly reduced.

A commercially available liquid crystal orientation simulator was then used to analyze the field distribution, the transmittance distribution, and the orientation of the liquid crystal molecules in order to investigate the decrease in transmittance above the electrodes. The results of the simulation are shown in FIG. 17. FIG. 18 is an enlarged view showing, in particular, the liquid crystal orientation above the electrodes in the results shown in FIG. 17. As shown in FIG. 17, the field was oriented in the Y-axis direction particularly near the center portion between the electrodes, and the liquid crystal molecules therefore rotated significantly in the Y-axis direction. This resulted in increased transmittance. The transmittance was reduced in the region above the electrodes because the liquid crystal molecules disposed above the electrodes were hardly in any conformity with the orientation change between the electrodes, and the initial orientation was maintained, as shown in FIG. 18. Specifically, it was apparent that in the conventional IPS system, there is almost no driving of liquid crystal molecules that are disposed above the electrodes. As a result, the transmittance above the electrodes does not increase.

As shown in FIG. 19, the maximum transmittance above the electrodes and between the electrodes was 44%, which was 1.3 times lower than in the first embodiment. It was thus confirmed that since the liquid crystal molecules disposed above the electrodes did not contribute to increased transmittance in the conventional IPS system, the transmittance of the liquid crystal display device was reduced.

Figure 20:
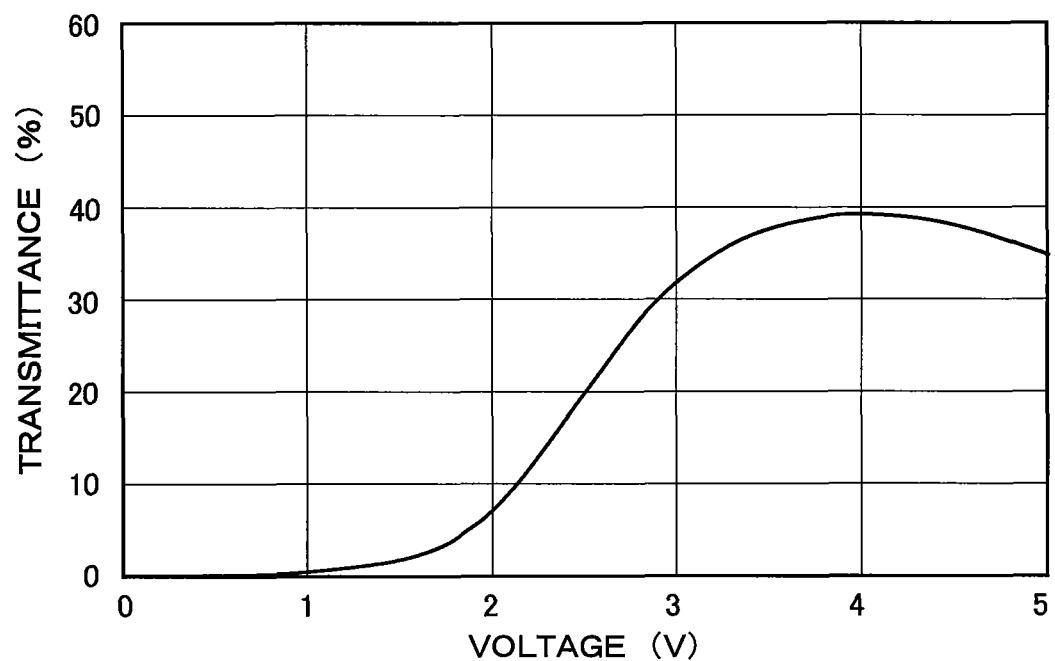
FIG. 20 is a graph obtained by measuring the voltage-transmittance characteristics in a region that has a diameter of 100 μm and includes an area above the electrodes and between the electrodes in the liquid crystal display device according to a second comparative example of the present invention.

A second comparative example related to the liquid crystal display device of the present invention will next be described. FIG. 20 is a graph obtained by measuring the voltage-transmittance characteristics in a region that has a diameter of 100 μm and includes an area above the electrodes and between the electrodes in the liquid crystal display device according to the present comparative example.

The present comparative example differs from the first comparative example in that the electrode width is set to an even larger value. Specifically, the electrode width in the first comparative example was 3 μm, whereas the electrode width in the present comparative example is 6 μm. Other aspects of the present comparative example are the same as in the first comparative example.

As shown in FIG. 20, the maximum transmittance in the present comparative example decreased to 39%. Specifically, it was apparent that the transmittance decreased as the electrode width was increased in relation to the cell gap.

Figure 21:
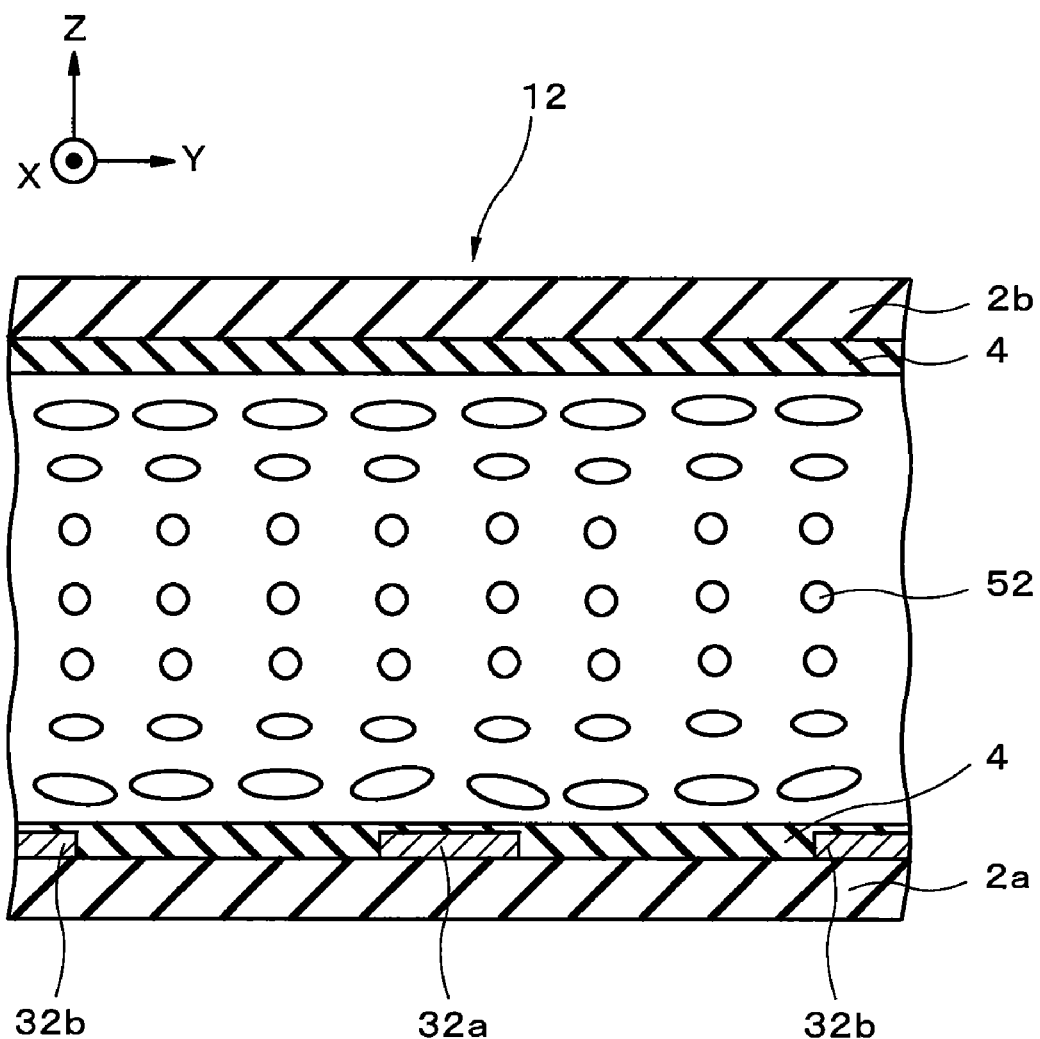
FIG. 21 is a sectional view showing a state in which a voltage is applied in the liquid crystal display device according to a second embodiment of the present invention.
Figure 22:
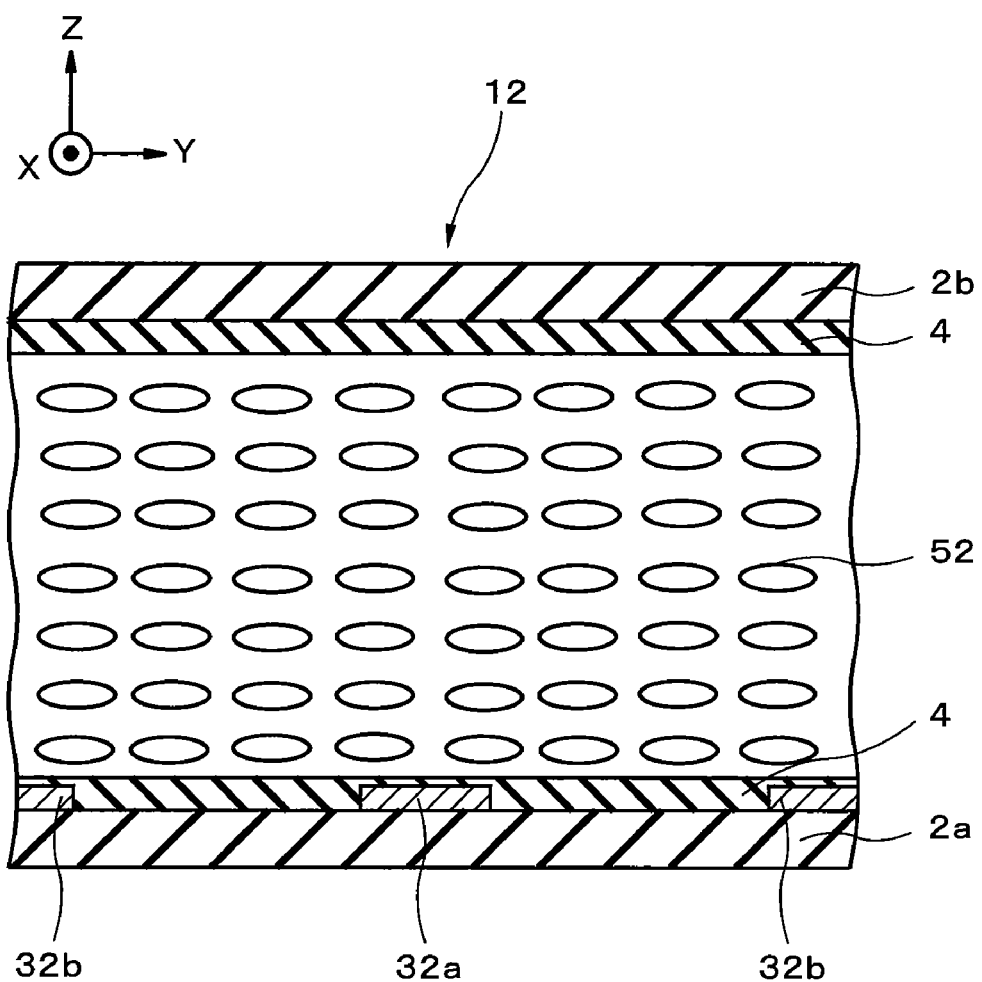
FIG. 22 is a sectional view showing the orientation state of liquid crystal molecules when a voltage is not applied between the shared electrode and pixel electrode that are constituent elements of the present embodiment.
Figure 23:
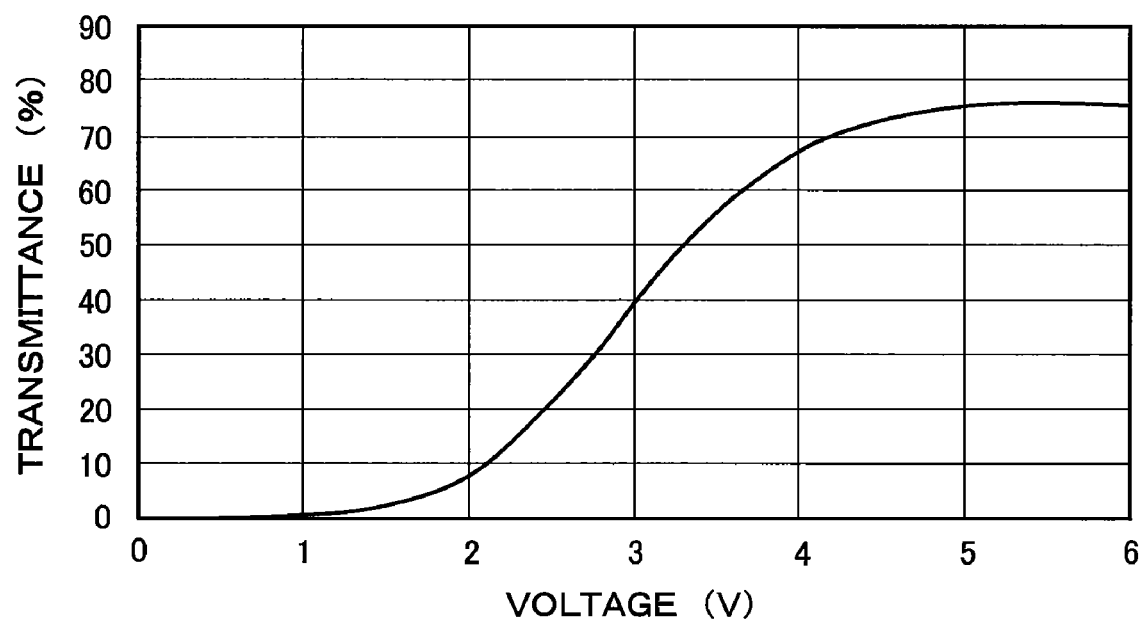
FIG. 23 is a graph obtained by measuring the voltage-transmittance characteristics in a region that has a diameter of 100 μm and includes an area above the electrodes and between the electrodes.

The liquid crystal display device according to a second embodiment of the present invention will next be described. FIG. 21 is a sectional view showing a state in which a voltage is applied in the liquid crystal display device according to the present embodiment. FIG. 22 is a sectional view showing the orientation state of liquid crystal molecules when a voltage is not applied between the shared electrode and pixel electrode that are constituent elements of the present embodiment. FIG. 23 is a graph obtained by measuring the voltage-transmittance characteristics in a region that has a diameter of 100 μm and includes an area above the electrodes and between the electrodes.

As shown in FIG. 21, the liquid crystal display device 12 according to the present embodiment differs from the liquid crystal display device 1 of the first embodiment in that a pixel electrode 32a and a shared electrode 32b having a width of 1.5 μm are used instead of a pixel electrode 3a and a shared electrode 3b having a width of 1 μm. The gap between the pixel electrode 32a and the shared electrode 32b, i.e., the inter-electrode distance, is set to 3.8 μm. A layer composed of negative-type liquid crystal molecules 52 that have negative dielectric anisotropy is provided between a principal substrate 2a and an opposing substrate 2b. The gap between the principal substrate 2a and the opposing substrate 2b, i.e., the thickness of the layer composed of negative-type liquid crystal molecules 52, is set to 3.5 μm. Specifically, although the values of the electrode width, the inter-electrode distance, and the cell gap in the present embodiment differ from those of the first embodiment, the electrode width is smaller than the cell gap in both embodiments.

In an example, the negative-type liquid crystal molecules 52 have physical properties that include a refractive anisotropy Δn of 0.1 at a wavelength of 550 nm, a dielectric anisotropy Δ∈ of −6.2, a dielectric constant of 4.1 in the direction parallel to the orientation vector of the liquid crystals, and elastic constants wherein K11=14.6 [pN], K22=6.7 [pN], and K33=15.7 [pN]. Negative-type liquid crystals have negative dielectric anisotropy, and the transmittance in the direction parallel to the orientation vector of the liquid crystals is less than the transmittance in the direction perpendicular to the orientation vector. Since the direction of high transmittance is orthogonal to the direction of the orientation vector, the liquid crystals change to an orientation that is perpendicular to an electric field. The twist elastic constant K22 is smaller than the bend elastic constant K33 in these liquid crystal molecules, and twisting therefore occurs easily, as described in the first embodiment. The transmittance of the liquid crystal layer disposed above the electrodes can also be more efficiently enhanced.

In the orientation state of the negative-type liquid crystal molecules 52 as shown in FIG. 22, the longitudinal direction of the liquid crystal molecules is oriented substantially in the Y-axis direction in the initial state in which a voltage is not applied between the pixel electrode 32a and the shared electrode 32b.

When a ±6 V/60 Hz rectangular-wave voltage is applied between the shared electrode 32b and the pixel electrode 32a in the orientation state of the negative-type liquid crystal molecules 52, the orientation process has an anchoring effect near the boundaries of the principal substrate 2a and the opposing substrate 2b between the electrodes, as shown in FIG. 21. The negative-type liquid crystal molecules 52 in these regions are therefore oriented substantially in the Y-axis direction, but the molecules align with the X-axis direction orthogonal to the direction of the lateral field generated by the parallel electrodes as the distance from the substrate boundaries increases. In the orientation state of liquid crystals disposed above the electrodes, the initial orientation remains in effect near the boundary of the opposing substrate 2b, the same as between the electrodes, but the liquid crystal molecules become oriented in the X-axis direction in the same manner as between the electrodes as the distance from the opposing substrate 2b increases. Although some rising towards the Z-axis direction is observed in the vicinity of the pixel electrode 32a or the shared electrode 32b in the principal substrate 2a, the thickness of the liquid crystal layer in this portion is less than 1 μm and is smaller than in the first embodiment. Other aspects of the present embodiment are the same as in the first embodiment.

The operation of the liquid crystal display device according to the present embodiment configured as described above will next be described. As shown in FIG. 21, when a voltage was applied between the shared electrode and the pixel electrode, a white state occurred in which the transmittance was high, but the transmittance increased in the region between the electrodes in the present embodiment. In the region above the electrodes, it was possible to obtain a higher transmittance than in the first embodiment. As a result, the maximum transmittance above the electrodes and between the electrodes was 77%, as shown in FIG. 23, and was 1.37 times that of the first embodiment. The transmittance obtained was also 1.75 times higher than that of the conventional IPS system in the first comparative example.

Figure 24:
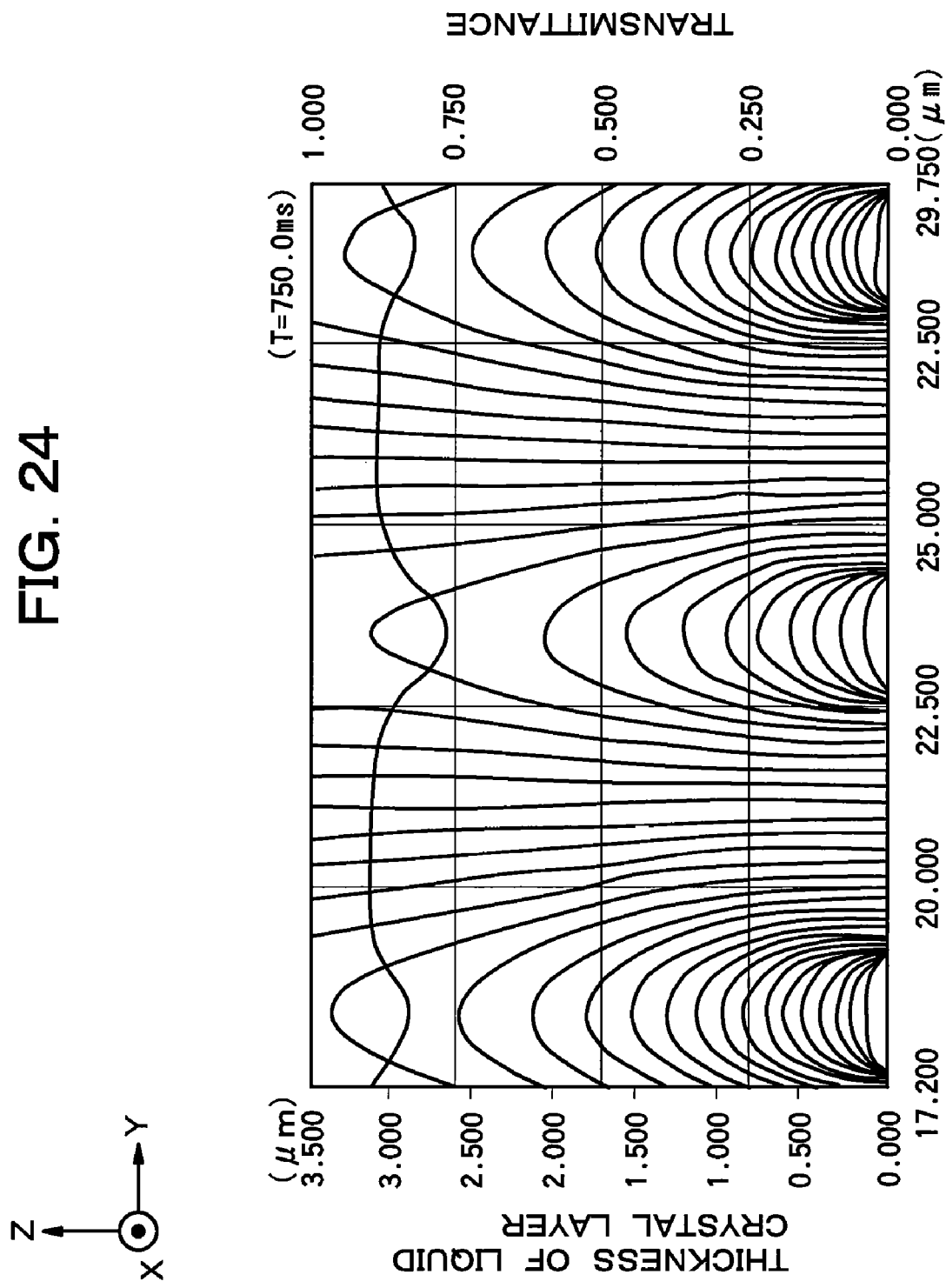
FIG. 24 shows the results of simulating the liquid crystal orientation, the field distribution, and the transmittance distribution of the present embodiment.
Figure 25:
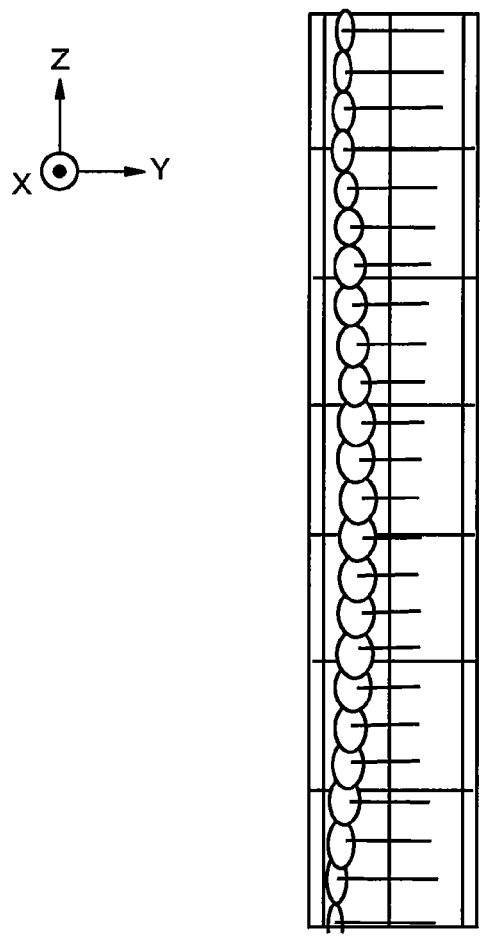
FIG. 25 is an enlarged view showing the liquid crystal orientation above the electrodes in the simulation results shown in FIG. 24.

A commercially available liquid crystal orientation simulator was therefore used to analyze the field distribution, the transmittance distribution, and the orientation of the liquid crystal molecules in order to investigate the transmittance and liquid crystal orientation above the electrodes when negative-type liquid crystals were used. The results of the simulation are shown in FIG. 24. FIG. 25 is an enlarged view showing, in particular, the liquid crystal orientation above the electrodes in the results shown in FIG. 24. As shown in FIGS. 24 and 25, the field was oriented in the Y-axis direction particularly near the center portion between the electrodes, and the liquid crystal molecules therefore rotated significantly in the X-axis direction, which was orthogonal to the direction of the field. This resulted in increased transmittance. In the near-substrate portion of the region between the electrodes, some of the liquid crystal molecules did not rotate to the X-axis direction because of an anchoring effect caused by the orientation process, but the ratio thereof with respect to the Z-axis direction was extremely small. In the region above the electrodes, however, the liquid crystal molecules that were near the center between the substrates turned significantly towards the X-axis direction in accordance with the change in orientation of the liquid crystal molecules between the electrodes, and the transmittance was enhanced as a result. A longitudinal field in the Z-axis direction occurred near the electrodes, but since a negative-type liquid crystal changes orientation so that the direction of the orientation vector is orthogonal to the field, the field did not impede rotation in the X-axis direction. Therefore, unlike the positive-type liquid crystal molecules in the first embodiment, the liquid crystal molecules disposed above the electrodes could rotate more freely to the X-axis direction, and the transmittance above the electrodes could therefore be further enhanced. Since the liquid crystal molecules also did not rotate to the Z direction in accordance with the longitudinal field, the ability to prevent the liquid crystal molecules near the electrodes from rising contributed in particular to the ability to enhance transmittance above the electrodes.

In the liquid crystal display device of the present embodiment, the electrodes are formed so as to have a width that is smaller than the cell gap, negative-type liquid crystal molecules are used, and the liquid crystal molecules disposed above the electrodes can be caused to orient themselves in the same direction as the liquid crystal molecules between the electrodes when a voltage is applied. The transmittance above the electrodes can therefore be enhanced, and the transmittance of the liquid crystal display device can be increased, including the transmittance between the electrodes. Since negative-type liquid crystal molecules in particular align in the direction orthogonal to the field, negative-type liquid crystal molecules can be more effectively prevented from conforming to a longitudinal field than can positive-type liquid crystal molecules, and can rotate more easily in the XY plane. As a result, transmittance above the electrodes can be significantly enhanced in comparison to that of positive-type liquid crystals, which in turn results in the ability to increase the transmittance of the liquid crystal display device, including transmittance between the electrodes. Since rising of the liquid crystal molecules towards the Z-axis direction can be suppressed, the viewing angle characteristics can also be enhanced. Other operations and effects of the present embodiment are the same as those of the first embodiment.

Figure 26:
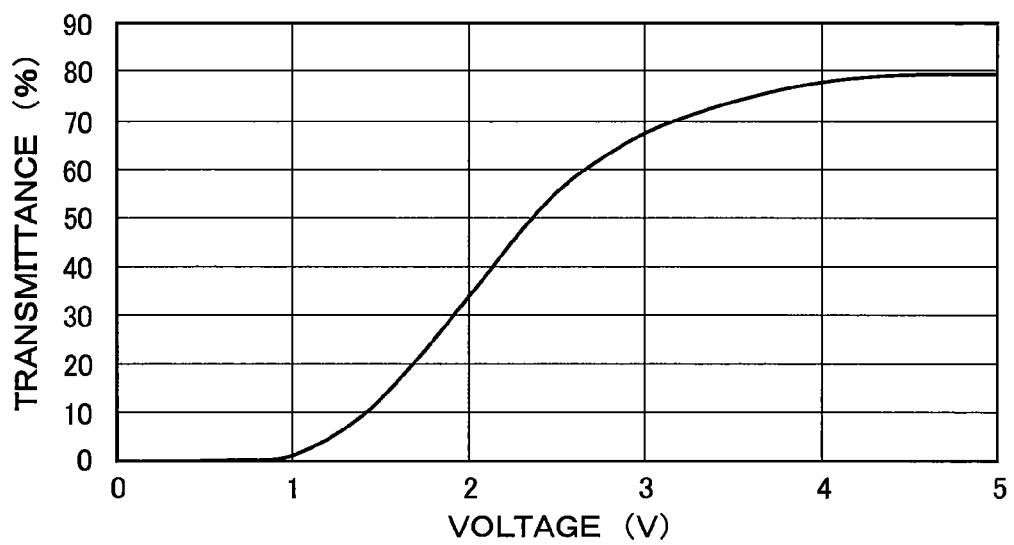
FIG. 26 is a graph obtained by measuring the voltage-transmittance characteristics in a region that has a diameter of 100 μm and includes an area above the electrodes and between the electrodes in the liquid crystal display device according to a third embodiment of the present invention.

The liquid crystal display device according to a third embodiment of the present invention will next be described. FIG. 26 is a graph obtained by measuring the voltage-transmittance characteristics in a region that has a diameter of 100 µm and includes an area above the electrodes and between the electrodes in the liquid crystal display device according to the present embodiment.

The liquid crystal display device according to the present embodiment differs from the liquid crystal display device 12 of the second embodiment in that a pixel electrode and a shared electrode having a width of 1 µm are used instead of a pixel electrode 32a and a shared electrode 32b having a width of 1.5 µm. The gap between the pixel electrode and the shared electrode, i.e., the inter-electrode distance, is set to 1 µm in the present embodiment, whereas this distance was set to 3.8 µm in the second embodiment. The cell gap is 3.5 µm, as in the second embodiment. Specifically, the present embodiment differs from the previous embodiment in that the electrode width and the inter-electrode distance are set to equal values, and the electrode width is smaller than the gap. The present embodiment particularly differs in that the electrode pitch, which is combined value of the electrode width and the inter-electrode distance, is set so as to be equal to or less than the cell gap. The present embodiment thereby satisfies conditions whereby $L/w \geqq 1$, $w/d<1$, and $(L+w)/d \leqq 1$. Specifically, the inter-electrode distance is equal to or greater than the electrode width, the electrode width is smaller than the cell gap, and the electrode pitch is smaller than the cell gap. Since the electrode pitch is equal to or less than the cell gap in the present embodiment, the electric field is stronger in the Y-axis direction than in the second embodiment. A greater number of the liquid crystal molecules disposed above the electrodes is thereby aligned with the X-axis direction in the liquid crystal orientation when a voltage is applied in the present embodiment. Other aspects of the present embodiment are the same as in the second embodiment.

The operation of the liquid crystal display device according to the present embodiment configured as described above will next be described. As in the liquid crystal display device of the second embodiment, a white state of high transmittance occurred when a voltage was applied between the shared electrode and the pixel electrode. As previously mentioned, more of the liquid crystal molecules at this time were aligned with the X-axis direction than in the second embodiment in the orientation of liquid crystals disposed above the electrodes, and a higher transmittance could therefore be obtained. As shown in FIG. 26, the maximum transmittance above the electrodes and between the electrodes was 79%, and was 1.41 times that of the first embodiment. The transmittance obtained was also 1.8 times higher than that of the conventional IPS system in the first comparative example. Furthermore, although the voltage used to obtain the maximum transmittance in the second embodiment was 5.5 V, this voltage was reduced to 5.0 V in the present embodiment, thereby enabling operation with lower power.

The liquid crystal display device of the present embodiment may have an overcoat layer for the purpose of planarization on the sides of the pixel electrode and shared electrode that face the liquid crystal layer. As described above, when negative-type liquid crystal molecules are used, the liquid crystal molecules must be placed in an initial orientation so that the director of the liquid crystal molecules is aligned substantially parallel to the arrangement direction of the shared electrode and the pixel electrode. However, when the electrode pitch in particular is smaller than the cell gap, the liquid crystal molecules align with surface irregularities of the electrodes. Since providing an overcoat layer makes it possible to reduce electrode-induced surface irregularities, the pitch of the electrodes can be reduced without compromising the orientation properties, and a high contrast ratio can be obtained.

A configuration may also be adopted in which a planarizing layer is provided only between the shared electrode and the pixel electrode, and a planarizing layer is not provided on the shared electrode and the pixel electrode. The gap between the shared electrode and the pixel electrode is thereby filled by the planarizing layer and flattened, and the orientation properties can therefore be enhanced in the same manner as if the above-mentioned overcoat layer were provided. Furthermore, since the planarizing layer is not provided above the electrodes, the drive voltage can be reduced. Other operations and effects in the present embodiment are the same as in the second embodiment.

Figure 27:
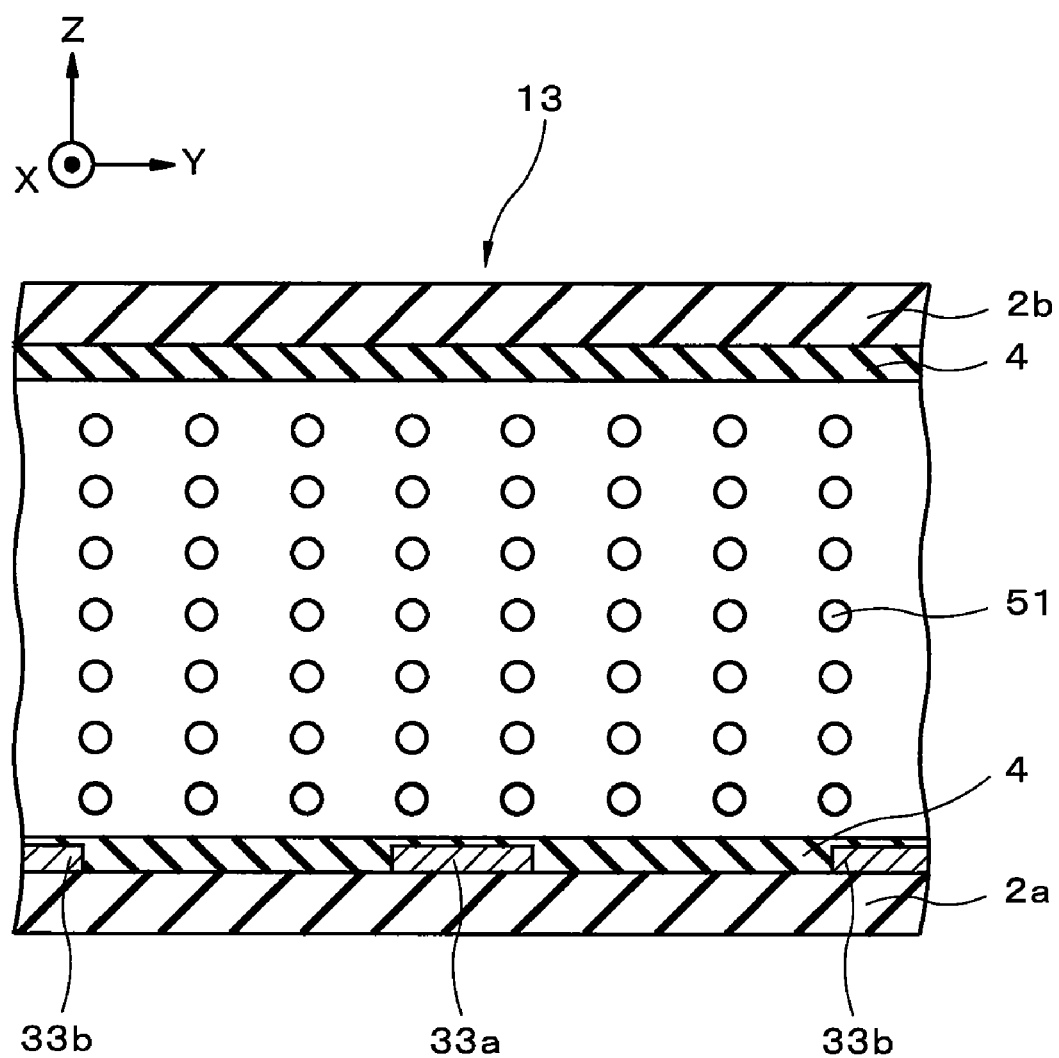
FIG. 27 is a sectional view showing the structure of a liquid crystal display device according to a fourth embodiment of the present invention, and the orientation state of the liquid crystal molecules in the absence of voltage applied across the pixel electrode and the shared electrode that are constituent elements of the liquid crystal display device.
Figure 28:
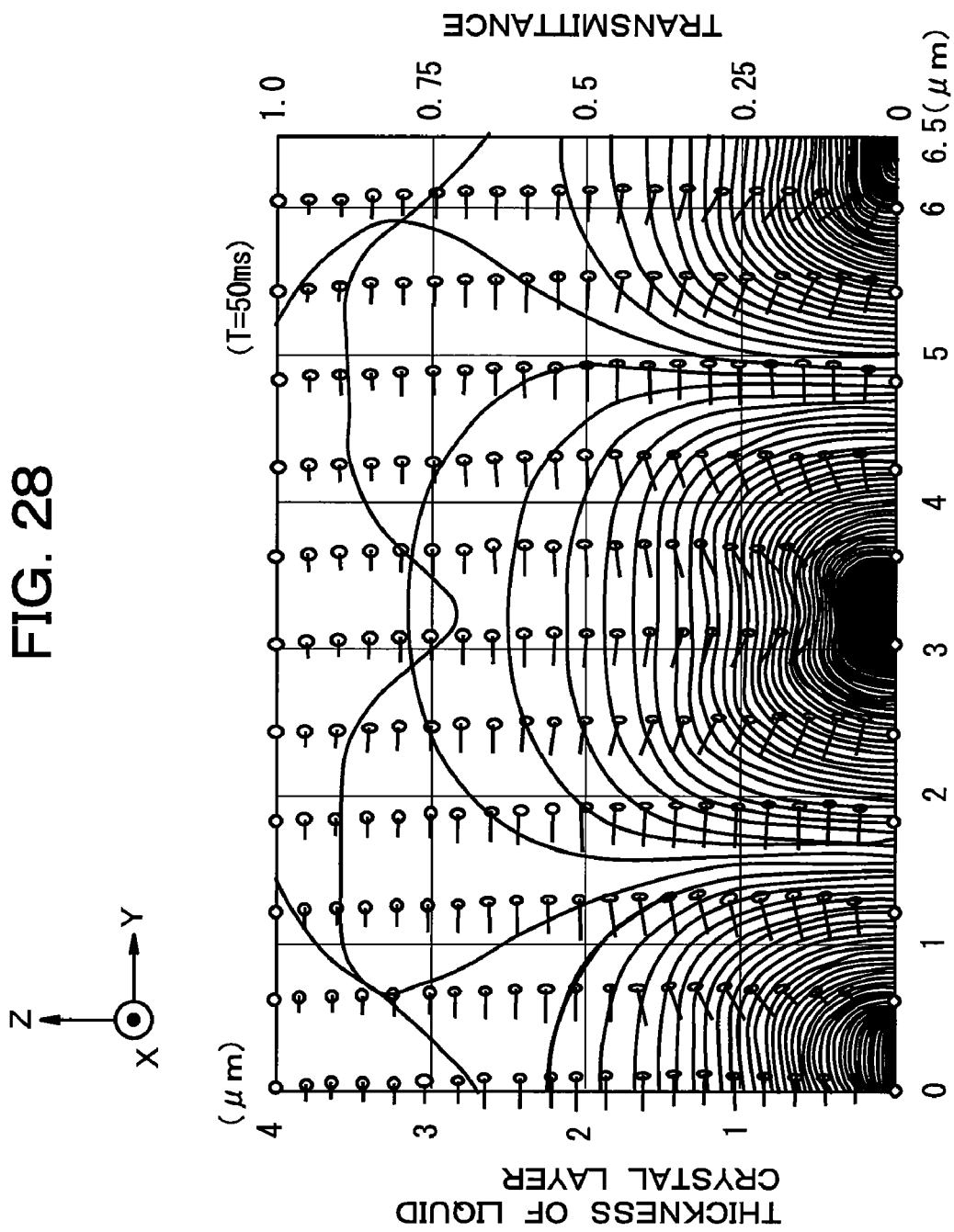
FIG. 28 is a sectional view depicting an electric field structure and liquid crystal orientation when voltage is applied to the liquid crystal display device according to the present embodiment, and, in particular, is a sectional view depicting a simulation of the relationship of the electric field structure and liquid crystal orientation to the transmittance distribution.

Next, the liquid crystal display device according to a fourth embodiment of the present invention shall be described. FIG. 27 is a sectional view showing the structure of the liquid crystal display device according to the present embodiment of the invention, and the orientation state of the liquid crystal molecules in the absence of voltage applied across the pixel electrode and the shared electrode that are constituent elements of the liquid crystal display device. FIG. 28 is a sectional view depicting an electric field structure and liquid crystal orientation when voltage is applied to the liquid crystal display device according to the fourth embodiment, and, in particular, is a sectional view depicting a simulation of the relationship of the electric field structure and liquid crystal orientation to the transmittance distribution.

As shown in FIG. 27, the liquid crystal display device 13 of the fourth embodiment, as compared with the liquid crystal display device 1 of the first embodiment, has a pixel electrode 33a and a shared electrode 33b having a width of 0.5 µm, instead of the pixel electrode 3a and the shared electrode 3b having a width of 1 µm. The gap between the pixel electrode 33a and the shared electrode 33b, i.e., the inter-electrode distance, is set to 2.5 µm. A layer composed of positive-type liquid crystal molecules 51 the same as that in the first embodiment is sandwiched between the principal substrate 2a and the opposing substrate 2b. The gap between the principal substrate 2a and the opposing substrate 2b, i.e., the thickness of the layer composed of the positive-type liquid crystal molecules 51, is set to 4 μm. An orientation process has been carried out so that, in the absence of voltage applied across the pixel electrode 33*a* and the shared electrode 33*b*, i.e., in the initial state, the orientation state of the positive-type liquid crystal molecules 51, similar to the orientation state in the first embodiment, is one in which the longitudinal axis direction of the liquid crystal molecules is substantially aligned with the X-axis direction. In this way, the first structural feature of the fourth embodiment lies in the fact that the sum of the electrode width and the inter-electrode distance is equal to or less than the thickness of the liquid crystal layer.

FIG. 28 is a sectional view that in particular depicts the relationship of the electric field structure and liquid crystal orientation to the transmittance distribution using a commercially available liquid crystal orientation simulator, for the purpose of showing the electric field structure and liquid crystal orientation when voltage is applied to the liquid crystal display device according to the fourth embodiment. A voltage which is a ±5 V/60 Hz rectangular wave is applied across the pixel electrode 33*a* and the shared electrode 33*b*.

As shown in FIG. 28, a second feature of the structure in the fourth embodiment relates to the electric field structure and features an electric field region wherein the electric field strength over the electrodes is equal to or less than the electric field strength in proximity to the opposing substrate between the electrodes. A third feature of the structure in the fourth embodiment relates to the liquid crystal orientation structure and features a region in which the liquid crystal molecules over the electrodes undergo a change in orientation in the same direction as the liquid crystals between the electrodes; and, in particular, in which the direction of the director of the liquid crystals differs from the electric field direction, not only over the electrodes but between the electrodes as well. The constitution of the embodiment is otherwise the same as in the first embodiment.

Turning next to a description of the operation of the liquid crystal display device of the fourth invention constituted in the above manner, the electric field structure which constitutes the second feature of the present embodiment shall be discussed first. As noted, the electric field structure of the present invention features a region wherein the electric field strength over the electrodes is equal to or less than the electric field strength in proximity to the opposing substrate between the electrodes. Here, from the transmittance simulation result depicted in FIG. 28, it will be apparent that transmittance, inclusive of that over the electrodes and between the electrodes, is 83%, and that the transmittance is extremely high even when compared with the first to third embodiments of the present invention. Intensive research carried out by the inventors with regard to this result led to the invention of an electric field structure whereby high transmittance can be achieved even where positive-type liquid crystals are used. As noted, the electric field structure of the present invention features a region wherein the electric field strength over the electrodes is equal to or less than the electric field strength in proximity to the opposing substrate between the electrodes. However, in the case of a comb electrode similar to the electrode structure in the present invention, through introduction of such an electric field structure it is possible to generate a weak electric field layer with a very weak electric field, within the liquid crystal layer in proximity to the opposing substrate. This introduction of a weak electric field is an important concept in the present embodiment, and represents a significantly different feature from the conventional IPS format and from the first embodiment discussed previously. With the present embodiment, by means of inventing an electric field structure having this weak electric field introduced therein, it is now possible to attain high transmittance.

Here, in order to describe the weak electric field layer, a comparison will be given of FIG. 28, which gives the result of the simulation in the fourth embodiment, FIG. 15, which gives the result of simulation of the electric field structure of the first comparative example described earlier, and FIG. 15, which gives the result of simulation of the electric field structure of the first embodiment described earlier. In the conventional electric field structure shown in FIG. 15, the equipotential lines between the electrodes run in the direction perpendicular to the substrate plane, i.e., the Z-axis direction. The equipotential lines over the electrodes run in the direction approximately parallel to the substrate plane, i.e., in the Y-axis direction in the cross section of FIG. 15. In the conventional electric field structure, a lateral electric field is generated between the electrodes, producing twist deformation in the liquid crystal orientation, whereas above the electrodes there is generated an electric field that is relatively strong in the perpendicular direction, hindering the twist deformation in the liquid crystal orientation. As a result, transmittance over the electrodes was lower. In the first embodiment of the present invention shown in FIG. 8, on the other hand, while transmittance over the electrodes is improved owing to the fact that the liquid crystal orientation above the electrodes conforms to the liquid crystal orientation between the electrodes, the electric field structure is nevertheless substantially the same as that of the first comparative example. In contrast to this, in the electric field structure of the fourth embodiment, while on the main substrate side a lateral electric field is generated between the electrodes, on the opposing substrate side the electric field runs in a direction that cannot properly be termed a lateral electric field. In addition, the electric field strength in proximity to this opposing substrate is weaker than the electric field strength in the first comparative example or first embodiment of the invention discussed previously, forming a weak electric field layer. Moreover, focusing on the electric field structure above the electrodes, while the electric field runs in the perpendicular direction to the plane of the substrate in the same manner as in the first comparative example or first embodiment of the invention discussed previously, the electric field strength thereof is relatively weak, also forming a weak electric field layer. When the electric field strengths over the electrodes and between the electrodes in proximity to the opposing substrate are compared, the electric field strength between the electrodes is seen to be equal to or less than the electric field strength over the electrodes. That is, in the present embodiment the weak electric field layer means that, focusing on the vicinity of the opposing substrate, the electric field layer which forms will be much weaker that with the conventional electric field structure. The electric field strength of the weak electric field layer is also much weaker than the electric field strength in proximity to the electrodes.

Next, the liquid crystal orientation which constitutes the third feature in the present embodiment shall be discussed. By means of the electric field structure described previously, the liquid crystal molecules in proximity to the principal substrate between the electrodes undergo twist deformation due to the lateral electric field, as in the prior art. Meanwhile, the liquid crystal molecules within the weak electric field layer formed in proximity to the opposing substrate can move relatively freely independently of the electric field, since the electric field strength is weaker than in the prior art. As a result, the liquid crystal molecules within the weak electric field layer tend to undergo twist deformation in association with a change in orientation of the liquid crystal molecules in proximity to the principal substrate between the electrodes, rather than becoming oriented with the electric field per se. This is because twist deformation in association with the orientation state of the surrounding liquid crystal molecules is more stable energetically than is a state where the liquid crystal molecules maintain prior orientation in the weak electric field, or a state of perpendicular orientation in association with a weak perpendicular electric field. While the liquid crystal molecules above the electrodes on the principal substrate side rise to some extent due to the action of the electric field in the direction perpendicular to the substrate plane, this rise will be contained within a narrow range due to the small width of the electrodes per se and to being pushed by the surrounding twist orientation. Effective twist deformation in the liquid crystal orientation is possible thereby.

Turning now to a comparison with the first embodiment of the present invention discussed previously, a feature of the first embodiment was that by means of the electric field generated by the parallel electrode pair, the liquid crystal molecules between the electrodes undergo twist deformation; and in association with this deformation the liquid crystal molecules above the electrodes undergo a change in orientation in the same direction as the liquid crystal molecules between the electrodes, in opposition to the electric field. In contrast, a feature of this fourth embodiment is that by means of the electric field generated by the parallel electrode pair, the liquid crystal molecules disposed between the electrodes and towards the substrate having the parallel electrode pair undergo twist deformation; in association with this deformation, the liquid crystal molecules disposed between the electrodes and at a location away from the substrate undergo twist deformation as well; in association with the twist deformation between the electrodes, the liquid crystal molecules above the electrodes also undergo twist deformation; and at a location away from the substrate that has the parallel electrode pair, the orientation changes in opposition to the electric field, not only above the electrodes but between the electrodes as well. The liquid crystal orientation structure which constitutes the third feature of the present embodiment is achieved by means of the electric field structure, namely, the weak electric field layer, which constitutes the second feature of the embodiment described previously.

Described next is the electrode structure for achieving the second feature of the present embodiment, namely, the weak electric field layer, and the operation thereof, i.e., the first feature of the structure in the present embodiment. As mentioned previously, a feature of the electrode structure of the present embodiment is that the sum of the electrode width and the inter-electrode distance is equal to or less than the thickness of the liquid crystal layer. In order to produce the weak electric field layer, a strong electric field layer of greater electric field strength should be confined in proximity to the electrodes. While the specifics of the electric field distribution will require a liquid crystal molecule orientation simulation, briefly, as shown the simulation result of FIG. 28, a strong electric field region is present in the thickness direction of the liquid crystal layer, within a range of height W+S above the electrodes, that is, within a range equal to the sum of the electrode width and the inter-electrode distance. Accordingly, in order to form the weak electric field region, it is possible to set the thickness of the liquid crystal layer to a value greater than that of W+S. That is, $d \geq W+S$. In the present embodiment, as noted previously, the electrode width is 0.5 µm, the inter-electrode distance is 2.5 µm, and the thickness of the liquid crystal layer is 4 µm, which fulfils the condition $d \geq W+S$.

In the present embodiment, by means of introducing the weak electric field, it is possible for the majority of the liquid crystal layer to undergo twist deformation. Specifically, by means of the electric field generated by the parallel electrode pair, the liquid crystal molecules between the electrodes on the side towards the substrate that has the parallel electrode pair undergo twist deformation; in association with this deformation the liquid crystal molecules disposed between the electrodes and at a location away from the substrate undergo twist deformation as well; in association with the twist deformation between the electrodes, the liquid crystal molecules above the electrodes also undergo twist deformation; and at a location away from the substrate that has the parallel electrode pair, the orientation changes in opposition to the electric field, not only above the electrodes but between the electrodes as well. Thus, as compared with the prior art, more of the liquid crystal molecules change orientation to the Y-axis direction, so that higher transmittance can be achieved than in the prior art.

According to the liquid crystal display device of the present embodiment, by means of introduction of the weak electric field layer and the twist deformation mechanism afforded thereby, it is possible to achieve very high transmittance even where positive-type liquid crystals are used. Moreover, since rising of the liquid crystal molecules towards the Z-axis direction can be suppressed, the viewing angle characteristics can be improved as well.

The liquid crystal molecules in the present embodiment preferably have a liquid crystal twist elastic constant K22 that is smaller than the bend elastic constant K33. The free energy during twist deformation can be minimized thereby, making it easier for the liquid crystal layer as a whole to undergo twist deformation, and allowing transmittance to be improved more efficiently.

While the liquid crystals of the present embodiment have been described as being of positive type, it would also be possible to use the negative-type liquid crystal molecules described in the second and third embodiments of the present invention. In positive-type liquid crystal molecules, the direction of refractive index anisotropy and the direction of dielectric anisotropy coincide, and therefore it is easy to improve the physical properties of the liquid crystal molecules in a preferred direction. As a result, lower voltages and faster speeds become possible.

Furthermore, in the present embodiment, light-guide plates can be provided in the same manner as in the first embodiment of the present invention discussed previously. However, as in the previous first embodiment, the light-guide plates are not an essential element of the present invention, it being acceptable to instead, in one example, use linearly polarized light such as laser light on the entrance side, with the observer who uses the display device wearing polarized glasses.

Moreover, in the present embodiment, the inter-electrode distance was described as being equal to or greater than the electrode width, and this represents a very crucial point. Where the inter-electrode distance is equal to or greater than the electrode width, twist deformation can be made to predominate in the liquid crystal layer, and improved transmittance becomes possible. However, considering the case where, conversely, the electrode width is greater than the inter-electrode distance, if one focuses on the change of orientation of the liquid crystal layer on the principal substrate side, the region of twist deformation between the electrodes will be relatively small. As a result, not only will the effect of twist deformation of the liquid crystal layer on the opposing substrate side thereof be diminished so that twist deformation becomes difficult, but the liquid crystal molecules will rise towards the +Z axis direction and the viewing angle characteristics will be markedly impaired. That is, it is crucial for the inter-electrode distance to be equal to or greater than the electrode width.

Furthermore, in the present embodiment, while the pixel electrode and the shared electrode were described as having identical electrode width, the present invention is not limited thereto, it being possible to employ different electrode widths instead. However, by making the electrode width the same, the electric field across the pixel electrode and the shared electrode can be made more uniform, and display defects caused by electric field nonuniformities can be reduced.

Moreover, the present embodiment, similar to the first embodiment of the present invention, does not preclude forming the pixel electrode and the shared electrode in different layers; the pixel electrode or the shared electrode could be formed using a gate electrode or a source or drain electrode for forming a thin film transistor. In this case, there will be no increase in the number of process steps even where the pixel electrode and the shared electrode are formed in different layers. Typically, low resistivity is required of a gate electrode or a source or drain electrode, so most are made of optically opaque metal. Also, since aluminum and other metals typically have better workability than ITO, an added benefit is that it becomes easy to produce a finer electrode. On the other hand, since metal surfaces reflect outside light, display quality declines. However, since the present invention employs very fine electrodes this decline in picture quality can be minimized. The surfaces of the metal electrodes lying towards the observer may be endowed with a structure that reduces reflection of outside light. In one example, a multilayer low-reflection film may be formed on the metal electrodes, or a black material may be applied. In order to reduce mirror reflection by the metal electrodes, the electrodes may be provided with a fine irregular structure.

Furthermore, in the present embodiment, while the principal substrate having the parallel electrode pair formed thereon and the opposing substrate were described as constituent elements, the opposing substrate is not an essential constituent element. As one example, it would be possible to instead cover the upper part of the liquid crystal layer with a UV-curing resin or the like. Since this will reduce the anchoring effect of the opposing substrate on the liquid crystal layer, advantages are that orientation deformation becomes easier, and lower voltage and faster speed when turned on become possible.

The principal substrate in the present embodiment is not limited to a glass substrate, and it would be possible to use a silicon substrate or quartz substrate as well. Particularly where a silicon substrate is used, it becomes easier to produce finer parallel electrode pairs. Other operations and effects of the fourth embodiment are the same as those of the first embodiment.

Figure 29:
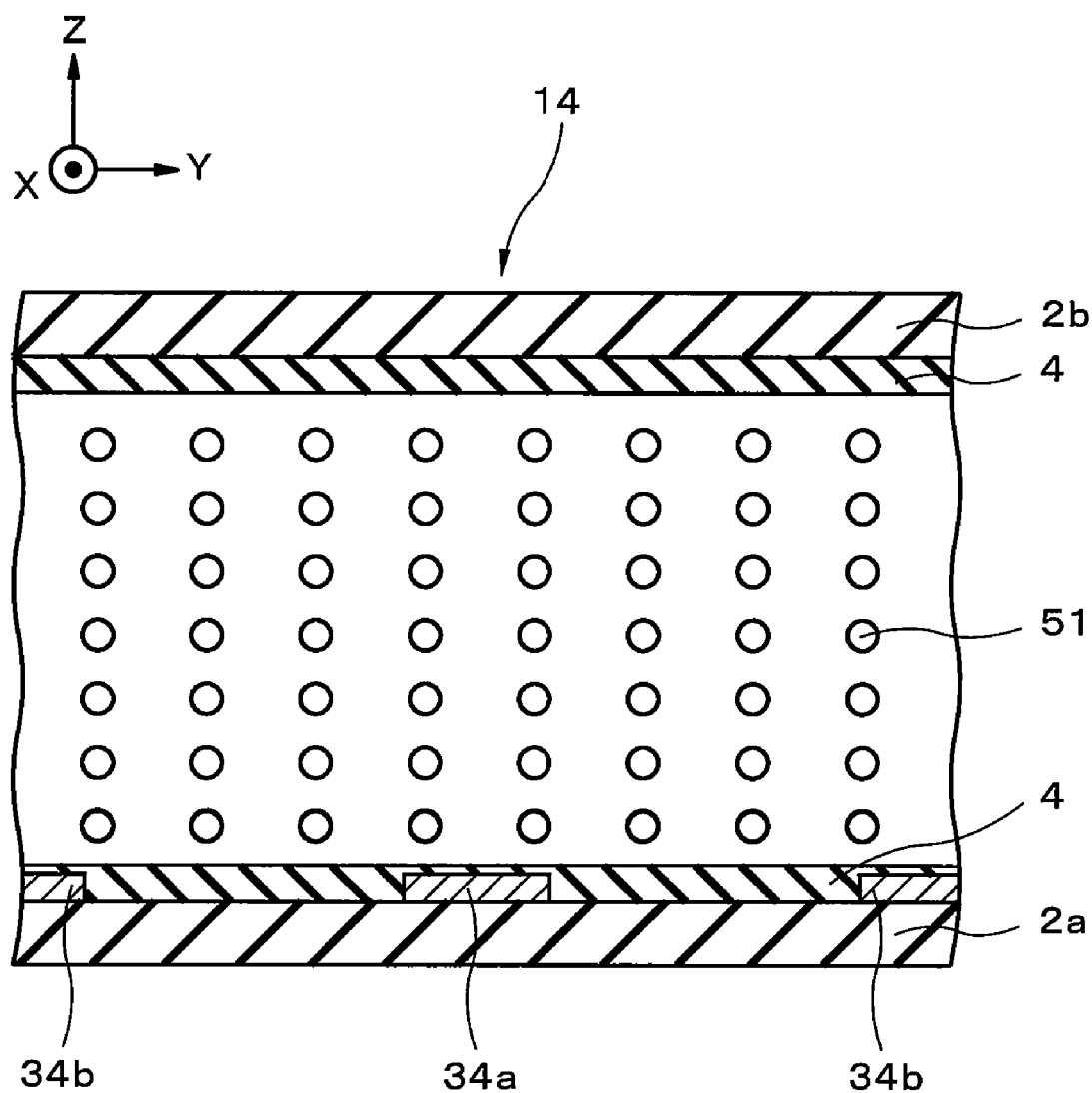
FIG. 29 is a sectional view showing the structure of a liquid crystal display device according to a fifth embodiment of the present invention, and the orientation state of the liquid crystal molecules in the absence of voltage applied across the pixel electrode and the shared electrode that are constituent elements of the liquid crystal display device.
Figure 30:
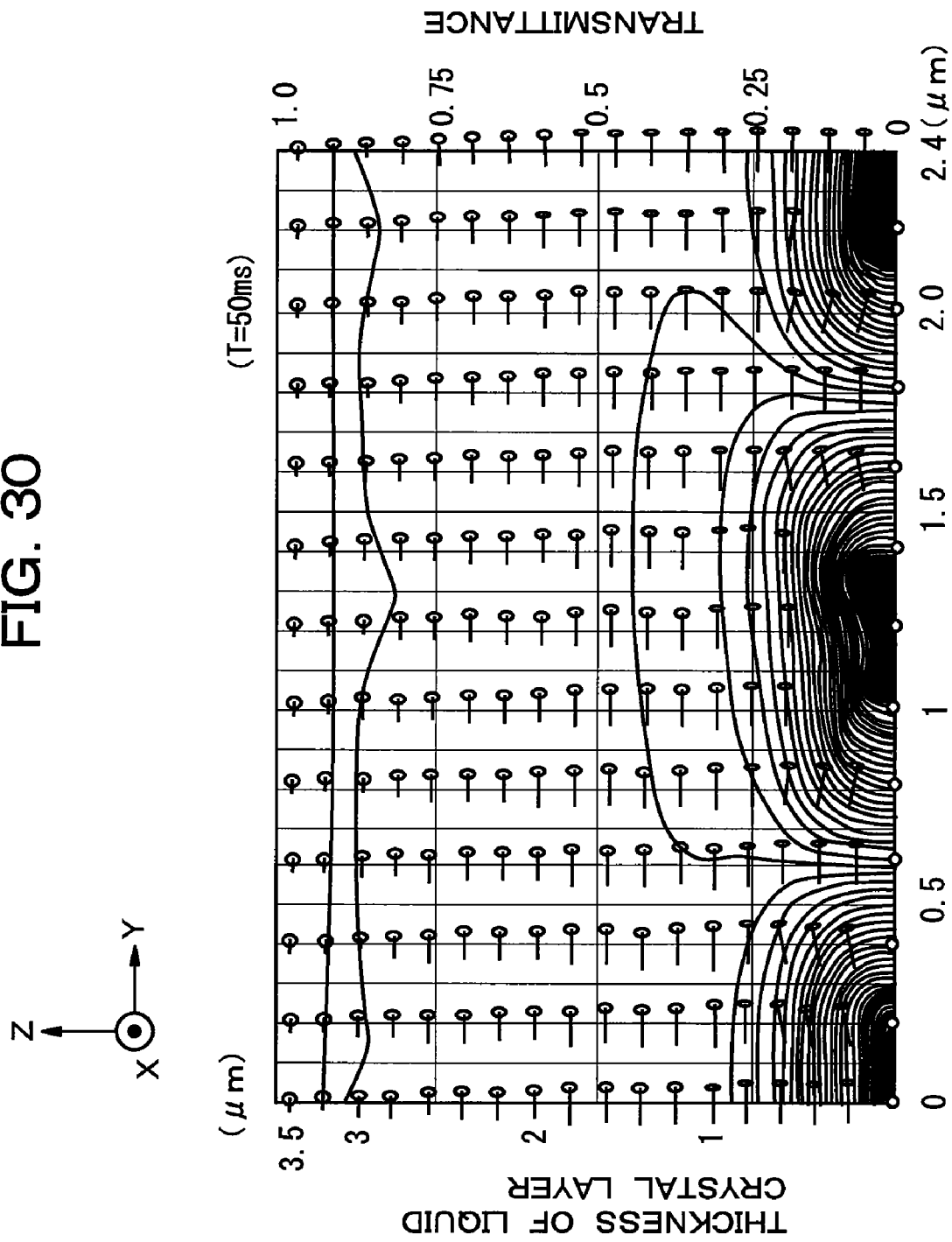
FIG. 30 is a sectional view depicting an electric field structure and liquid crystal orientation when voltage is applied to the liquid crystal display device according to the present embodiment, and, in particular, is a sectional view depicting a simulation of the relationship of the electric field structure and liquid crystal orientation to the transmittance distribution.

Next, the liquid crystal display device according to a fifth embodiment of the present invention shall be described. FIG. 29 is a sectional view showing the structure of the liquid crystal display device according to the present embodiment of the invention, and the orientation state of the liquid crystal molecules in the absence of voltage applied across the pixel electrode and the shared electrode that are constituent elements of the liquid crystal display device. FIG. 30 is a sectional view depicting an electric field structure and liquid crystal orientation when voltage is applied to the liquid crystal display device according to the fifth embodiment, and, in particular, is a sectional view depicting a simulation of the relationship of the electric field structure and liquid crystal orientation to the transmittance distribution.

As shown in FIG. 29, the liquid crystal display device 14 of the fifth embodiment, as compared with the liquid crystal display device 13 of the fourth embodiment, has a pixel electrode 34a and a shared electrode 34b having a width of 0.2 μm, instead of the pixel electrode 33a and the shared electrode 33b having a width of 0.5 μm. The gap between the pixel electrode 34a and the shared electrode 34b, i.e., the inter-electrode distance, is set to 0.9 μm. A layer composed of positive-type liquid crystal molecules 51, similar to the fourth embodiment, is sandwiched between the principal substrate 2a and the opposing substrate 2b. The gap between the principal substrate 2a and the opposing substrate 2b, i.e., the thickness of the layer composed of the positive-type liquid crystal molecules 51, is set to 3.5 μm. The first feature of the structure in the fifth embodiment is that the sum of the electrode width and the inter-electrode distance is equal to half or less the thickness of the liquid crystal layer, i.e., fulfills the condition $d \geqq 2(W+S)$.

FIG. 30 is a sectional view that in particular depicts the relationship of the electric field structure and liquid crystal orientation to the transmittance distribution using a commercially available liquid crystal orientation simulator, for the purpose of showing the electric field structure and liquid crystal orientation when voltage is applied to the liquid crystal display device according to the fifth embodiment. A voltage which is a ±5 V/60 Hz rectangular wave is applied across the pixel electrode 34a and the shared electrode 34b.

As shown in FIG. 30, a second feature of the structure in the fifth embodiment relates to the electric field structure and features a perpendicular electric field in proximity to the opposing substrate between the electrodes. A third feature of the structure in the fifth embodiment relates to the liquid crystal orientation structure and features a region in which the liquid crystal molecules over the electrodes undergo a change in orientation in the same direction as the liquid crystals between the electrodes, and, in particular, in which the direction of the director of the liquid crystals differs from the electric field direction, not only over the electrodes but between the electrodes as well, with this region occupying half or more of the thickness of the liquid crystal layer. The constitution of the embodiment is otherwise the same as in the fourth embodiment.

Turning next to a description of the operation of the liquid crystal display device of the fifth invention constituted in the above manner, the electric field structure which constitutes the second feature of the present embodiment shall be discussed first. As noted, the electric field structure of the present invention features a perpendicular electric field in proximity to the opposing substrate between the electrodes. Here, from the transmittance simulation result depicted in FIG. 30, it will be apparent that transmittance, inclusive of that over the electrodes and between the electrodes, is 85%, and that the transmittance is high even when compared with the fourth embodiment of the present invention. Intensive research carried out by the inventors with regard to this result led to the invention of an electric field structure achieving transmittance even higher than that in the preceding fourth embodiment. As noted, the electric field structure of the present invention features a perpendicular electric field in proximity to the opposing substrate between the electrodes. However, in the case of a comb electrode similar to the electrode structure in the present invention, through the introduction of such an electric field structure it is possible to generate a perpendicular electric field in the liquid crystal layer in proximity to the opposing substrate, not only above the electrodes but between the electrodes as well. To compare this with the conventional IPS format and from the first embodiment discussed previously, a strong lateral electric field is generated in proximity to the opposing substrate between the electrodes, or in the preceding fourth embodiment, there is generated an electrode which clearly cannot be termed a lateral electric field; whereas a significant difference in the present embodiment is that, as a result of having introduced the perpendicular electric field in proximity to the opposing substrate between the electrodes, the equipotential lines join with the perpendicular electric fields originally present over the electrodes and generate equipotential lines spanning above a plurality of electrodes. This feature represents one important concept in the present embodiment. In the present embodiment, by means of arranging the equipotential lines of the perpendicular electric field in this way, a weak electric field layer can be introduced in the vicinity of the center of the thickness of the liquid crystal layer. As a result, a twist-deformed orientation structure can be produced in half or more of the liquid crystal layer lying towards the opposing substrate, making it possible to achieve even higher transmittance.

Specifically, to compare the present embodiment with the existing region of the weak electric field layer described in the preceding fourth embodiment, in the fourth embodiment as shown in FIG. 28, the weak electric field layer is formed in the liquid crystal layer, in proximity to the opposing substrate. In contrast, as shown in FIG. 30, in the present embodiment, the weak electric field layer is formed towards the opposing substrate side, from the vicinity of the center of thickness of the liquid crystal layer. The weak electric field layer has an electric field in a direction substantially perpendicular to the substrate plane, and the strength of the electric field is weaker than that in the preceding fourth embodiment. Specifically, the weak electric field layer in the present embodiment refers to a perpendicular electric field layer much weaker than that achieved with the prior art electric field structure. The layer is formed towards the opposing substrate side from the vicinity of the center of thickness of the liquid crystal layer.

Next, the liquid crystal orientation constituting the third feature in the present embodiment shall be discussed. The liquid crystal molecules disposed in proximity to the principal substrate between the electrodes undergo twist deformation by means of a lateral electric field, in the same manner as in the preceding fourth embodiment. However, a feature of the present embodiment is that since the electric field in proximity to the thickness of the center of the liquid crystal layer, where anchoring is weakest, is a weak electric field, the liquid crystal molecules can move more freely. As a result, when the liquid crystal molecules disposed in proximity to the principal substrate between the electrodes undergo twist deformation, the liquid crystal molecules disposed in half or more of the liquid crystal layer lying towards the opposing substrate side similarly undergo twist deformation in association with this deformation. This is because twist deformation in association with the orientation state of the surrounding liquid crystal molecules is more stable energetically than is a state where the liquid crystal molecules maintain prior orientation in the weak electric field, or a state of perpendicular orientation in association with a weak perpendicular electric field. While the liquid crystal molecules above the electrodes on the principal substrate side rise to some extent due to the action of the electric field in the direction perpendicular to the substrate plane, this rise will be contained within a narrow range due to the small width of the electrodes per se and being pushed by the surrounding twist orientation. Effective twist deformation in the liquid crystal orientation is possible thereby. The liquid crystal orientation structure constituting the third feature of the present embodiment is achieved by means of the second feature of the present embodiment discussed above, namely, the electric field structure having a perpendicular electric field in proximity to the opposing substrate between the electrodes.

Described below is the first feature of the structure in the present embodiment, that is, the electrode structure and operation thereof for achieving the second feature of the present embodiment, namely, the weak electric field layer. As mentioned previously, a feature of the electrode structure of the present embodiment is that the sum of the electrode width and the inter-electrode distance is equal to half or less the thickness of the liquid crystal layer. As noted, a strong electric field layer of relatively high electric field strength is present within a range of height W+S above the principal substrate on which the electrodes are formed, that is, within a range equal to the sum of the electrode width and the inter-electrode distance. Accordingly, by setting the thickness of the liquid crystal layer to a value twice the value of W+S, it is possible to generate a weak electric field layer in the liquid crystal layer, in the portion thereof towards the +Z direction from the vicinity of the center of the liquid crystal layer. That is, $d \geq 2$ (W+S). In the embodiment, as noted previously, the electrode width is 0.2 µm, the inter-electrode distance is 0.9 µm, and the thickness of the liquid crystal layer is 3.5 µm, which fulfils the condition $d \geq 2$ (W+S).

In the embodiment, twist deformation of the liquid crystal is facilitated by means of introducing a weak electric field layer in a region extending through half or more of the liquid crystal layer. Specifically, by means of the electric field generated by the parallel electrode pair, the liquid crystal molecules disposed between the electrodes and towards the substrate having the parallel electrode pair undergo twist deformation; in association with this deformation, the liquid crystal molecules disposed between the electrodes and at a location in proximity to the center of the liquid crystal layer undergo twist deformation as well; and in association with the twist deformation between the electrodes, the liquid crystal molecules above the electrodes also undergo twist deformation. As a result, it is easy for twist deformation to occur in a region extending through half or more of the liquid crystal layer. Also, at locations that are away from the substrate having the parallel electrode pair by a distance equivalent to half or more of the liquid crystal layer, it is easy for twist deformation to occur in similar fashion in opposition to the electric field direction, not only above the electrodes but between the electrodes as well. Therefore, more liquid crystals change orientation to the Y-axis direction than in the prior art, and thus it is possible to attain higher transmittance than in the prior art.

According to the liquid crystal display device of the present embodiment, by means of introducing a weak electric field layer in a region extending through half or more of the liquid crystal layer, and using the twist deformation mechanism of the liquid crystal produced thereby, it is possible to achieve very high transmittance, even where positive-type liquid crystals are used. Moreover, since rising of the liquid crystal molecules in the Z-axis direction is suppressed, the viewing angle characteristics can be enhanced.

Considering the deformation time of liquid crystal molecules, the thickness of the liquid crystal layer in the present embodiment will preferably be within the range of normal liquid crystal layer thickness, i.e., about 5 µm. This is because if the liquid crystal layer is made thicker, the anchoring action of the orientating means will be weaker, return of liquid crystal orientation when the voltage goes off will be poor, and the off response time will be longer. Specifically, the sum of the electrode width and the inter-electrode distance is preferably set to within 2.5 µm. As mentioned earlier, it is necessary for the electrode width W to be smaller than the inter-electrode distance S. In the present embodiment, the width will preferably be established within the range W≦S/4. That is, the width of the electrodes is preferably 0.5 µm or less.

Figure 31:
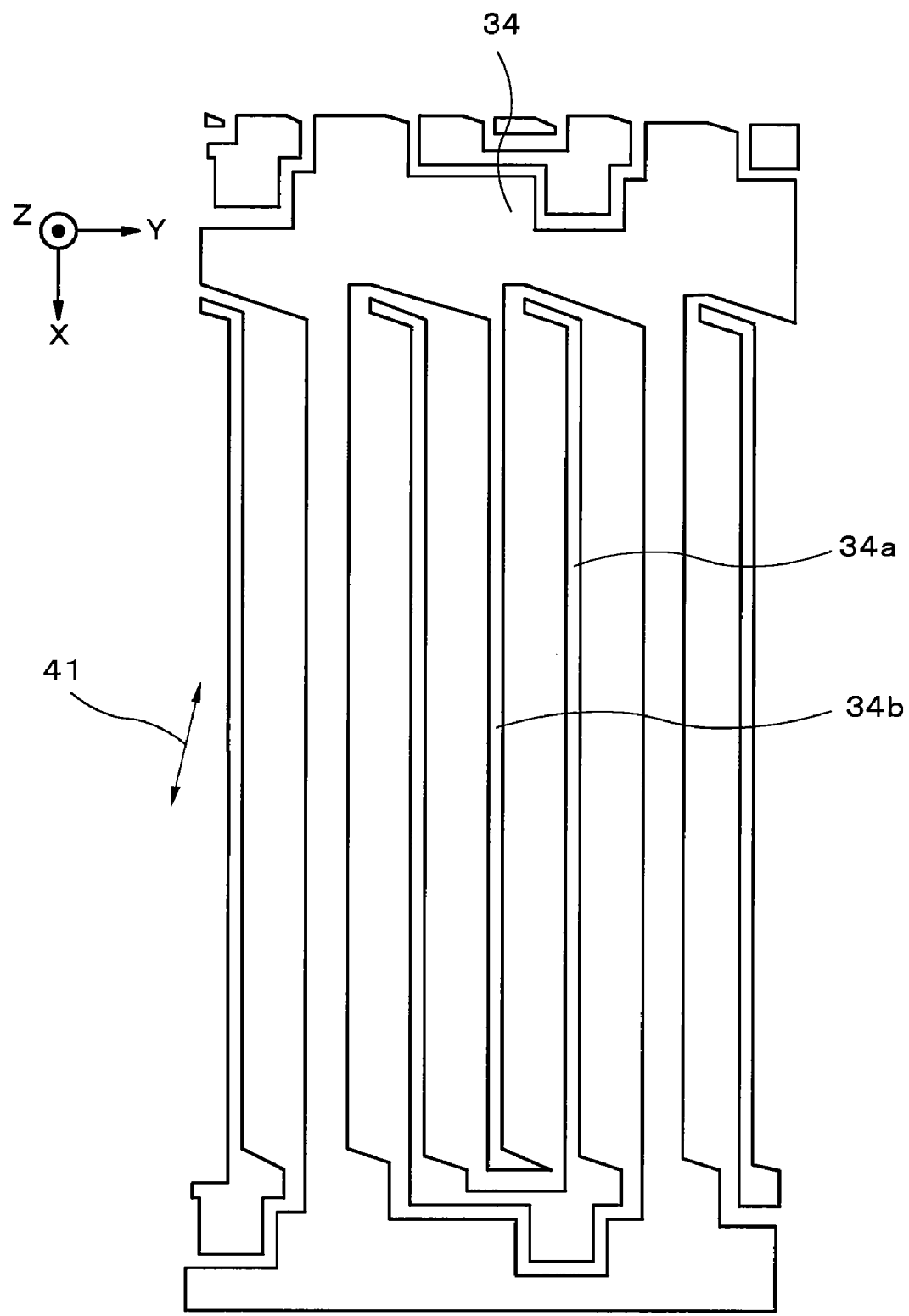
FIG. 31 is a top view of the reverse-rotation domain preventing structure in the liquid crystal display device according to the present embodiment.

As shown in FIG. 31, a reverse-rotation domain preventing structure 34c for preventing orientation deformation of the liquid crystal molecules in an undesired direction is preferably disposed on the terminal portion of the pixel electrode and the shared electrode. In the fourth and fifth embodiments of the present invention, the introduction of this structure is particularly important. This is because in the format of the present invention, the proportion of lateral electric fields is small in comparison with the normal IPS format, and orientation deformation during application of the electric field is dependent upon twist deformation of the liquid crystals disposed in proximity to the principal substrate between the electrodes, so that if unwanted orientation deformation is induced by an abnormal electric field generated in the terminal portion of the comb electrode, this orientation deformation will be readily propagated, making normal twist deformation difficult. One example of such a reverse-rotation domain preventing structure is a method of forming an electrode portion that is perpendicular to the rubbing direction, in the terminal portion of the pixel electrode and the shared electrode that constitute the parallel electrode pair, as depicted in FIG. 31.

Furthermore, while in the present embodiment the use of an orientating film as the orientating means is described, the orientating means is not limited thereto; particularly where positive-type liquid crystals are used, an irregular structure of the parallel electrode pair can be employed as the orientating means. By so doing, the need for an orientating process such as formation of an orientating film or a rubbing process is obviated, thus making it possible to lower the cost of the device. Also, slight curvature in the sideways direction, i.e., the Y-axis direction in FIG. 31, may be introduced into the parallel electrode pair. By so doing, the initial orientation direction of the liquid crystals is coincident with the direction of extension of the parallel electrode pair, and the angle between the liquid crystal molecules and the electric field is set to other than 90° because of the fact that the direction of the lateral electric field within the substrate plane differs from the Y-axis direction due to curvature. It is therefore possible to make the direction of twist of the liquid crystals align uniformly through the plane when voltage is applied. As the pitch of the slight curvature becomes larger, the angle between the liquid crystals and the lateral electric field tends to become orthogonal, and thus the pitch of the slight curvature will preferably be equal to or less than the pitch of the parallel electrode pair. Other operations and effects of the fifth embodiment are the same as those of the fourth embodiment.

Figure 32:
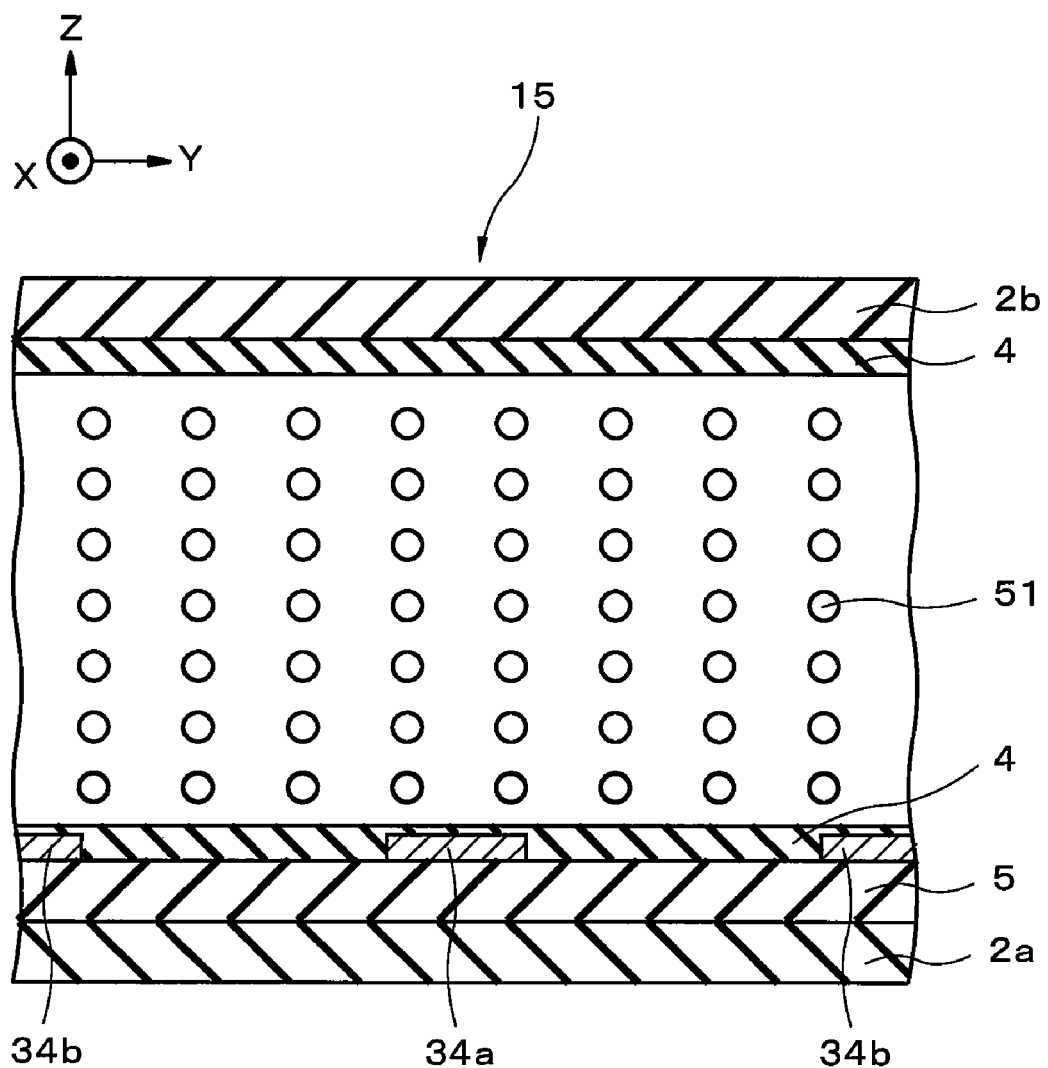
FIG. 32 is a sectional view showing the structure of a liquid crystal display device according to a sixth embodiment of the present invention.

Next, the liquid crystal display device according to a sixth embodiment of the present invention shall be described. FIG. 32 is a sectional view showing the structure of a liquid crystal display device according to the present embodiment.

As shown in FIG. 32, the liquid crystal display device 15 of the sixth embodiment differs from the fifth embodiment of the present invention discussed previously in that a reflecting plate 5 is formed on the principal substrate 2a. While it would be acceptable to dispose a light-guide plate on the face of the liquid crystal display device 15 lying towards the observer, this has been omitted in FIG. 32. In one example, the absorption axis of this light-guide plate is positioned in alignment with the direction of the minor axis of the liquid crystals. Specifically, the liquid crystal display device 15 in the present embodiment operates as a normal white mode reflective type display device. Other operations and effects of the sixth embodiment are the same as those of the fifth embodiment discussed previously.

Described below is the operation of the liquid crystal display device according to the sixth embodiment of the constitution described above. First, the case where no voltage is applied to the pixel electrode and the shared electrode shall be discussed. Linearly polarized light exiting from the light-guide plate towards the liquid crystal layer is incident on the liquid crystal layer, but since in the absence of applied voltage the polarization direction of the linearly polarized light coincides with the major axis of the liquid crystals, the linearly polarized light reaches the reflecting plate in the original state. The light reflected from the reflecting plate does not undergo any change in polarization direction at the reflecting plate or in the liquid crystal layer, and exits the light-guide plate in the original state. That is, in the absence of applied voltage, a white display is produced.

As described in the fifth embodiment of the present invention, since the liquid crystal layer undergoes substantially uniform twist deformation within the display plane when voltage is applied to the pixel electrode and the shared electrode, it is possible to realize a retardation film for imparting uniform phase retardation. In particular, where this phase retardation is equivalent to ¼ wavelength, the linearly polarized light exiting from the light-guide plate towards the liquid crystal layer will exit the reflecting plate in the form of circularly polarized light. Since the reflecting plate rotates the polarization direction of the circularly polarized light by 180°, the reflected light is incident on the liquid crystal layer in the form of circularly polarized light rotating in the opposite direction, is converted to linearly polarized light orthogonal to that at incidence, and goes towards the light-guide plate. Since this light cannot exit the light-guide plate, a black display can be produced by applying voltage.

As described in the first comparative example of the present invention, where liquid crystal orientation differs appreciably on and between the electrodes in the liquid crystal layer when voltage is applied, the liquid crystal layer cannot function as a uniform retardation film. Thus, particularly where used in normal white mode, leakage of light will occur during black display, and the contrast ratio of the display will be appreciably impaired.

On the other hand, where uniform twist deformation in the liquid crystal layer is achieved as described in the present embodiment, it is possible to attain a high contrast ratio.

While the reflecting plate in the present embodiment can employ aluminum, silver, or other metal having high reflectivity with respect to light, in such cases it will be preferable to dispose an insulating layer between the reflecting plate and the pixel electrode and shared electrode in order to prevent electrical continuity between the pixel electrode and the shared electrode.

In the present embodiment, while the liquid crystal display device is described as being a reflective type display device, the present invention is not limited thereto and may be implemented in transmissive type display devices as well, and to good effect in semi-transmissive type displays in particular. In a semi-transmissive type display, a case can be considered where the pixel electrode is shared by a transmitting region and a reflecting region, different voltages are applied to the shared electrode of the transmitting region and the reflecting region, and a retardation film is not employed. In this case, the reflecting region will exhibit normal black characteristics, and the transmitting region will exhibit normal white characteristics. The optical operation of the transmitting region affords high transmittance as described in the fifth embodiment of the present invention, while the optical operation of the reflecting region affords a high-contrast reflective display as in this sixth embodiment. Other operations and effects of the sixth embodiment are the same as those of the fifth embodiment discussed previously.

Figure 33:
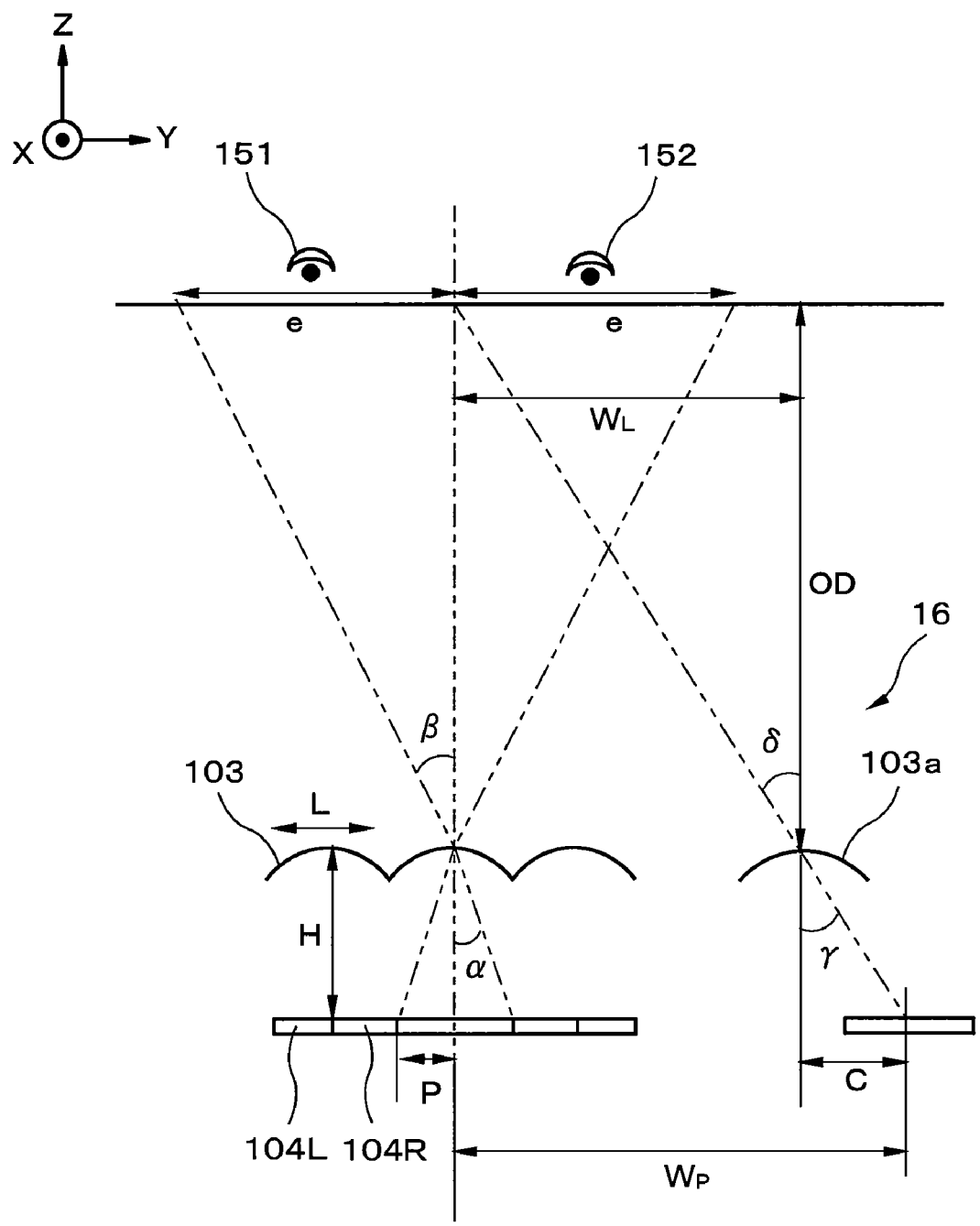
FIG. 33 is a sectional view showing the structure of a liquid crystal display device according to a seventh embodiment of the present invention.

Next, the liquid crystal display device according to a seventh embodiment of the present invention shall be described. FIG. 33 is a sectional view showing the structure of a liquid crystal display device according to the present embodiment.

As shown in FIG. 33, the liquid crystal display device 16 according to the seventh embodiment is a stereoscopic image display device equipped with a lenticular lens 103. In the liquid crystal display device 16, pixel pairs which constitute display units comprising a left eye pixel 104L and a right eye pixel 104R are disposed in a matrix array. The lenticular lens 103 is a lens array of a large number of cylindrical lenses 103a in a one-dimensional alignment, with the alignment direction thereof coincident with the direction of the repeating sequences of left eye pixels 104L and right eye pixels 104R, that is, the Y-axis direction in FIG. 33. The direction of extension of the cylindrical lenses 103a, i.e., their lengthwise direction, lies orthogonal to the alignment direction within the display plane, i.e., in the X-axis direction in FIG. 33. Each single pixel pair in the Y-axis direction corresponds to a single cylindrical lens 3a. The left eye pixel 104L and the right eye pixel 104R have the same structure as those used in the liquid crystal display device described in the fifth embodiment of the present invention. The pixel electrodes and the shared electrodes are positioned in a repeating sequence in the Y-axis direction in FIG. 33. Other elements of the present embodiment are the same as those of the fifth embodiment discussed previously.

Described below is the operation of the liquid crystal display device according to the seventh embodiment of the constitution described above. First, the pixel magnifying operation of the lenticular lens 103 shall be discussed. As shown in FIG. 33, the principal point of the lenticular lens 103, i.e., the distance from the apex to the pixel, is denoted by H, the refractive index of the lenticular lens 103 is denoted by n, and the lens pitch is denoted by L. The pitch of each single left eye pixel 104L and single right eye pixel 104R is denoted by P. Here, the pitch of the alignment of the display pixels which comprise one left eye pixel 104L and one right eye pixel 104R is 2P.

Let the distance between the lenticular lens 103 and the observer be denoted as the optimum observation distance OD, and let e be the period of the magnified projection image of a pixel at this distance OD, i.e., let e be the period of the width of the projection image of the left eye pixel 104L and that of the right eye pixel 104R in a hypothetical plane that is parallel to the lens and is disposed away from the lens by the distance OD. Let WL be the distance from the center of the cylindrical lens 103a disposed at the center of the lenticular lens 103 to the center of the cylindrical lens 103a disposed at the end of the lenticular lens 103 in the X-axis direction; and let WP be the distance from the display pixel comprising the left eye pixel 104L and the right eye pixel 104R disposed at the center of the display screen of the liquid crystal display device to the center of the display pixel disposed at the edge of the display screen in the X-axis direction. Let the incidence angle and exit angle of light in the cylindrical lens 103a disposed at the center of the lenticular lens 103 be denoted by α and β, respectively; and let the incidence angle and exit angle of light in the cylindrical lens 103a disposed at the edge of the display screen in the X-axis direction be denoted by γ and δ, respectively. Let C denote the difference between the distance WL and the distance WP; and let the number of pixels contained in an area of the distance WP be 2m.

Since the alignment pitch L of the cylindrical lenses 103a and the alignment pitch P of the pixels are related to one another, one of them will be determined with reference to the other, and since in most cases it is normal to design the lenticular lens with reference to the display panel, the pixel alignment pitch P shall be treated as a constant. The refractive index n is determined through selection of the material of the lenticular lens 103a. In contrast, the observation distance OD between the lens and the observer, and the period e of the magnified pixel image at the observation distance OD, may be set to desired values. Using these values, it is possible to determine the distance H between the lens apex and the pixel, and the lens pitch L. According to Snell's law and geometrical relationships, the following Equations 1 to 9 will be true. The following Equations 10 and 11 will also be true.

$$n \times \sin \alpha = \sin \beta \qquad [\text{EQ. 1}]$$

$$OD \times \tan \beta = e \qquad [\text{EQ. 2}]$$

$$H \times \tan \alpha = P \qquad [\text{EQ. 3}]$$

$$n \times \sin \gamma = \sin \delta \qquad [\text{EQ. 4}]$$

$$H \times \tan \gamma = C \qquad [\text{EQ. 5}]$$

$$OD \times \tan \delta = WL \qquad [\text{EQ. 6}]$$

$$WP - WL = C \qquad [\text{EQ. 7}]$$

$$WP = 2 \times m \times P \qquad [\text{EQ. 8}]$$

$$WL = m \times L \qquad [\text{EQ. 9}]$$

In the present embodiment, the distance H between the lenticular lens apex and the pixel is established equal to the focal length f of the lenticular lens. Thus, the following Equation 16 will be true; and where the radius of curvature of the lens is denoted by r, the radius of curvature r is derived using Equation 11 below.

$$f = H \qquad [\text{EQ. 10}]$$

$$r = H \times (n-1)/n \qquad [\text{EQ. 11}]$$

Here, the lateral magnification of the lenticular lens can be thought of as a value equal to the period of the magnified pixel projection image divided by the pixel period, i.e., the pixel pitch, i.e., as a factor of e/P. For example, where a display panel having a pixel alignment pitch of 65 μm is used, and the period e of the magnified pixel projection image is set to 65 mm, the lenticular lens 103 will have a lateral magnification of 1000×. Specifically, the pixel electrode and the shared electrode that are formed in the pixel will also be magnified by 1000× and projected onto the viewing screen. In one example, if an area of diminished transmittance 5 μm in width should occur in the pixel electrode or shared electrode portion, an area of diminished transmittance 5 mm in width will be observed on the viewing screen.

As described in the first comparative example of the present invention, where, during application of voltage, the liquid crystal orientation in the liquid crystal layer above the electrodes differs appreciably from that between the electrodes, and an appreciable transmittance distribution is produced in the X-axis direction, this transmittance distribution will be magnified by the lenticular lens and will be noticeable to the observer. That is, since a change in the angle between the observer and the display device will bring about a noticeable overlapping irregularity of light and dark superimposed onto the display image, the observer will have the impression that the display image has low quality.

Where, on the other hand, uniform twist deformation within the liquid crystal layer is attained as described in the present embodiment, the transmittance distribution caused by the electrode structure and superimposed onto the display image will not be noticeable to the observer, and display quality will therefore not be perceived as poor. That is, in the present invention it is possible to improve display quality.

In the present embodiment, a dual-view stereoscopic image display device having left eye pixels and right eye pixels was described. However, the present invention is not limited thereto and is applicable in similar fashion to display devices of N-view (where N is a natural number) format. In such a case, in the definition of distance WP discussed previously, the number of pixels 2m contained in an area of distance WP should be treated as N×m. It is also acceptable for N to be 1, that is, for there to be one-to-one correspondence of pixels and lenses. In such cases, the effect of gate lines, data lines, and other areas that do not contribute to the display can be reduced, and the utilization efficiency of light can be improved.

The present invention is not limited to stereoscopic image display devices, and is applicable in similar fashion to all manner of display devices provided with a lenticular lens. In one example, the invention can be implemented in a multi-image display device that displays a plurality of planar images in different directions.

The image separation means of the present invention is not limited to a lenticular lens, and may be implemented analogously to a fly-eye lens having lens elements in a two-dimensional array; a parallax barrier having slits in a one-dimensional array; or a parallax barrier having pinholes in a two-dimensional array. That is, the present embodiment can be employed to good advantage in devices provided with optical means for magnified display of pixels, and will make it possible to attain high picture quality.

The present invention is applicable not only to transmissive type liquid crystal display devices, but also to reflective type liquid crystal display devices, semi-transmissive type liquid crystal display devices, and micro-reflective type liquid crystal display devices.

The pixel electrode and the shared electrode in the present embodiment are preferably fabricated of ITO or another transparent conductor, but improvement can be achieved even where metal is used. This is because the uniformity of transmittance of the liquid crystal layer within the plane can be improved by means of improving the liquid crystal orientation in proximity to the metal electrodes. Other operations and effects of the seventh embodiment are the same as those of the fifth embodiment.

Figure 34:
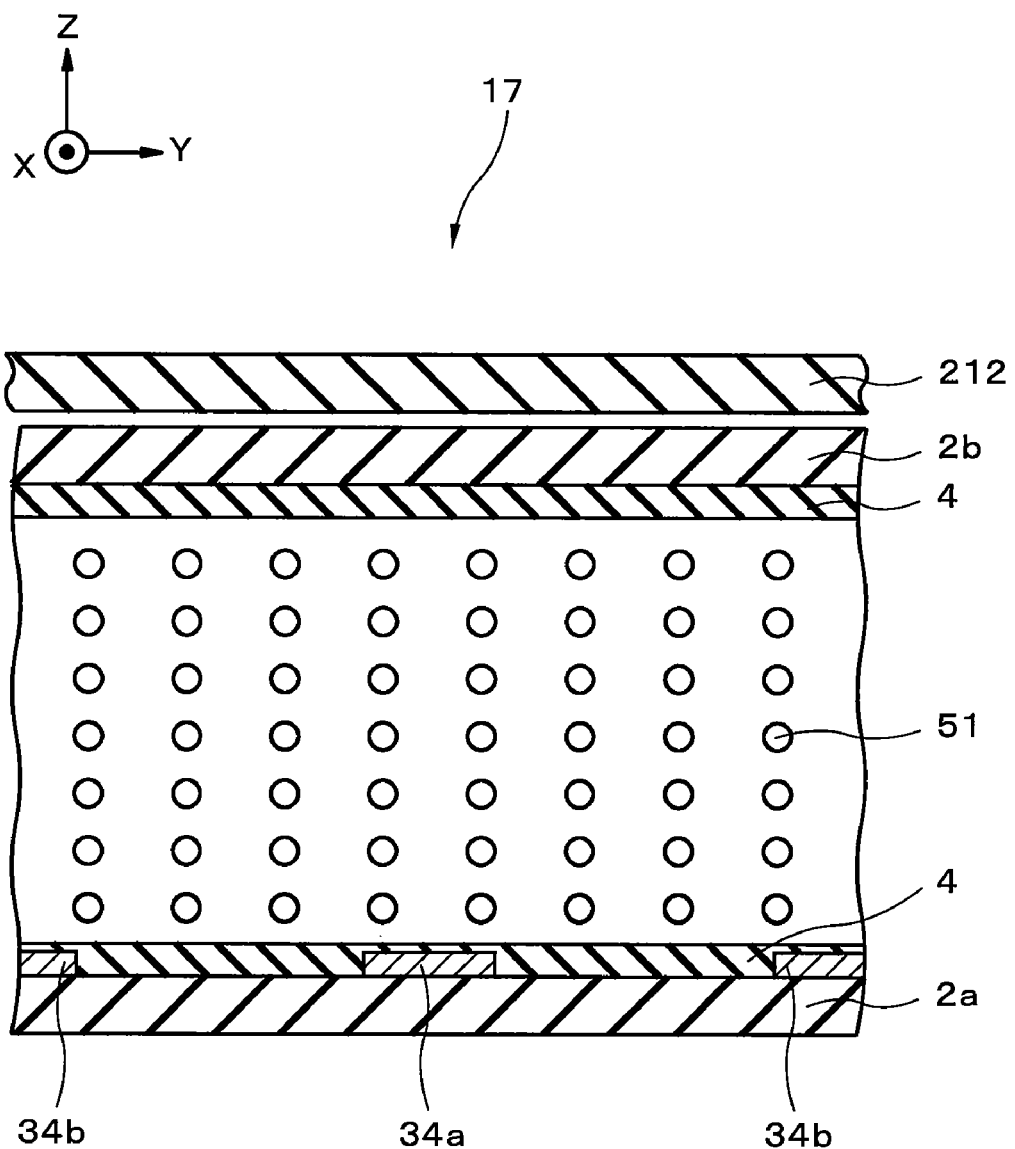
FIG. 34 is a sectional view showing the structure of a liquid crystal display device according to an eighth embodiment of the present invention.
Figure 35:
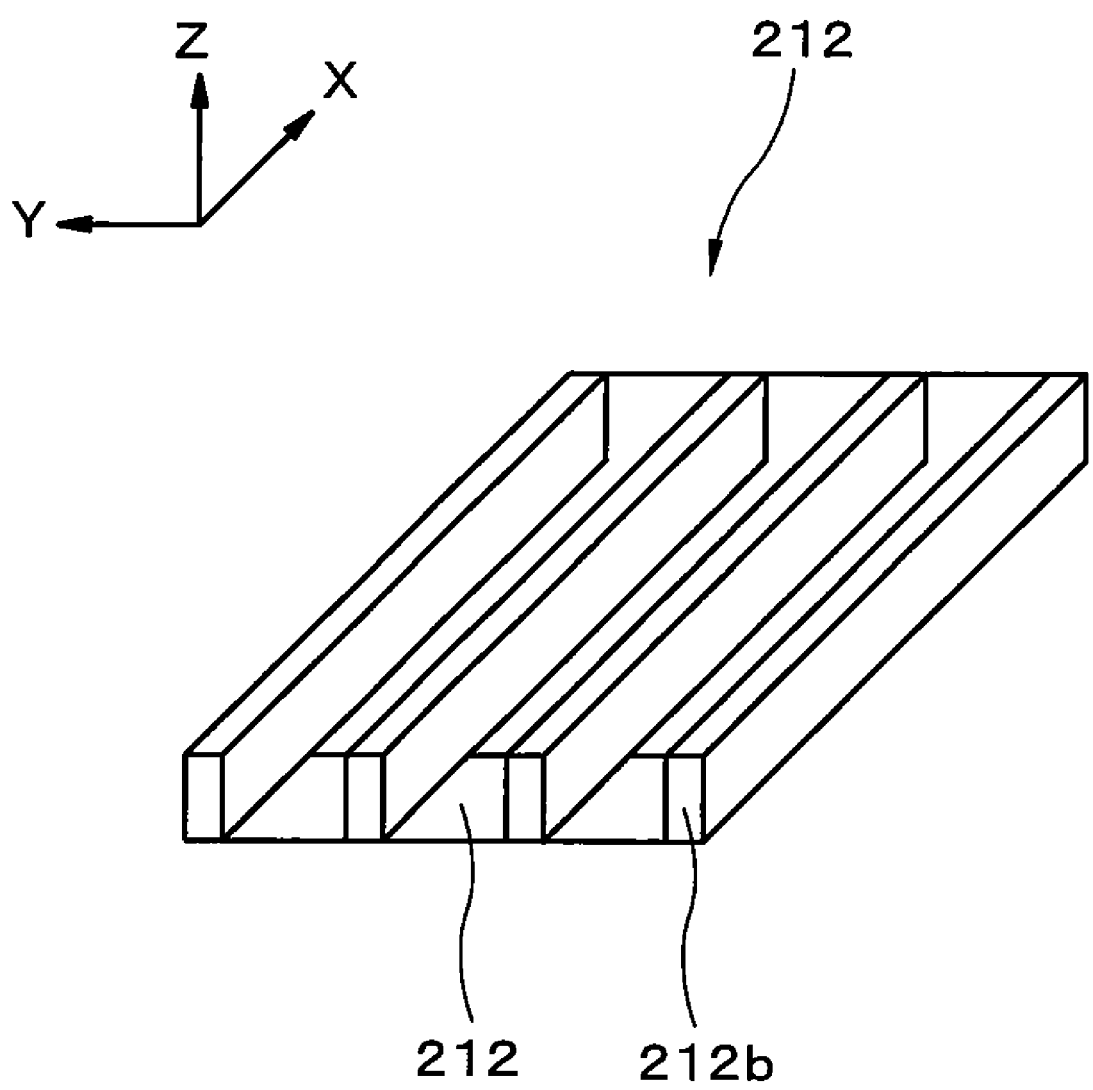
FIG. 35 is a perspective view showing a louver which is a constituent element of the liquid crystal display device according to the present embodiment of the invention, and which constitutes a light ray regulating element.

Next, the liquid crystal display device according to an eighth embodiment of the present invention shall be described. FIG. 34 is a sectional view showing the structure of the liquid crystal display device according to the present embodiment. FIG. 35 is a perspective view showing a louver which is a constituent element that serves a light ray regulating element.

As shown in FIG. 34, the liquid crystal display device 17 according to the eighth embodiment of the present invention, as compared to the liquid crystal display device of the fifth embodiment described previously, features a louver 212 that constitutes a light ray regulating element and is disposed towards the +Z direction on the liquid crystal display device 14.

As shown in FIG. 35, the louver 212 includes transparent regions 212a that transmit light and absorbing regions 212b that absorb light, arrayed in alternating fashion parallel with the louver surface. The direction in which the transparent regions and the absorbing regions are arrayed in alternating fashion is the Y-axis direction in FIGS. 34 and 35. Other arrangements in the present embodiment are similar to those of the fifth embodiment described previously.

In the present embodiment, of the rays of light incident on the louver 212, the components having a large angle from normal with respect to the exit face are eliminated through absorption, so the rays of light exiting the liquid crystal display device 17 will have improved directionality. By so doing, surreptitious viewing from the diagonal can be prevented, which affords the benefit of preventing unintentional disclosure of private information.

As described in the first comparative example of the present invention, where, during application of voltage, the liquid crystal orientation in the liquid crystal layer above the electrodes differs appreciably from that between the electrodes, and an appreciable transmittance distribution is produced in the X-axis direction, the transmittance distribution and the absorbing regions 212b will interfere, which will appear to the observer as a decline in display quality of the image.

Where, on the other hand, uniform twist deformation within the liquid crystal layer is attained as described in the present embodiment, it is possible to prevent the decline in picture quality caused by interference between the absorbing regions of the louver and the transmittance distribution caused by the electrode structure, and the observer will therefore not perceive display quality as poor. That is, in the present invention it is possible to improve display quality.

While the louver serving as the light ray regulating element in the present invention was described as having transparent regions and absorbing regions arrayed in alternating fashion in the X-axis direction, these could instead be rotated and arranged in the XY plane.

While in the present embodiment the light ray regulating element was described as being a louver, the present invention is not limited thereto and could be implemented analogously with regard to optical elements for controlling the directionality of the exiting light. As an example, the present invention could be implemented similarly in the case of a prism sheet constituting the backlight. Other operations and effects of the eighth embodiment are the same as those of the fifth embodiment discussed earlier.

The embodiments set forth herein may be employed independently, or employed in some suitable combination.

The present invention may be suitably utilized as a display device in mobile telephones, PDAs, gaming devices, digital cameras, video cameras, video players, and other mobile terminal devices, or as a display device in notebook-type personal computers, cash dispensers, vending machines, and other terminal devices.

What is claimed is:

1. An in-plane switching (IPS) liquid crystal display device comprising:
    a principal substrate having at least a parallel electrode pair;
    an opposing substrate being provided so as to face the principal substrate;
    a liquid crystal layer disposed between the principal substrate and the opposing substrate; and
    liquid crystal molecules in said liquid crystal layer that are driven by an electric field generated by said parallel electrode pair, wherein
    a twisting elastic constant of said liquid crystal molecules is smaller than a bending elastic constant thereof;

a electrode width of said parallel electrode pair is smaller than a thickness of said liquid crystal layer;

a orientation of liquid crystal molecules between said electrodes is changed by the electric field generated by said parallel electrode pair;

an electric field region exists where an electric field strength in proximity to the opposing substrate is weaker than an electric field strength in proximity to the principal substrate and where, in proximity to the opposing substrate, an electric field strength between the electrodes is equal to or less than an electric field strength above an electrodes;

at least part of said liquid crystal molecules between the electrodes rotates in a plane approximately parallel to said principal substrate face so as to change the orientation of the part of said liquid crystal molecules;

the orientation of liquid crystal molecules disposed above the electrodes undergoes a change due to rotation thereof in a plane approximately parallel to said substrate face, the undergone change coinciding with the change in orientation of the part of said liquid crystal molecules between said electrodes; and a director of the liquid crystal molecules disposed above the electrodes is different from a direction of the electric field above the electrodes.

2. The liquid crystal display device of claim 1, wherein a distance between the electrodes that constitute said parallel electrode pair is equal to or greater than the width of the electrodes.

3. The liquid crystal display device of claim 2, wherein at least part of the liquid crystal molecules in a region disposed away from the proximity to said principal substrate in the thickness direction of the liquid crystal layer between said electrodes undergo a change in orientation due to rotation thereof in the plane approximately parallel to said substrate face, the undergone change coinciding with the change in orientation of the liquid crystal molecules disposed in proximity to said principal substrate;

the liquid crystal molecules above the electrodes undergo a change in orientation due to rotation thereof in the plane approximately parallel to said substrate face, the undergone change coinciding with the change in orientation of the liquid crystal molecules between the electrodes;

the direction of the director of the liquid crystal molecules in the region disposed away from the proximity to said principal substrate between said electrodes is different from the direction of the electric field; and the direction of the director of the liquid crystal molecules above said electrodes is different from the direction of the electric field.

4. The liquid crystal display device of claim 3, wherein the combined value of the width of, and the distance between, the electrodes constituting said parallel electrode pair is equal to or less than the thickness of said liquid crystal layer.

5. The liquid crystal display device of claim 4, wherein at least a part of the liquid crystal molecules in a center region in the thickness direction of the liquid crystal layer between said electrodes, due to rotation thereof in the plane approximately parallel to said substrate face, undergo a change in orientation;

the liquid crystal molecules above the electrodes undergo a change in orientation due to rotation thereof in the plane approximately parallel to said substrate face, the undergone change coinciding with the change in orientation of the part of said liquid crystal molecules between the electrodes;

the direction of the director of the liquid crystal molecules of the center region in the thickness direction of the liquid crystal layer between said electrodes is different from the direction of the electric field; and the direction of the director of the liquid crystal molecules above said electrodes is different from the direction of the electric field.

6. The liquid crystal display device of claim 5, wherein an electric field region in which the electric field distance between the electrodes is perpendicular to said substrate face is present in the liquid crystal layer in the region thereof furthest away from said principal substrate in the thickness direction.

7. The liquid crystal display device of claim 6, wherein the combined value of the width of, and the gap between, the electrodes constituting said parallel electrode pair is equal to half or less the thickness of said liquid crystal layer.

8. The liquid crystal display device of claim 1, wherein the liquid crystals of said liquid crystal layer have positive dielectric anisotropy.

9. The liquid crystal display device of claim 1, wherein the liquid crystals of said liquid crystal layer have negative dielectric anisotropy.

10. The liquid crystal display device of claim 1, wherein said parallel electrode pair is formed in the same layer.

11. The liquid crystal display device of claim 1, wherein an overcoat layer is provided on the liquid crystal layer side of said parallel electrode pair, and between the electrodes making up this parallel electrode pair.

12. The liquid crystal display device of claim 1, wherein said parallel electrode pair is composed of a transparent conductor.

13. The liquid crystal display device of claim 1, wherein said parallel electrode pair is composed of metal, and is provided with reflection reducing means on the surface thereof facing toward said liquid crystal layer.

14. The liquid crystal display device of claim 1, wherein the electrode width of said parallel electrode pair is preferably 0.5 μm or less.

15. The liquid crystal display device of claim 1, wherein a reverse-rotation domain preventing structure is formed on said parallel electrode pair.

16. The liquid crystal display device of claim 1 operating in normal white mode.

17. A terminal device comprising the liquid crystal display device of claim 1.

18. The terminal device of claim 17, comprising a mobile telephone, a personal information terminal, a gaming device, a digital camera, a video camera, a video player, a notebook-type personal computer, a cash dispenser, or a vending machine.

19. The liquid crystal display device of claim 1, comprising a pixel magnification element that optically magnifies images of pixels along a direction of an electrode alignment of said parallel electrode pair.

20. The liquid crystal display device of claim 3, comprising a pixel magnification element that optically magnifies images of pixels along a direction of an electrode alignment of said parallel electrode pair.

21. The liquid crystal display device of claim 5, comprising a pixel magnification element that optically magnifies images of pixels along a direction of an electrode alignment of said parallel electrode pair.

22. The liquid crystal display device of claim 6, comprising a pixel magnification element that optically magnifies images of pixels along a direction of an electrode alignment of said parallel electrode pair.

23. The liquid crystal display device of claim 8, comprising a pixel magnification element that optically magnifies images of pixels along a direction of an electrode alignment of said parallel electrode pair.

24. The liquid crystal display device of claim 9, comprising a pixel magnification element that optically magnifies images of pixels along a direction of an electrode alignment of said parallel electrode pair.

25. The liquid crystal display device of claim 12, comprising a pixel magnification element that optically magnifies images of pixels along a direction of an electrode alignment of said parallel electrode pair.

26. The liquid crystal display device of claim 13, comprising a pixel magnification element that optically magnifies images of pixels along a direction of an electrode alignment of said parallel electrode pair.

* * * * *